United States Patent
Takiguchi et al.

(10) Patent No.: US 10,320,030 B2
(45) Date of Patent: Jun. 11, 2019

(54) NONAQUEOUS ELECTROLYTE SOLUTION AND NONAQUEOUS ELECTROLYTE BATTERY EMPLOYING THE SAME

(71) Applicant: MITSUBISHI CHEMICAL CORPORATION, Chiyoda-ku (JP)

(72) Inventors: Kanako Takiguchi, Inashiki-gun (JP); Masamichi Onuki, Yokohama (JP); Shuhei Sawa, Inashiki-gun (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 83 days.

(21) Appl. No.: 14/582,676

(22) Filed: Dec. 24, 2014

(65) Prior Publication Data
US 2015/0140448 A1 May 21, 2015

Related U.S. Application Data

(63) Continuation of application No. PCT/JP2013/067811, filed on Jun. 28, 2013.

(30) Foreign Application Priority Data

Jun. 29, 2012 (JP) .................................. 2012-146835

(51) Int. Cl.
H01M 10/42 (2006.01)
H01M 10/0525 (2010.01)
H01M 10/0567 (2010.01)
H01M 10/0569 (2010.01)

(52) U.S. Cl.
CPC ... *H01M 10/0567* (2013.01); *H01M 10/0525* (2013.01); *H01M 10/0569* (2013.01); *H01M 10/4235* (2013.01); *H01M 2300/0034* (2013.01)

(58) Field of Classification Search
None
See application file for complete search history.

(56) References Cited

U.S. PATENT DOCUMENTS

| 7,172,834 | B1 * | 2/2007 | Jow | H01M 10/0525 252/519.2 |
| 7,592,102 | B1 * | 9/2009 | Kim | H01M 10/0525 252/62.2 |
| 2001/0053474 | A1 | 12/2001 | Oura et al. | |
| 2006/0216612 | A1 * | 9/2006 | Jambunathan | H01M 10/052 429/326 |
| 2008/0008928 | A1 * | 1/2008 | Partin | H01M 2/0285 429/61 |
| 2009/0068562 | A1 * | 3/2009 | Yew | H01M 4/485 429/231.5 |
| 2011/0123871 | A1 | 5/2011 | Nakagawa et al. | |
| 2011/0136018 | A1 | 6/2011 | Nogi et al. | |
| 2012/0301760 | A1 | 11/2012 | Murai | |
| 2012/0308881 | A1 | 12/2012 | Tokuda et al. | |
| 2015/0024284 | A1 | 1/2015 | Takiguchi et al. | |

FOREIGN PATENT DOCUMENTS

| CN | 101292389 A | 10/2008 | |
| CN | 101652894 A | 2/2010 | |
| CN | 101960662 A | 1/2011 | |
| JP | 2000-182663 A | 6/2000 | |
| JP | 2001-357838 A | 12/2001 | |
| JP | 2003-187862 | 7/2003 | |
| JP | 2003-243026 | 8/2003 | |
| JP | 2003-243026 A * | 8/2003 | ............ H01M 10/40 |
| JP | 2011-028860 | 2/2011 | |
| KR | 10-2009-0025869 A | 3/2009 | |
| KR | 10-2010-0120164 A | 11/2010 | |

(Continued)

OTHER PUBLICATIONS

Machine translation of JP 2003-243026 printed Jun. 25, 2016.*
International Preliminary Report on Patentability and Written Opinion dated Jan. 8, 2015 in PCT/JP2013/067811 (English translation only).
Extended European Search Report dated Jun. 5, 2015 in Patent Application No. 13808691.3.
Parvati Ghimire, et al., "Suppression of Electrochemical Decomposition of Electrolyte in Lithium Ion Batteries: An Electrolyte Containing an Acetate Group" ITE Letters on Batteries, New Technologies & Medicine, vol. 6, No. 1, XP-001512462, Mar. 20, 2005, pp. 16-19.
International Preliminary Report on Patentability and Written Opinion dated Dec. 31, 2014 in PCT/JP2013/067811 (English translation only).
International Search Report issued in PCT/JP2013/067811, dated Sep. 17, 2013.

(Continued)

*Primary Examiner* — Maria Laios
(74) *Attorney, Agent, or Firm* — Oblon, McClelland, Maier & Neustadt, L.L.P.

(57) ABSTRACT

Provided is a nonaqueous electrolyte solution battery with dramatically improved battery characteristics. A nonaqueous electrolyte solution battery prepared by using a nonaqueous electrolyte solution comprising (I) an aromatic carboxylic acid ester compound represented by General Formula (1) below; and (II) specific compounds, is improved in charge-discharge characteristics at high current densities, durability performance during high-temperature storage and overcharge characteristics.

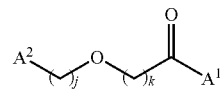

(1)

(in General Formula (1), $A^1$ is —$R^1$ or —$OR^1$, with $R^1$ being an optionally substituted hydrocarbon group with 10 or fewer carbon atoms; $A^2$ is an optionally substituted aryl group; each of j and k is independently 0 or an integer greater than 0, and at least one of j and k is an integer not less than 1; and when k≥1, $A^1$ is —$OR^1$, while when k=0, $A^1$ is —$R^1$; and the case of j=1, k=0 is not allowed).

6 Claims, No Drawings

(56) References Cited

FOREIGN PATENT DOCUMENTS

| KR | 10-2011-0036107 A | 4/2011 |
|---|---|---|
| WO | WO 2011/099585 A1 | 8/2011 |

OTHER PUBLICATIONS

U.S. Appl. No. 14/502,343, filed Sep. 30, 2014, US2015/0024284 A1, Takiguchi, et al.
Office Action dated Jan. 20, 2016 in Korean Patent Application No. 10-2014-7036442 (with English language translation).
Combined Office Action and Search Report dated Mar. 30, 2016 in Chinese Patent Application No. 201380033843.5 (with English translation).
Notification of Reasons for Refusal dated Jan. 17, 2017, in corresponding Japanese Application No. 2014-522701, with computer generated English translation, 7 pages.
English language translation of Final Rejection dated Jul. 1, 2016, issued in corresponding Korean patent application No. 2014-7036442, 9 pp.
Notice of Final Rejection dated Nov. 2, 2016 in Korean Patent Application No. 10-2014-703642 (with computer-generated English translation).
Office Action dated Nov. 23, 2016 in corresponding Chinese Patent Application No. 201380033843.5 with English translation, 24 pages.
Notice of Final Rejection dated Jul. 1, 2016 in Korean patent Application No. 10-2014-7036442 (with English translation).
Office Action dated Mar. 7, 2017 in corresponding Korean Patent Application No. 10-2017-7002770, with English computer generated translation.
Office Action dated Aug. 7, 2017 in corresponding European Patent Application No. 13808691.3.
Zhang, Sheng Shui, "A review on electrolyte additives for lithium-ion batteries," ScienceDirect, Journal of Power Sources, 162 (2006), pp. 1379-1394.
Third Office Action dated Aug. 10, 2017 in corresponding Chinese Patent Application No. 201380033843.5, with machine-generated English translation.

\* cited by examiner

US 10,320,030 B2

NONAQUEOUS ELECTROLYTE SOLUTION AND NONAQUEOUS ELECTROLYTE BATTERY EMPLOYING THE SAME

CROSS-REFERENCE TO RELATED APPLICATION

This is a continuation of International Application PCT/JP2013/067811, filed on Jun. 28, 2013, and designated the U.S., (and claims priority from Japanese Patent Application 2012-146835 which was filed on Jun. 29, 2012,) the entire contents of which are incorporated herein by reference.

TECHNICAL FIELD

The present invention relates to a nonaqueous electrolyte solution and a nonaqueous electrolyte battery employing the nonaqueous electrolyte solution.

BACKGROUND ART

Along with rapid advances in cellular phones, notebook computers and other portable electronic devices, there has been increasing demand for higher capacities in the batteries used as main power supplies and back-up power supplies for these, and attention has focused on lithium-ion secondary batteries and other nonaqueous electrolyte solution batteries, which have higher energy densities than nickel-cadmium batteries and nickel-hydrogen batteries.

Typical examples of electrolyte solutions for lithium-ion secondary batteries include nonaqueous electrolyte solutions comprising electrolytes such as $LiPF_6$, $LiBF_4$, $LiN(CF_3SO_2)_2$ and $LiCF_3(CF_2)_3SO_3$ dissolved in mixed solvents consisting of ethylene carbonate, propylene carbonate and other high-permittivity solvents mixed with dimethyl carbonate, diethyl carbonate, ethyl methyl carbonate and other low-viscosity solvents. Carbonaceous materials capable of storing and releasing lithium ions are primarily used as the negative electrode active materials of lithium-ion secondary batteries, and typical examples include natural graphite, artificial graphite, amorphous carbon and the like. Metal and alloy-based negative electrodes are also known that use silicon, tin and the in order to achieve higher capacities. Transition metal composite oxides capable of storing and releasing lithium ions are primarily used as the positive electrode active materials, and typical examples of transition metals include cobalt, nickel, manganese, iron and the like.

Because such lithium-ion secondary batteries use highly active positive and negative electrodes, charge-discharge capacities may be reduced by side reactions between the electrodes and the electrolyte solution. There are also concerns about safety when the battery is overcharged. To resolve these problems, various studies have been conducted on nonaqueous solvents and electrolytes.

Patent Document 1 discloses a technique for controlling battery swelling during high-temperature storage without reducing the battery capacity by including an aromatic ester compound in a nonaqueous electrolyte solution.

Patent Document 2 discloses a technique for controlling battery deterioration during high-temperature storage by using a nonaqueous electrolyte solution containing both an aromatic compound and an isocyanate compound, together with a positive electrode containing a specific amount of moisture in a lithium-ion secondary battery.

Patent Document 3 discloses a technique for suppressing high-resistance film formation by Li borate salts on the positive electrode, improving battery swelling during high-temperature storage and improving the cycle characteristics by including an aromatic compound together with various Li borate salts such as $LiBF_4$ in a nonaqueous electrolyte solution.

[Patent Document 1] Japanese Patent Application Laid-open No. 2003-243026

[Patent Document 2] Japanese Patent Application Laid-open No. 2011-028860

[Patent Document 3] Japanese Patent Application Laid-open No. 2006-216378

DISCLOSURE OF THE INVENTION

However, in recent years demands for higher-performance batteries have increased still further, and a higher level of capacity, high-temperature storage characteristics, cycle characteristics and safety during overcharge is now required.

One method that has been studied for increasing battery capacity is to pack as much active material as possible in a limited battery volume, and for example methods of pressing to increase the density of the active material layers of the electrodes and designs that minimize the volume occupied by components other than the active materials (such as electrolyte solution volume) in the battery have become common. However, when the density of the active material layer of an electrode is increased by pressing, or when the amount of the electrolyte solution is reduced, the active material can no longer be used uniformly. The resulting non-uniform reaction may cause precipitation of part of the lithium or promote deterioration of the active material, making it more likely that adequate characteristics will not be obtained.

Another problem is that when gaps inside the battery are reduced due to the increased capacity, the internal battery pressure increases dramatically when small amounts of gas are produced by decomposition of the electrolyte solution. In the case of nonaqueous electrolyte solution secondary batteries in particular, most batteries used as back-up power sources in case of power failure and as power sources in portable devices are in a continuously charged state because a weak current is constantly being supplied to compensate for the self-discharge of the battery. In such a continuously charged state, the activity of the electrode active material is at a constantly high level, while at the same time heating of the device promotes a decrease in battery capacity, and gas is more likely to be produced by decomposition of the electrolyte solution. When the battery is one that senses abnormal rises in internal pressure due to overcharge or other abnormal conditions and operates a safety valve in response, the safety valve may operate when a large amount of gas is produced. In a battery without a safety valve, the battery may swell due to pressure from the resulting gas, rendering the battery itself unusable.

While a nonaqueous electrolyte solution battery using the electrolyte solution described in Patent Document 1 has increased high-temperature storage characteristics under circumstances such as those described above, the rate characteristics are reduced because the internal resistance of the battery is increased by side-reactions with the electrode, so this is still not satisfactory in terms of the overall battery characteristics.

In a nonaqueous electrolyte solution battery using the electrolyte solution described in Patent Document 2, the high-temperature storage characteristics are greatly reduced due to the low oxidation potential of the aromatic compound under conditions such as those described above, so this is still not satisfactory in terms of the overall battery characteristics.

In a nonaqueous electrolyte solution battery using the electrolyte solution described in Patent Document 3, swelling during high-temperature storage is controlled under conditions such as those described above, but the rate characteristics are reduced because the internal resistance of the battery is increased by side-reactions with the electrode, so this is still not satisfactory in terms of the overall battery characteristics.

It is an object of the present invention, which was developed in light of the issues described above, to provide a nonaqueous electrolyte solution battery with dramatically improved battery characteristics, and especially with improved charge-discharge characteristics at high current densities, durability performance during high-temperature storage and overcharge characteristics.

As a result of exhaustive research aimed at resolving the aforementioned problems, the inventors perfected the invention after discovering that these problems could be resolved by including a specific compound in the electrolyte solution.

That is, the substance of the present invention is as follows.

<1> A nonaqueous electrolyte solution comprising an electrolyte; and a nonaqueous solvent, the nonaqueous electrolyte solution further comprising:

(I) an aromatic carboxylic acid ester compound represented by General Formula (1) below; and (II) at least one kind of compound selected from the group consisting of cyclic carbonate compounds having fluorine atom, monofluorophosphate salts, difluorophosphate salts, borate salts, fluorosulfonate salts, compounds having $SO_2$ group, compounds having cyano group, compounds having isocyanate group, oxalate salts, Si-containing compounds and aromatic compounds not represented by General Formula (1):

[C1]

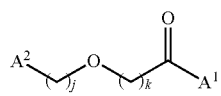
(1)

(in General Formula (1), $A^1$ is —$R^1$ or —$OR^1$, with $R^1$ being an optionally substituted hydrocarbon group with 10 or fewer carbon atoms; $A^2$ is an optionally substituted aryl group; each of j and k is independently 0 or an integer greater than 0, and at least one of j and k is an integer not less than 1; and when k≥1, $A^1$ is —$OR^1$, while when k=0, $A^1$ is —$R^1$; and the case of j=1, k=0 is not allowed).

<2> The nonaqueous electrolyte solution according to <1>, wherein the compound of (II) above satisfies at least one of conditions (i) to (vii) below:

(i) the cyclic carbonate having a fluorine atom is a fluorinated ethylene carbonate;

(ii) the compound having a $SO_2$ group is at least one compound selected from the group consisting of chain sulfonic acid esters, cyclic sulfonic acid esters, chain sulfuric acid esters, cyclic sulfuric acid esters, chain sulfurous acid esters and cyclic sulfurous acid esters;

(iii) the compound having a cyano group is a compound having at least two cyano groups;

(iv) the compound having an isocyanate group is a compound having at least two isocyanate groups;

(v) the oxalate salt is a metal salt represented by General Formula (2);

(vi) the Si-containing compound is a compound represented by General Formula (3); and (vii) the aromatic compound not represented by General Formula (1) is a halogenated aromatic compound or aromatic hydrocarbon compound,

[C2]

$$M^1_a[M^2(C_2O_4)_b R_c]_d \quad (2)$$

(in General Formula (2), $M^1$ is an element selected from Group 1 and Group 2 elements of the periodic table and aluminum (Al), $M^2$ is a transition metal or an element selected from Group 13, Group 14 and Group 15 elements of the periodic table, R is a halogen or a group selected from $C_{1-11}$ alkyl groups and $C_{1-11}$ halogen-substituted alkyl groups, a and b are positive integers, c is 0 or a positive integer, and d is an integer from 1 to 3),

[C3]

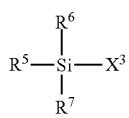
(3)

(in General Formula (3), $R^5$, $R^6$ and $R^7$ represent hydrogen atoms, halogen atoms or hydrocarbon groups with 10 or fewer carbon atoms, and $X^3$ is an organic group containing at least one atom selected from the group consisting of oxygen, nitrogen and silicon atoms).

<3> The nonaqueous electrolyte solution according to <1> or <2>, wherein the nonaqueous solvent in the nonaqueous electrolyte solution includes a chain carbonate and a cyclic carbonate that is not a cyclic carbonate having a fluorine atom, and the total content of the Group (I) compound in the nonaqueous electrolyte solution is 0.001 mass % to 10 mass %, and/or the total content of the Group (II) compound in the nonaqueous electrolyte solution is 0.001 mass % to 20 mass %.

<4> The nonaqueous electrolyte solution according to any one of <1> to <3>, wherein at least one of j and k is an integer not less than 2 in the General Formula (1).

5> The nonaqueous electrolyte solution according to any one of <1> to <4>, further comprising a cyclic carbonate having a carbon-carbon unsaturated bond.

<6> A nonaqueous electrolyte solution battery comprising negative and positive electrodes capable of storing and releasing lithium ions; and a nonaqueous electrolyte solution, wherein the nonaqueous electrolyte solution is the nonaqueous electrolyte solution according to any one of <1> to <5>.

With the present invention, it is possible to provide a nonaqueous electrolyte solution battery with dramatically improved charge-discharge characteristics at high current densities, durability performance during high-temperature storage and overcharge characteristics, and to achieve a smaller, higher-performance nonaqueous electrolyte solution battery.

The actions and principles that allow a nonaqueous electrolyte solution secondary battery prepared using the nonaqueous electrolyte solution of the present invention and a nonaqueous electrolyte solution secondary battery of the present invention to have dramatically improved charge-discharge characteristics at high current densities, durability performance during high-temperature storage and overcharge characteristics are not entirely clear, but may be as follows. However, the present invention is not limited by the actions and principles described below.

Normally, the aromatic carboxylic acid esters (hereunder sometimes called generally Group (I) compounds) represented by General Formula (1) in Patent Document 1 and the like form film-like structures on the negative electrode, suppressing reductions in durability performance including high-temperature storage characteristics. However, the film formed on the negative electrode has poor $Li^+$ conductivity, detracting from the charge-discharge characteristics at high current densities. Moreover, aromatic carboxylic acid esters have poor oxidation resistance, leading to battery deterioration due to electrochemical side-reactions on the positive electrode.

On the other hand, cyclic carbonate compounds having fluorine atom, monofluorophosphate salts, difluorophosphate salts, borate salts, fluorosulfonate salts, compounds having $SO_2$ group, compounds having cyano group, compounds having isocyanate group, oxalate salts, Si-containing compounds and aromatic compounds not represented by General Formula (1) (hereunder sometimes generally called Group (II) compounds) all form film-like structures on the positive electrode, and improve durability performance. At the same time, however, use of Group (II) compounds promotes deterioration by electrochemical side-reactions on the positive and negative electrodes. Thus, using these additives individually it is difficult to improve both durability performance and charge-discharge characteristics at high current densities, and the battery characteristics are still not satisfactory.

Under these circumstances, the present invention resolves these problems by including a Group (I) compound and a Group (II) compound together in a nonaqueous electrolyte solution. That is, by including a Group (II) compound when forming a film with a Group (I) compound on the negative electrode, it is possible to form a composite film having both excellent charge-discharge characteristics at high current densities and excellent durability performance, leading to a synergistic effect. Moreover, the electrochemical side-reactions caused by the Group (I) compound on the positive electrode are suppressed because the Group (II) compound forms a film on the positive electrode, improving the durability performance of the battery. Consumption of the Group (I) compound in the electrolyte solution is also dramatically reduced when a composite film is formed on the negative electrode, and it is thought that the reaction of the Group (I) compound during charging is enhanced as a result.

As a result, it is thought that the effects of the Group (I) compound and the Group (II) compound inside the battery can be exploited to the fullest.

BEST MODE FOR CARRYING OUT THE INVENTION

Embodiments of the present invention are explained in detail next, but the present invention is not limited to the following embodiments, and may be modified and carried out in any ways within the scope not departing from the spirit of the present invention.

In this Description, "weight %", "weight ppm" and "parts by weight" and "mass %", "mass ppm" and "parts by mass" are each defined in the same way. By itself, "ppm" indicates "weight ppm".

1. Nonaqueous Electrolyte Solution

The nonaqueous electrolyte solution of the present invention contains an aromatic carboxylic acid ester compound represented by General Formula (1) above (hereunder sometimes called generally a Group (I) compound) and at least one kind of compound selected from the group consisting of cyclic carbonate compounds having fluorine atom, monofluorophosphate salts, difluorophosphate salts, borate salts, fluorosulfonate salts, compounds having $SO_2$ group, compounds having cyano group, compounds having isocyanate group, oxalate salts, Si-containing compounds and aromatic compounds not represented by General Formula (1) (hereunder sometimes called generally Group (II) compounds) as essential components.

1-1. Group (I) Compound

The nonaqueous electrolyte solution of the present invention normally contains as its principal components an electrolyte and a nonaqueous solvent that dissolves the electrolyte as in the case of an ordinary nonaqueous electrolyte solution, and is characterized by containing an aromatic carboxylic acid ester compound represented by General Formula (1) below.

One kind of Group (I) compound may be included alone in the nonaqueous electrolyte solution of the present invention, or two or more kinds may be included. The content of the Group (I) compound in the nonaqueous electrolyte solution (total content when there are two or more) is in the range of at least 0.001 mass %, or preferably at least 0.01 mass %, or more preferably at least 0.1 mass %, or still more preferably at least 0.3 mass %, or especially at least 0.5 mass %, and is normally 10 mass % or less, or preferably 8 mass % or less, or more preferably 5 mass % or less, or still more preferably 3 mass % or less, or especially 2 mass % or less. Within this range, it is easy to obtain good performance in terms of ion conductivity, rate characteristics and other battery characteristics.

1-1-1. Aromatic Carboxylic Acid Ester Compound Represented by General Formula (1)

[C4]

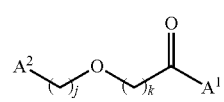

(1)

In General Formula (1), $A^1$ is $-R^1$ or $-OR^1$, with $R^1$ being an optionally substituted hydrocarbon group with 10 or fewer carbon atoms. $A^2$ is an optionally substituted aryl group. Each of j and k is independently an integer not less than 0, and one or more of j and k is an integer not less than 1. When $k \geq 1$, $A^1$ is $-OR^1$, while when $k=0$, $A^1$ is $-R^1$. However, the case of $j=1$, $k=0$ is not allowed.

The statement "the case of $j=1$, $k=0$ is not allowed" means that an aromatic carboxylic acid ester compound in which "$j=1$, $k=0$" is not included in the "aromatic carboxylic ester compound represented by General Formula (1)" of the present invention.

j above is an integer not less than 0, or preferably not less than 1, or more preferably not less than 2, or still more not less than 3, and is an integer not greater than 10, or preferably not greater than 8, or more preferably not greater than 5. k above is an integer not less than 0, or preferably 0, and is also an integer not greater than 5, or preferably not greater than 3, or more preferably not greater than 2.

Preferably, either j or k is 0.

When k is 0, j is an integer not less than 1, and $A^1$ is $—R^1$. In this case, if the value of j is small the unoccupied orbitals of the $—O—CO—R^1$ group and the benzene ring of $A^2$ become superimposed. This makes the compound more easily reducible, resulting in reductive side reactions in the negative electrode, and leading to loss of battery capacity and the production of a high-resistance coating. Thus, when k is 0, j is preferably an integer not less than 2, or preferably an integer not less than 3. In this way, it is possible to reduce superimposition of the unoccupied orbitals of the $—O—CO—R^1$ group and the benzene ring of $A_2$, and control battery capacity loss due to reductive side reactions.

The type of hydrocarbon group in $R^1$ above is not particularly limited, but the number of carbon atoms therein is normally at least 1, or preferably at least 2, or more preferably at least 3, and is normally 10 or fewer, or preferably 8 or fewer, or more preferably 5 or fewer. Specific examples of the hydrocarbon group include methyl, ethyl, n-propyl, i-propyl, n-butyl, sec-butyl, i-butyl, tert-butyl and other $C_{1-4}$ alkyl groups, vinyl, 1-propenyl, 2-propenyl, iso-propenyl and other $C_{2-4}$ alkenyl groups, ethynyl, 1-propynyl, 2-propynyl, butynyl and other $C_{2-4}$ alkynyl groups, and phenyl, tolyl, ethylphenyl, n-propylphenyl, i-propylphenyl, n-butylphenyl, sec-butylphenyl, i-butylphenyl, tert-butylphenyl, trifluoromethylphenyl, xylyl, benzyl, phenethyl, methoxyphenyl, ethoxyphenyl, trifluoromethoxyphenyl and other aryl groups and the like. Of these, a methyl, ethyl, n-propyl, i-propyl, n-butyl, sec-butyl, i-butyl, tert-butyl or other $C_{1-4}$ alkyl group is preferred, and a methyl or ethyl group is especially preferred.

The type of the aryl group in $A^2$ above is not especially limited, and the number of carbon atoms therein is normally at least 6, or preferably at least 7, or more preferably at least 8, and is normally 12 or fewer, or preferably 10 or fewer, or more preferably 9 or fewer. Specific examples of the aryl group include phenyl, tolyl, ethylphenyl, n-propylphenyl, i-propylphenyl, n-butylphenyl, sec-butylphenyl, i-butylphenyl, tert-butylphenyl, trifluoromethylphenyl, xylyl, methoxyphenyl, ethoxyphenyl and trifluoromethoxyphenyl groups and the like. Of these, a phenyl, tolyl or tert-butylphenyl group is preferred, and a phenyl group is more preferred.

Specific examples of substituents in the "optionally substituted hydrocarbon group with 10 or fewer carbon atoms" and "optionally substituted aryl group" above include halogen atoms, alkyl, alkenyl, alkynyl, aryl and alkoxy groups optionally substituted with halogen atoms, and nitrile, isocyanate, ether, carbonate, carbonyl, carboxyl, sulfonyl, phosphanetriyl and phosphoryl groups and the like. A halogen atom or alkyl group substituted with a halogen atom is preferred.

When $A^2$ is a phenyl group having a substituent, the present invention includes all orth-, meta- and para- forms, and a meta- or para- form is preferred.

The following are examples of the aromatic ester compound represented by General Formula (1) above.

(j=2, k=0)

2-phenylethyl acetate, 2-phenylethyl propionate, 2-phenylethyl butyrate, 2-phenylethyl isobutyrate, 2-phenylethyl valerate, 2-phenylethyl isovalerate, 2-phenylethyl methyl butyrate, 2-phenylethyl pivalate, 2-phenylethyl acrylate, 2-phenylethyl-3-butenoate, 2-phenylethyl crotonate, 2-phenylethyl methacrylate, 2-phenylethyl propiolate, 2-phenylethyl-3-butynoate, 2-phenylethyl-2-butynoate, 2-phenylethyl benzoate, 2-phenylethyl methyl benzoate, 2-phenylethyl ethyl benzoate, 2-phenylethyl-n-propyl benzoate, 2-phenylethyl-i-propyl benzoate, 2-phenylethyl-n-butyl benzoate, 2-phenylethyl-sec-butyl benzoate, 2-phenylethyl-1-butyl benzoate, 2-phenylethyl-tert-butyl benzoate, 2-phenylethyl trifluoromethyl benzoate, 2-phenylethyl methoxybenzoate, 2-phenylethyl ethoxybenzoate, 2-phenylethyl trifluoromethoxybenzoate;

2-tolylethyl acetate, 2-tolylethyl propionate, 2-tolylethyl butyrate, 2-tolylethyl isobutyrate, 2-tolylethyl valerate, 2-tolylethyl isovalerate, 2-tolylethyl methyl butyrate, 2-tolylethyl pivalate, 2-tolylethyl acrylate, 2-tolylethyl-3-butenoate, 2-tolylethyl crotonate, 2-tolylethyl methacrylate, 2-tolylethyl propiolate, 2-tolylethyl-3-butynoate, 2-tolylethyl-2-butynoate, 2-tolylethyl benzoate, 2-tolylethyl methyl benzoate, 2-tolylethyl ethyl benzoate, 2-tolylethyl-n-propyl benzoate, 2-tolylethyl-i-propyl benzoate, 2-tolylethyl-n-butyl benzoate, 2-tolylethyl-sec-butyl benzoate, 2-tolylethyl-i-butyl benzoate, 2-tolylethyl-tert-butyl benzoate, 2-tolylethyl trifluoromethyl benzoate, 2-tolylethyl methoxybenzoate, 2-tolylethyl ethoxybenzoate, 2-tolylethyl trifluoromethoxybenzoate;

2-ethyl phenylethyl acetate, 2-ethyl phenylethyl propionate, 2-ethyl phenylethyl butyrate, 2-ethyl phenylethyl isobutyrate, 2-ethyl phenylethyl valerate, 2-ethyl phenylethyl isovalerate, 2-ethyl phenylethyl methyl butyrate, 2-ethyl phenylethyl pivalate, 2-ethyl phenylethyl acrylate, 2-ethyl phenylethyl-3-butenoate, 2-ethyl phenylethyl crotonate, 2-ethyl phenylethyl methacrylate, 2-ethyl phenylethyl propiolate, 2-ethyl phenylethyl-3-butynoate, 2-ethyl phenylethyl-2-butynoate, 2-ethyl phenylethyl benzoate, 2-ethyl phenylethyl methyl benzoate, 2-ethyl phenylethyl ethyl benzoate, 2-ethyl phenylethyl-n-propyl benzoate, 2-ethyl phenylethyl-i-propyl benzoate, 2-ethyl phenylethyl-n-butyl benzoate, 2-ethyl phenylethyl-sec-butyl benzoate, 2-ethyl phenylethyl-i-butyl benzoate, 2-ethyl phenylethyl-tert-butyl benzoate, 2-ethyl phenylethyl trifluoromethyl benzoate, 2-ethyl phenylethyl methoxybenzoate, 2-ethyl phenylethyl ethoxybenzoate, 2-ethyl phenylethyl trifluormethoxybenzoate;

2-n-propyl phenylethyl acetate, 2-n-propyl phenylethyl propionate, 2-n-propyl phenylethyl butyrate, 2-n-propyl phenylethyl isobutyrate, 2-n-propyl phenylethyl valerate, 2-n-propyl phenylethyl isovalerate, 2-n-propyl phenylethyl methyl butyrate, 2-n-propyl phenylethyl pivalate, 2-n-propyl phenylethyl acrylate, 2-n-propyl phenylethyl-3-butenoate, 2-n-propyl phenylethyl crotonate, 2-n-propyl phenyletheyl methacrylate, 2-n-propyl phenylethyl propiolate, 2-n-propyl phenylethyl-3-butynoate, 2-n-propyl phenylethyl-2-butynoate, 2-n-propyl phenylethyl benzoate, 2-n-propyl phenylethyl methyl benzoate, 2-n-propyl phenylethyl ethyl benzoate, 2-n-propyl phenylethyl-n-propyl benzoate, 2-n-propyl phenylethyl-i-propyl benzoate, 2-n-propyl phenylethyl-n-butyl benzoate, 2-n-propyl phenylethyl-sec-butyl benzoate, 2-n-propyl phenylethyl-i-butyl benzoate, 2-n-propyl phenylethyl-tert-butyl benzoate, 2-n-propyl phenylethyl trifluoromethyl benzoate, 2-n-propyl phenylethyl methoxybenzoate, 2-n-propyl phenylethyl ethoxybenzoate, 2-n-propyl phenylethyl trifluoromethoxybenzoate;

2-i-propyl phenylethyl acetate, 2-i-propyl phenylethyl propionate, 2-i-propyl phenylethyl butyrate, 2-i-propyl phenylethyl isobutyrate, 2-i-propyl phenylethyl valerate, 2-i-propyl phenylethyl isovalerate, 2-i-propyl phenylethyl methyl butyrate, 2-i-propyl phenylethyl pivalate, 2-i-propyl phenylethyl acrylate, 2-i-propyl phenylethyl-3-butenoate, 2-i-propyl phenylethyl crotonate, 2-i-propyl phenylethyl methacrylate, 2-i-propyl phenylethyl propiolate, 2-i-propyl phenylethyl-3-butynoate, 2-i-propyl phenylethyl-2-butynoate, 2-i-propyl phenylethyl benzoate, 2-i-propyl phenylethyl methyl benzoate, 2-i-propyl phenylethyl ethyl benzoate, 2-i-propyl phenylethyl-n-propyl benzoate, 2-i-propyl phenylethyl-i-propyl benzoate, 2-i-propyl phenylethyl-n-butyl benzoate, 2-i-propyl phenylethyl-sec-butyl-benzoate, 2-i-propyl phenylethyl-i-butyl benzoate, 2-i-propyl phenylethyl-tert-butyl benzoate, 2-i-propyl phenylethyl trifluoromethyl benzoate, 2-i-propyl phenylethyl methoxybenzoate, 2-i-propyl phenylethyl ethoxybenzoate, 2-i-propyl phenylethyl trifluoromethoxybenzoate;

2-n-butyl phenylethyl acetate, 2-n-butyl phenylethyl propionate, 2-n-butyl phenylethyl butyrate, 2-n-butyl phenylethyl isobutyrate, 2-n-butyl phenylethyl valerate, 2-n-butyl phenylethyl isovalerate, 2-n-butyl phenylethyl methyl butyrate, 2-n-butyl phenylethyl pivalate, 2-n-butyl phenylethyl acrylate, 2-n-butyl phenylethyl-3-butenoate, 2-n-butyl phenylethyl crotonate, 2-n-butyl phenylethyl methacrylate, 2-n-butyl phenylethyl propiolate, 2-n-butyl phenylethyl-3-butynoate, 2-n-butyl phenylethyl-2-butynoate, 2-n-butyl phenylethyl benzoate, 2-n-butyl phenylethyl methyl benzoate, 2-n-butyl phenylethyl ethyl benzoate, 2-n-butyl phenylethyl-n-propyl benzoate, 2-n-butyl phenylethyl-i-propyl benzoate, 2-n-butyl phenylethyl-n-butyl benzoate, 2-n-butyl phenylethyl-sec-butyl benzoate, 2-n-butyl phenylethyl-i-butyl benzoate, 2-n-butyl phenylethyl-tert-butyl benzoate, 2-n-butyl phenylethyl trifluoromethyl benzoate, 2-n-butyl phenylethyl methoxybenzoate, 2-n-butyl phenylethyl ethoxybenzoate, 2-n-butyl phenylethyl trifluormethoxybenzoate;

2-sec-butyl phenylethyl acetate, 2-sec-butyl phenylethyl propionate, 2-sec-butyl phenylethyl butyrate, 2-sec-butyl phenylethyl isobutyrate, 2-sec-butyl phenylethyl valerate, 2-sec-butyl phenylethyl isovalerate, 2-sec-butyl phenylethyl methyl butyrate, 2-sec-butyl phenylethyl pivalate, 2-sec-butyl phenylethyl acrylate, 2-sec-butyl phenylethyl-3-butenoate, 2-sec-butyl phenylethyl crotonate, 2-sec-butyl phenylethyl methacrylate, 2-sec-butyl phenylethyl propiolate, 2-sec-butyl phenylethyl-3-butynoate, 2-sec-butyl phenylethyl-2-butynoate, 2-sec-butyl phenylethyl benzoate, 2-sec-butyl phenylethyl methyl benzoate, 2-sec-butyl phenylethyl ethyl benzoate, 2-sec-butyl phenylethyl-n-propyl benzoate, 2-sec-butyl phenylethyl-i-propyl benzoate, 2-sec-butyl phenylethyl-n-butyl benzoate, 2-sec-butyl phenylethyl-sec-butyl benzoate, 2-sec-butyl phenylethyl-i-butyl benzoate, 2-sec-butyl phenylethyl-tert-butyl-benzoate, 2-sec-butyl phenylethyl trifluoromethyl benzoate, 2-sec-butyl phenylethyl methoxybenzoate, 2-sec-butyl phenylethyl ethoxybenzoate, 2-sec-butyl phenylethyl trifluormethoxybenzoate;

2-i-butyl phenylethyl acetate, 2-i-butyl phenylethyl propionate, 2-i-butyl phenylethyl butyrate, 2-i-butyl phenylethyl isobutyrate, 2-i-butyl phenylethyl valerate, 2-i-butyl phenylethyl isovalerate, 2-i-butyl phenylethyl methyl butyrate, 2-i-butyl phenylethyl pivalate, 2-i-butyl phenylethyl acrylate, 2-i-butyl phenylethyl-3-butenoate, 2-i-butyl phenylethyl crotonate, 2-i-butyl phenylethyl methacrylate, 2-i-butyl phenylethyl propiolate, 2-i-butyl phenylethyl-3-butynoate, 2-i-butyl phenylethyl-2-butynoate, 2-i-butyl phenylethyl benzoate, 2-i-butyl phenylethyl methyl benzoate, 2-i-butyl phenylethyl ethyl benzoate, 2-i-butyl phenylethyl-n-propyl benzoate, 2-i-butyl phenylethyl-i-propyl benzoate, 2-i-butyl phenylethyl-n-butyl benzoate, 2-i-butyl phenylethyl-sec-butyl benzoate, 2-i-butyl phenylethyl-i-butyl benzoate, 2-i-butyl phenylethyl-tert-butyl benzoate, 2-i-butyl phenylethyl trifluoromethyl benzoate, 2-i-butyl phenylethyl methoxybenzoate, 2-i-butyl phenylethyl ethoxybenzoate, 2-i-butyl phenylethyl trifluoromethoxybenzoate;

2-tert-butyl phenylethyl acetate, 2-tert-butyl phenylethyl propionate, 2-tert-butyl phenylethyl butyrate, 2-tert-butyl phenylethyl isobutyrate, 2-tert-butyl phenylethyl valerate, 2-tert-butyl phenylethyl isovalerate, 2-tert-butyl phenylethyl methyl butyrate, 2-tert-butyl phenylethyl pivalate, 2-tert-butyl phenylethyl acrylate, 2-tert-butyl phenylethyl-3-butenoate, 2-tert-butyl phenylethyl crotonate, 2-tert-butyl phenylethyl methacrylate, 2-tert-butyl phenylethyl propiolate, 2-tert-butyl phenylethyl-3-butynoate, 2-tert-butyl phenylethyl-2-butynoate, 2-tert-butyl phenylethyl benzoate, 2-tert-butyl phenylethyl methyl benzoate, 2-tert-butyl phenylethyl ethyl benzoate, 2-tert-butyl phenylethyl-n-propyl benzoate, 2-tert-butyl phenylethyl-i-propyl benzoate, 2-tert-butyl phenylethyl-n-butyl benzoate, 2-tert-butyl phenylethyl-sec-butyl benzoate, 2-tert-butyl phenylethyl-i-butyl benzoate, 2-tert-butyl phenylethyl-tert-butyl benzoate, 2-tert-butyl phenylethyl trifluoromethyl benzoate, 2-tert-butyl phenylethyl methoxybenzoate, 2-tert-butyl phenylethyl ethoxybenzoate, 2-tert-butyl phenylethyl trifluoromethoxybenzoate;

2-trifluoromethyl phenylethyl acetate, 2-trifluoromethyl phenylethyl propionate, 2-trilfluoromethyl phenylethyl butyrate, 2-trifluoromethyl phenylethyl isobutyrate, 2-trifluoromethyl phenylethyl valerate, 2-trifluoromethyl phenylethyl isovalerate, 2-trifluoromethyl phenylethyl methyl butyrate, 2-trifluoromethyl phenylethyl pivalate, 2-trifluoromethyl phenylethyl acrylate, 2-trifluoromethyl phenylethyl-3-butenoate, 2-trifluoromethyl phenylethyl crotonate, 2-trifluoromethyl phenylethyl methacrylate, 2-trifluoromethyl phenylethyl propiolate, 2-trifluoromethyl phenylethyl-3-butynoate, 2-trifluoromethyl phenylethyl-2-butynoate, 2-trifluoromethyl phenylethyl benzoate, 2-trifluoromethyl phenylethyl methyl benzoate, 2-trifluoromethyl phenylethyl ethyl benzoate, 2-trifluoromethyl phenylethyl-n-propyl benzoate, 2-trifluoromethyl phenylethyl-i-propyl benzoate, 2-trifluoromethyl phenylethyl-n-butyl benzoate, 2-trifluoromethyl phenylethyl-sec-butyl benzoate, 2-trifluoromethyl phenylethyl-i-butyl benzoate, 2-trifluoromethyl phenylethyl-tert-butyl benzoate, 2-trifluoromethyl phenylethyl trifluoromethyl benzoate, 2-trifluoromethyl phenylethyl methoxybenzoate, 2-trifluoromethyl phenylethyl ethoxybenzoate, 2-trifluoromethyl phenylethyl trifluoromethoxybenzoate;

2-xylyl ethyl acetate, 2-xylyl ethyl propionate, 2-xylyl ethyl butyrate, 2-xylyl ethyl isobutyrate, 2-xylyl ethyl valerate, 2-xylyl ethyl isovalerate, 2-xylyl ethyl methyl butyrate, 2-xylyl ethyl pivalate, 2-xylyl ethyl acrylate, 2-xylyl ethyl-3-butenoate, 2-xylyl ethyl crotonate, 2-xylyl ethyl methacrylate, 2-xylyl ethyl propiolate, 2-xylyl ethyl-3-butynoate, 2-xylyl ethyl-2-butynoate, 2-xylyl ethyl benzoate, 2-xylyl ethyl methyl benzoate, 2-xylyl ethyl ethyl benzoate, 2-xylyl ethyl-n-propyl benzoate, 2-xylyl ethyl-i-propyl benzoate, 2-xylyl ethyl-n-butyl benzoate, 2-xylyl ethyl-sec-butyl benzoate, 2-xylyl ethyl-i-butyl benzoate, 2-xylyl ethyl-tert-butyl benzoate, 2-xylyl ethyl trifluoromethyl benzoate, 2-xylyl ethyl methoxybenzoate, 2-xylyl ethyl ethoxybenzoate, 2-xylylethyl trifluoromethoxybenzoate;

2-methoxyphenyl ethyl acetate, 2-methoxyphenyl ethyl propionate, 2-methoxyphenyl ethyl butyrate, 2-methoxyphenyl ethyl isobutyrate, 2-methoxyphenyl ethyl valerate, 2-methoxyphenyl ethyl isovalerate, 2-methoxyphenyl ethyl methyl butyrate, 2-methoxyphenyl ethyl pivalate, 2-methoxyphenyl ethyl acrylate, 2-methoxyphenyl ethyl-3-butenoate, 2-methoxyphenyl ethyl crotonate, 2-methoxyphenyl ethyl methacrylate, 2-methoxyphenyl ethyl propiolate, 2-methoxyphenyl ethyl-3-butynoate, 2-methoxyphenyl ethyl-2-butynoate, 2-methoxyphenyl ethyl benzoate, 2-methoxyphenyl ethyl methyl benzoate, 2-methoxyphenyl ethyl ethyl benzoate, 2-methoxyphenyl ethyl-n-propyl benzoate, 2-methoxyphenyl ethyl-i-propyl benzoate, 2-methoxyphenyl ethyl-n-butyl benzoate, 2-methoxyphenyl ethyl-sec-butyl benzoate, 2-methoxyphenyl ethyl-i-butyl benzoate, 2-methoxyphenyl ethyl-tert-butyl benzoate, 2-methoxyphenyl ethyl trifluoromethyl benzoate, 2-methoxyphenyl ethyl methoxybenzoate, 2-methoxyphenyl ethyl ethoxybenzoate, 2-methoxyphenyl ethyl trifluoromethoxybenzoate;

2-ethoxyphenyl ethyl acetate, 2-ethoxyphenyl ethyl propionate, 2-ethoxyphenyl ethyl butyrate, 2-ethoxyphenyl ethyl isobutyrate, 2-ethoxyphenyl ethyl valerate, 2-ethoxyphenyl ethyl isovalerate, 2-ethoxyphenyl ethyl methyl butyrate, 2-ethoxyphenyl ethyl pivalate, 2-ethoxyphenyl ethyl acrylate, 2-ethoxyphenyl ethyl-3-butenoate, 2-ethoxyphenyl ethyl crotonate, 2-ethoxyphenyl ethyl methacrylate, 2-ethoxyphenyl ethyl propiolate, 2-ethoxyphenyl ethyl-3-butynoate, 2-ethoxyphenyl ethyl-2-butynoate, 2-ethoxyphenyl ethyl benzoate, 2-ethoxyphenyl ethyl methyl benzoate, 2-ethoxyphenyl ethyl ethyl benzoate, 2-ethoxyphenyl ethyl-n-propyl benzoate, 2-ethoxyphenyl ethyl-i-propyl benzoate, 2-ethoxyphenyl ethyl-n-butyl benzoate, 2-ethoxyphenyl ethyl-sec-butyl benzoate, 2-ethoxyphenyl ethyl-i-butylbenzoate, 2-ethoxyphenyl ethyl-tert-butyl benzoate, 2-ethoxyphenyl ethyl trifluoromethyl benzoate, 2-ethoxyphenyl ethyl methoxybenzoate, 2-ethoxyphenyl ethyl ethoxybenzoate, 2-ethoxyphenyl ethyl trifluoromethoxybenzoate;

2-trifluoromethoxyphenyl ethyl acetate, 2-trifluoromethoxyphenyl ethyl propionate, 2-trifluoromethoxyphenyl ethyl butyrate, 2-trifluoromethoxyphenyl ethyl isobutyrate, 2-trifluoromethoxyphenyl ethyl valerate, 2-trifluoromethoxyphenyl ethyl isovalerate, 2-trifluoromethoxyphenyl ethyl methyl butyrate, 2-trifluoromethoxyphenyl ethyl pivalate, 2-trifluoromethoxyphenyl ethyl acrylate, 2-trifluoromethoxyphenyl ethyl-3-butenoate, 2-trifluoromethoxyphenyl ethyl crotonate, 2-trifluoromethoxyphenyl ethyl methacrylate, 2-trifluoromethoxyphenyl ethyl propiolate, 2-trifluoromethoxyphenyl ethyl-3-butynoate, 2-trifluoromethoxyphenyl ethyl-2-butynoate, 2-trifluoromethoxyphenyl ethyl benzoate, 2-trifluoromethoxyphenyl ethyl methyl benzoate, 2-trifluoromethoxyphenyl ethyl ethyl benzoate, 2-trifluoromethoxyphenyl ethyl-n-propyl benzoate, 2-trifluoromethoxyphenyl ethyl-i-propyl benzoate, 2-trifluoromethoxyphenyl ethyl-n-butyl benzoate, 2-trifluoromethoxyphenyl ethyl-sec-butyl benzoate, 2-trifluoromethoxyphenyl ethyl-i-butyl benzoate, 2-trifluoromethoxyphenyl ethyl-tert-butyl benzoate, 2-trifluoromethoxyphenyl ethyl trifluoromethyl benzoate, 2-trifluoromethoxyphenyl ethyl methoxybenzoate, 2-trifluoromethoxyphenyl ethyl ethoxybenzoate, 2-trifluoromethoxyphenyl ethyl trifluoromethoxybenzoate.

(j=3, k=0)
3-phenyl-n-propyl acetate, 3-phenyl-n-propyl propionate, 3-phenyl-n-propyl butyrate, 3-phenyl-n-propyl valerate, 3-tolyl-n-propyl acetate, 3-tolyl-n-propyl propionate, 3-tolyl-n-propyl butyrate, 3-tolyl-n-propyl valerate, 3-tert-butylphenyl-n-propyl acetate, 3-tert-butylphenyl-n-propyl propionate, 3-tert-butylphenyl-n-propyl butyrate, 3-tert-butylphenyl-n-propyl valerate.

(j=4, k=0)
4-phenyl-n-butyl acetate, 4-phenyl-n-butyl propionate, 4-phenyl-n-butyl butyrate, 4-phenyl-n-butyl valerate, 4-tolyl-n-butyl acetate, 4-tolyl-n-butyl propionate, 4-tolyl-n-butyl butyrate, 4-tolyl-n-butyl valerate, 4-tert-butylphenyl-n-butyl acetate, 4-tert-butylphenyl-n-butyl propionate, 4-tert-butylphenyl-n-butyl butyrate, 4-tert-butylphenyl-n-butyl valerate.

(j=5, k=0)
5-phenyl-n-pentyl acetate, 5-phenyl-n-pentyl propionate, 5-phenyl-n-pentyl butyrate, 5-phenyl-n-pentyl valerate, 5-tolyl-n-pentyl acetate, 5-tolyl-n-pentyl propionate, 5-tolyl-n-pentyl butyrate, 5-tolyl-n-pentyl valerate, 5-tert-butylphenyl-n-pentyl acetate, 5-tert-butylphenyl-n-pentyl propionate, 5-tert-butylphenyl-n-pentyl butyrate, 5-tert-butylphenyl-n-pentyl valerate.

(j=6-10, k=0)
6-phenyl-n-hexyl acetate, 7-phenyl-n-heptyl acetate, 8-phenyl-n-octyl acetate, 9-phenyl-n-nonyl acetate, 10-phenyl-n-decyl acetate.

(j=0, k=1)
Methyl phenoxyacetate, ethyl phenoxyacetate, n-propyl phenoxyacetate, i-propyl phenoxyacetate, n-butyl phenoxyacetate, sec-butyl phenoxyacetate, tert-butyl phenoxyacetate, phenyl phenoxyacetate, benzyl phenoxyacetate.

(j=0, k=2)
Methyl phenoxypropionate, ethyl phenoxypropionate, n-propyl phenoxypropionate, i-propyl phenoxypropionate, n-butyl phenoxypropionate, sec-butyl phenoxypropionate, tert-butyl phenoxypropionate, phenyl phenoxypropionate, benzyl phenoxypropionate.

(j=0, k=3)
Methyl phenoxybutyrate, ethyl phenoxybutyrate, n-propyl phenoxybutyrate, i-propyl phenoxybutyrate, n-butyl phenoxybutyrate, s-butyl phenoxybutyrate, t-butyl phenoxybutyrate, phenyl phenoxybutyrate, benzyl phenoxybutyrate.

(j=1, k=1)
Methyl benzyloxyacetate, ethyl benzyloxyacetate, n-propyl benzyloxyacetate, i-propyl benzyloxyacetate, n-butyl benzyloxyacetate, s-butyl benzyloxyacetate, t-butyl benzyloxyacetate, phenyl benzyloxyacetate, benzyl benzyloxyacetate.

(j=2, k=1)
Methyl phenylethoxyacetate, ethyl phenylethoxyacetate, n-propyl phenylethoxyacetate, i-propyl phenylethoxyacetate, n-butyl phenylethoxyacetate, s-butyl phenylethoxyacetate, t-butyl phenylethoxyacetate, phenyl phenylethoxyacetate, benzyl phenylethoxyacetate.

(j=3, k=1)
Methyl phenylpropoxyacetate, ethyl phenylpropoxyacetate, n-propyl phenylpropoxyacetate, i-propyl phenylpropoxyacetate, n-butyl phenylpropoxyacetate, s-butyl phenylpropoxyacetate, t-butyl phenylpropoxyacetate, phenyl phenylpropoxyacetate, benzyl phenylpropoxyacetate.

(j=1, k=2)
Methyl benzyloxypropionate, ethyl benzyloxypropionate, n-propyl benzyloxypropionate, i-propyl benzyloxypropionate, n-butyl benzyloxypropionate, s-butyl benzyloxypropionate, t-butyl benzyloxypropionate, phenyl benzyloxypropionate, benzyl benzyloxypropionate, (j=1, k=3)
Methyl benzyloxybutyrate, ethyl benzyloxybutyrate, n-propyl benzyloxybutyrate, i-propyl benzyloxybutyrate, n-butyl benzyloxybutyrate, s-butyl benzyloxybutyrate, t-butyl benzyloxybutyrate, phenyl benzyloxybutyrate, benzyl benzyloxybutyrate.

(j=2, k=2)
Methyl phenylethoxypropionate, ethyl phenylethoxypropionate, n-propyl phenylethoxypropionate, i-propyl phenylethoxypropionate, n-butyl phenylethoxypropionate, s-butyl phenylethoxypropionate, t-butyl phenylethoxypropionate, phenyl phenylethoxypropionate, benzyl phenylethoxypropionate.

Of these, 2-phenylethyl acetate, 3-phenyl-n-propyl acetate, methyl phenoxyacetate, ethyl phenoxyacetate, n-propyl phenoxyacetate, n-butyl phenoxyacetate, methyl phenoxypropionate, ethyl phenoxypropionate, n-propyl phenoxypropionate or n-butyl phenoxypropionate is preferred for improving the storage characteristics.

These aromatic carboxylic acid ester compounds represented by General Formula (1) may be used singly as one type, or as two or more concurrent types in any combinations and ratios.

1-2. Group (II) Compound

In addition to the aromatic ester compound represented by the Group (I) compound above, the nonaqueous electrolyte solution of the present invention further contains at least one kind of compound selecting from Group (II) consisting of cyclic carbonate compounds having fluorine atom, monofluorophosphate salts, difluorophosphate salts, borate salts, fluorosulfonate salts, compounds having $SO_2$ group, compounds having cyano group, compounds having isocyanate group, oxalate salts, Si-containing compounds and aromatic compounds not represented by General Formula (1).

The nonaqueous electrolyte solution of the present invention may contain only one kind of Group (II) compound, or may contain two or more kinds. The content of the Group (II) compound (total content when there are two or more kinds) in the nonaqueous electrolyte solution is in the range of at least 0.001 mass %, or preferably at least 0.01 mass %, or more preferably at least 0.1 mass %, or still more preferably at least 0.3 mass %, or especially at least 0.5 mass %, and is normally 20 mass % or less, or preferably 10 mass % or less, or more preferably 5 mass % or less, or still more preferably 3 mass % or less, or especially 1 mass % or less. If the concentration is too low, the chemical and physical stability of the film may be insufficient, while if the concentration is too high, the insulating properties of the film are greater, and the discharge capacity may be decreased due to increased resistance. When the content of the Group (II) compound is within the aforementioned range, it is more likely to act synergistically with the Group (I) compound, allowing reductive decomposition reactions of the nonaqueous solvent during charging to be controlled at a lower level, and leading to improved durability performance during high-temperature storage, overcharge characteristics and other battery characteristics, improved charge-discharge efficiency of the battery, and improved charge-discharge characteristics at high current densities.

The method of compounding the Group (II) compound in the electrolyte solution is not particularly limited, but examples include methods in which a Group (II) compound synthesized by known methods is added directly to the electrolyte solution, and methods in which a Group (II) compound is produced inside the battery or in the electrolyte solution. The method of producing the Group (II) compound may be a method of adding a compound other than the Group (II) compound, and producing the Group (II) compound by oxidation, hydrolysis or the like of the electrolyte solution and other battery components. Another method is to first prepare the battery and then produce the compound by application of an electrical load such as charge and discharge.

1-2-1. Cyclic Carbonate Compound Having a Fluorine Atom

The cyclic carbonate having a fluorine atom (hereafter may be referred to as "fluorinated cyclic carbonate") is not particularly limited, so long as it is a cyclic carbonate that has a fluorine atom.

Examples of fluorinated cyclic carbonates include, for instance, fluorinated products of cyclic carbonates having a $C_{2-6}$ alkylene group and their derivatives, for instance fluorinated products of ethylene carbonate (hereafter may be referred to as "fluorinated ethylene carbonate") and their derivatives. Examples of derivatives of fluorinated products of ethylene carbonate include, for instance, fluorinated products of ethylene carbonate that is substituted with an alkyl group (for instance, a $C_{1-4}$ alkyl group). Of these, ethylene carbonates having 1 to 8 fluorine atom and derivatives of these are preferred.

Specific examples include, for instance, monofluoroethylene carbonate, 4,4-difluoroethylene carbonate, 4,5-difluoroethylene carbonate, 4-fluoro-4-methylethylene carbonate, 4,5-difluoro-4-methylethylene carbonate, 4-fluoro-5-methylethylene carbonate, 4,4-difluoro-5-methylethylene carbonate, 4-(fluoromethyl)-ethylene carbonate, 4-(difluoromethyl)-ethylene carbonate, 4-(trifluoromethyl)-ethylene carbonate, 4-(fluoromethyl)-4-fluoroethylene carbonate, 4-(fluoromethyl)-5-fluoroethylene carbonate, 4-fluoro-4,5-dimethylethylene carbonate, 4,5-difluoro-4,5-dimethylethylene carbonate, 4,4-difluoro-5,5-dimethylethylene carbonate and the like.

More preferably, there is used at least one compound selected from the group consisting of monofluoroethylene carbonate, 4,4-difluoroethylene carbonate, and 4,5-difluoroethylene carbonate, in terms of imparting high ionic conductivity and forming an appropriate interface protective coating.

These fluorinated cyclic carbonates may be used singly as one type, or as two or more concurrent types in any combinations and ratios.

In the nonaqueous electrolyte solution of the present invention, the Group (I) compound above and the cyclic carbonate compound having a fluorine atom form a composite film on the negative electrode. In order for this film to be formed properly, the mass compounding ratio of the Group (I) compound and the fluorinated cyclic carbonate is preferably 0.4:100 to 100:100, or more preferably 1:100 to 50:100, or still more preferably 1.4:100 to 35:100. Within this range, side reactions of the various additives on the positive and negative electrodes can be efficiently suppressed, resulting in improved battery characteristics.

As the fluorinated cyclic carbonate, there is preferably used a cyclic carbonate having an unsaturated bond and a fluorine atom (hereafter may be referred to as "fluorinated unsaturated cyclic carbonate"). The number of fluorine atoms in the fluorinated unsaturated cyclic carbonate is not particularly limited, so long as it is 1 or more. The number of fluorine atoms is ordinarily 6 or fewer, preferably 4 or fewer and most preferably 1 or 2.

Examples of the fluorinated unsaturated cyclic carbonate include, for instance, a fluorinated vinylene carbonate derivative and a fluorinated ethylene carbonate derivative substituted with an aromatic ring or with a substituent having a carbon-carbon double bond.

Examples of the fluorinated vinylene carbonate derivatives include, for instance, 4-fluorovinylene carbonate, 4-fluoro-5-methylvinylene carbonate, 4-fluoro-5-phenylvinylene carbonate, 4-allyl-5-fluorovinylene carbonate, 4-fluoro-5-vinylvinylene carbonate and the like.

Examples of the fluorinated ethylene carbonate derivatives substituted with an aromatic ring or with a substituent having a carbon-carbon double bond include, for instance, 4-fluoro-4-vinylethylene carbonate, 4-fluoro-4-allylethylene carbonate, 4-fluoro-5-vinylethylene carbonate, 4-fluoro-5-allylethylene carbonate, 4,4-difluoro-4-vinylethylene carbonate, 4,4-difluoro-4-allylethylene carbonate, 4,5-difluoro-4-vinylethylene carbonate, 4,5-difluoro-4-allylethylene carbonate, 4-fluoro-4,5-divinylethylene carbonate, 4-fluoro-4,5-diallylethylene carbonate, 4,5-difluoro-4,5-divinylethylene carbonate, 4,5-difluoro-4,5-diallylethylene carbonate, 4-fluoro-4-phenylethylene carbonate, 4-fluoro-5-phenylethylene carbonate, 4,4-difluoro-5-phenylethylene carbonate, 4,5-difluoro-4-phenylethylene carbonate and the like.

Examples of particularly preferred fluorinated unsaturated cyclic carbonates that can be used concomitantly with the compound of group (I) include, for instance, 4-fluorovinylene carbonate, 4-fluoro-5-methylvinylene carbonate, 4-fluoro-5-vinylvinylene carbonate, 4-allyl-5-fluorovinylene carbonate, 4-fluoro-4-vinylethylene carbonate, 4-fluoro-4-allylethylene carbonate, 4-fluoro-5-vinylethylene carbonate, 4-fluoro-5-allylethylene carbonate, 4,4-difluoro-4-vinylethylene carbonate, 4,4-difluoro-4-allylethylene carbonate, 4,5-difluoro-4-vinylethylene carbonate, 4,5-difluoro-4-allylethylene carbonate, 4-fluoro-4,5-divinylethylene carbonate, 4-fluoro-4,5-diallylethylene carbonate, 4,5-difluoro-4,5-divinylethylene carbonate, and 4,5-difluoro-4,5-diallylethylene carbonate. Using the foregoing is more appropriate, since they form a stable interface protective coating.

The molecular weight of the fluorinated unsaturated cyclic carbonate is not particularly limited, and may be any molecular weight, so long as the effect of the present invention is not significantly impaired thereby. Preferably, the molecular weight is 50 or greater, and 250 or smaller. Within this range, the solubility of the fluorinated cyclic carbonate towards the nonaqueous electrolyte solution can be readily secured, and the effect of the present invention is readily brought out.

The method for producing the fluorinated unsaturated cyclic carbonate is not particularly limited, and the fluorinated unsaturated cyclic carbonate may be produced in accordance with an arbitrarily selected known method. The molecular weight is more preferably 100 or greater, and more preferably 200 or smaller.

These fluorinated unsaturated cyclic carbonates may be used singly as one type, or as two or more concurrent types in any combinations and ratios.

1-2-2. Monofluorophosphate Salt, Difluorophosphate Salt

The types of the monofluorophosphate salt and difluorophosphate salt used in the present invention are not particularly limited as long as they are salts having at least one monofluorophosphate structure and difluorophosphate structure in the molecule.

The countercations of the monofluorophosphate salt and difluorophosphate salt are not particularly limited, but examples include lithium, sodium, potassium, magnesium, calcium, ammonium represented by $NR^{11}R^{12}R^{13}R^{14}$ (in which each of $R^{11}$ to $R^{14}$ independently represents a hydrogen atom or $C_{1-12}$ organic group) and the like.

The $C_{1-12}$ organic groups represented by $R^{11}$ to $R^{14}$ in the ammonium above are not particularly limited, and examples include alkyl groups optionally substituted with halogen atoms, cycloalkyl groups optionally substituted with halogen atoms or alkyl groups, aryl groups optionally substituted with halogen atoms or alkyl groups, and optionally substituted heterocyclic groups containing nitrogen atoms and the like. Of these, it is desirable that each of $R^{11}$ to $R^{14}$ independently represent a hydrogen atom, alkyl group, cycloalkyl group or heterocyclic group containing a nitrogen atom.

Specific examples of the monofluorophosphate salt and difluorophosphate salt include lithium monofluorophosphate, sodium monofluorophosphate, potassium monofluorophosphate, lithium difluorophosphate, sodium difluorophosphate, potassium difluorophosphate and the like. Lithium monofluorophosphate and lithium difluorophosphate are preferred, and lithium difluorophosphate is more preferred.

These monofluorophosphates and difluorophosphates may be used singly as one type, or as two or more concurrent types in any combinations and ratios.

1-2-3. Borate Salt

The type of the borate salt used in the present invention is not particularly limited as long as it is a salt having at least one boron atom in the molecule.

The borate salt is preferably a Li borate salt, and examples include $LiBF_4$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$, $LiBF_2(C_2F_5SO_2)_2$ and other lithium salts containing boric acid.

Of these, $LiBF_4$ is especially effective for improving the output characteristics, high-rate charge-discharge characteristics, high-temperature storage characteristics, cycle characteristics and the like.

These borates may be used singly as one type, or as two or more concurrent types in any combinations and ratios.

1-2-4. Fluorosulfonate Salt

The type of the fluorosulfonate salt used in the present invention is not particularly limited as long as it is a salt having at least one fluorosulfonic acid structure in the molecule.

The counteraction of the fluorosulfonate salt is not particularly limited, but examples include lithium, sodium, potassium, rubidium, cesium, magnesium, calcium, barium, and ammonium represented by $NR^{11}R^{12}R^{13}R^{14}$ (in which each of $R^{11}$ to $R^{14}$ independently represents a hydrogen atom or $C_{1-12}$ organic group) and the like.

The $C_{1-12}$ organic groups represented by $R^{11}$ to $R^{14}$ in the ammonium above are not particularly limited, and examples include alkyl groups optionally substituted with halogen atoms, cycloalkyl groups optionally substituted with halogen atoms or alkyl groups, aryl groups optionally substituted with halogen atoms or alkyl groups, and optionally substituted heterocyclic groups containing nitrogen atoms and the like. Of these, it is desirable that each of $R^{11}$ to $R^{14}$ independently represent a hydrogen atom, alkyl group, cycloalkyl group or heterocyclic group containing a nitrogen atom.

Specific examples of fluorosulfonate salts include lithium fluorosulfonate, sodium fluorosulfonate, potassium fluorosulfonate, rubidium fluorosulfonate, cesium fluorosulfonate and the like, and lithium fluorosulfonate is preferred.

These fluorosulfonates may be used singly as one type, or as two or more concurrent types in any combinations and ratios.

1-2-5. Compound Having $SO_2$ Group

The type of the compound having a $SO_2$ group is not particularly limited as long as it is a compound having a $SO_2$ group in the molecule, but preferably it is at least one kind of compound selected from the group consisting of the chain sulfonic acid esters, cyclic sulfonic acid esters, chain sulfuric acid esters, cyclic sulfuric acid esters, chain sulfurous acid esters and cyclic sulfurous acid esters.

Of these, a cyclic sulfonic acid ester, cyclic sulfuric acid ester, cyclic sulfurous acid ester or other cyclic compound is preferred, a cyclic sulfonic acid ester or cyclic sulfuric acid ester is more preferred, and a cyclic sulfonic acid ester is especially preferred.

The following are specific examples of compounds having $SO_2$ group.

(Chain Sulfonic Acid Esters)

Methyl fluorosulfonate, ethyl fluorosulfonate and other fluorosulfonic acid esters;

Methyl methanesulfonate, ethyl methanesulfonate, 2-propynyl methanesulfonate, 3-butynyl methansulfonate, busulfan, methyl 2-(methanesulfonyloxy)propionate, ethyl 2-(methanesulfonyloxy)propionate, 2-propynyl 2-(methanesulfonyloxy)propionate, 3-butynyl 2-(methanesulfonyloxy) propionate, methyl methanesulfonyloxyacetate, ethyl methanesulfonyloxyacetate, 2-propynyl methane sulfonyloxyacetate, 3-butynyl methanesulfonyloxyacetate and other methanesulfonic acid esters;

Methyl vinylsulfonate, ethyl vinylsulfonate, allyl vinylsulfonate, propargyl vinylsulfonate, methyl allylsulfonate, ethyl allylsulfonate, allyl allylsulfonate, propargyl allylsulfonate, 1,2-bis(vinylsulfonyloxy)ethane and other alkenyl sulfonic acid esters.

(Cyclic Sulfonic Acid Esters)

1,3-propane sultone, 1-fluoro-1,3-propane sultone, 2-fluoro-1,3-propane sultone, 3-fluoro-1,3-propane sultone, 1-methyl-1,3-propane sultone, 2-methyl-1,3-propane sultone, 3-methyl-1,3-propane sultone, 1-propene-1,3-sultone, 2-propene-1,3-sultone, 1-fluoro-1-propene-1,3-sultone, 2-fluoro-1-propene-1,3-sultone, 3-fluoro-1-propene-1,3-sultone, 1-fluoro-2-propene-1,3-sultone, 2-fluoro-2-propene-1,3-sultone, 3-fluoro-2-propene-1,3-sultone, 1-methyl-1-propene-1,3-sultone, 2-methyl-1-propene-1,3-sultone, 3-methyl-1-propene-1,3-sultone, 1-methyl-2-propene-1,3-sultone, 2-methyl-2-propene-1,3-sultone, 3-methyl-2-propene-1,3-sultone, 1,4-butane sultone, 1,5-pentane sultone and other sultone compounds;

Methylene methane disulfonate, ethylene methane disulfonate and other disulfonate compounds;

1,2,3-oxathiazolidine-2,2-dioxide, 3-methyl-1,2,3-oxathiazolidine-2,2-dioxide, 3H-1,2,3-oxathiazole-2,2-dioxide, 5H-1,2,3-oxathiazole-2,2-dioxide, 1,2,4-oxathiazolidine-2,2-dioxide, 1,2,5-oxathiazolidine-2,2-dioxide, 1,2,3-oxathiazinan-2,2-dioxide, 3-methyl-1,2,3-oxathiazinan-2,2-dioxide, 5,6-dihydro-1,2,3-oxathiazine-2,2-dioxide, 1,2,4-oxathiazinan-2,2-dioxide and other nitrogen-containing compounds.

1,2,3-oxathiaphoslane-2,2-dioxide, 3-methyl-1,2,3-oxathiaphoslane-2,2-dioxide, 3-methyl-1,2,3-oxathiaphoslane-2,2,3-trioxide, 3-methoxy-1,2,3-oxathiaphoslane-2,2,3-trioxide, 1,2,4-oxathiaphoslane-2,2-dioxide, 1,2,5-oxathiaphoslane-2,2-dioxide, 1,2,3-oxathiaphosphinane-2,2-dioxide, 3-methyl-1,2,3-oxathiaphosphinane-2,2-dioxide, 3-methyl-1,2,3-oxathiaphosphinane-2,2,3-trioxide, 3-methoxy-1,2,3-oxathiaphosphinane-2,2,3-trioxide, 1,2,4-oxathiaphosphinane-2,2-dioxide, 1,2,5-oxathiaphosphinane-2,2-dioxide, 1,2,6-oxathiaphosphinane-2,2-dioxide and other phosphorus-containing compounds.

(Chain Sulfuric Acid Esters)

Dimethyl sulfate, ethylmethyl sulfate, diethyl sulfate and other dialkyl sulfate compounds.

(Cyclic Sulfuric Acid Esters)

1,2-ethylene sulfate, 1,2-propylene sulfate, 1,3-propylene sulfate, 1,2-butylene sulfate, 1,3-butylene sulfate, 1,4-butylene sulfate, 1,2-pentylene sulfate, 1,3-pentylene sulfate, 1,4-pentylene sulfate, 1,5-pentylene sulfate and other alkylene sulfate compounds.

(Chain Sulfurous Acid Esters)

Dimethyl sulfite, ethylmethyl sulfite, diethyl sulfite and other dialkyl sulfite compounds.

(Cyclic Sulfurous Acid Esters)

1,2-ethylene sulfite, 1,2-propylene sulfite, 1,3-propylene sulfite, 1,2-butylene sulfite, 1,3-butylene sulfite, 1,4-butylene sulfite, 1,2-pentylene sulfite, 1,3-pentylene sulfite, 1,4-pentylene sulfite, 1,5-pentylene sulfite and other alkylene sulfite compounds.

Of these, 1,3-propane sultone, 1-propene-1,3-sultone, 1,4-butane sultone, methylene methane disulfonate, ethylene methane disulfonate, 1,2-ethylene sulfate, 1,2-ethylene sulfite, methyl methanesulfonate and ethyl methanesulfonate are desirable for improving the storage characteristics, and 1,3-propanes sultone is more desirable.

These cyclic sulfonic acid esters may be used singly as one type, or as two or more concurrent types in any combinations and ratios.

1-2-6. Compound Having a Cyano Group

The type of compound having a cyano group is not particularly limited, so long as it is a compound that has a cyano group in the molecule, but is preferably a compound having at least two cyano groups.

Specific examples of the compound having a cyano group include, for instance:

compounds having one cyano group, such as acetonitrile, propionitrile, butyronitrile, isobutyronitrile, valeronitrile, isovaleronitrile, lauronitrile, 2-methylbutyronitrile, trimethylacetonitrile, hexanenitrile, cyclopentanecarbonitrile, cyclohexanecarbonitrile, acrylonitrile, methacrylonitrile, crotononitrile, 3-methylcrotononitrile, 2-methyl-2-butenenitrile, 2-pentenenitrile, 2-methyl-2-pentenenitrile, 3-methyl-2-pentenenitrile, 2-hexenenitrile, fluoroacetonitrile, difluoroacetonitrile, trifluoroacetonitrile, 2-fluoropropionitrile, 3-fluoropropionitrile, 2,2-difluoropropionitrile, 2,3-difluoropropionitrile, 3,3-difluoropropionitrile, 2,2,3-trifluoropropionitrile, 3,3,3-trifluoropropionitrile, 3,3'-oxydipropionitrile, 3,3'-thiodipropionitrile, 1,2,3-propanetricarbonitrile, 1,3,5-pentanetricarbonitrile, and pentafluoropropionitrile;

Malononitrile, succinonitrile, glutaronitrile, adiponitrile, pimelonitrile, suberonitrile, azelanitrile, sebaconitrile, undecanedinitrile, dodecanedinitrile, methyl malononitrile, ethyl malononitrile, isopropyl malononitrile, tert-butyl malononitrile, methyl succinonitrile, 2,2-dimethyl succinonitrile, 2,3-dimethyl succinonitrile, 2,3,3-trimethyl succinonitrile, 2,2,3,3-tetramethyl succinonitrile, 2,3-diethyl-2,3-dimethyl succinonitrile, 2,2-diethyl-3,3-dimethyl succinonitrile, bicyclohexyl-1,1-dicarbonitrile, bicyclhexyl-2,2-dicarbonitrile, bicyclohexyl-3,3-dicarbonitrile, 2,5-dimethyl-2,5-hexane dicarbonitrile, 2,3-diisobutyl-2,3-dimethyl succinontrile, 2,2-diisobutyl-3,3-dimethyl succinontrile, 2-methyl glutaronitrile, 2,3-dimethyl glutaronitrile, 2,4-dimethyl glutarontrile, 2,2,3,3-tetramethyl glutaronitrile, 2,2,4,4-tetramethyl glutarontrile, 2,2,3,4-tetramethyl glutaronitrile, 2,3,3,4-tetramethyl glutaronitrile, maleonitrile, fumarontrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,3'-(ethylenedioxy)dipropiontrile, 3,3'-(ethylenedithio)dipropionitrile, 3,9-bis(2-cyanoethyl)-2,4,8,10-tetraoxaspyro[5,5] undecane and other compounds having 2 cyano groups; and Cyclohexane tricarbonitrile, tris(cyanoethyl)amine, tris (cyanoethoxy)propane, tricyanoethylene, pentane tricarbonitrile, propane tricarbonitrile, heptane tricarbonitrile and other compounds having 3 cyano groups and the like.

Of these, lauronitrile, crotononitrile, succinonitrile, glutaronitrile, adiponitrile, pimelonitrile, suberonitrile, azelanitrile, sebaconitrile, undecanedinitrile, dodecanedinitrile, fumaronitrile, 2-methyl glutaronitrile or 3,9-bis(2-cyanoethyl)-2,4,8-10-tetraoxaspyro[5,5]undecane is desirable for improving the storage characteristics. A dinitrile compound such as succinonitrile, glutaronitrile, adiponitrile, pimelonitrile, suberonitrile, azelanitrile, sebaconitrile, 2-methyl glutaronitrile or 3,9-bis(2-cyanoethyl)-2,4,8,10-tetraoxaspyro [5,5]undecane is more desirable.

These compounds having a cyano group may be used singly as one type, or as two or more concurrent types in any combinations and ratios.

1-2-7. Compound Having an Isocyanate Group

The type of compound having an isocyanate group is not particularly limited, so long as the compound has an isocyanate group in the molecule, but is preferably a compound having at least two isocyanate groups.

Specific examples of compounds having isocyanate group include methyl isocyanate, ethyl isocyanate, propyl isocyanate, isopropyl isocyanate, butyl isocyanate, tert-butyl isocyanate, pentyl isocyanate, hexyl isocyanate, cyclohexyl isocyanate, vinyl isocyanate, allyl isocyanate, ethynyl isocyanate, propynyl isocyanate, phenyl isocyanate, fluorophenyl isocyanate and other monoisocyanate compounds; and Monomethylene diisocyanate, dimethylene diiosocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, dodecamethylene diisocyanate, 2,2,4-trimethyl hexamethylene diisocyanate, 2,4,4-trimethyl hexamethylene diisocyanate, 1,2-bis(isocyanotomethyl)cyclohexane, 1,3-bis(isocyanatomethyl)cyclohexane, 1,4-bis(isocyanatomethyl)cyclohexane, 1,2-diisocyanatocyclohexane, 1,3-diisocyanatocyclohexane, 1,4-diisocyanatocyclohexane, dicyclohexylmethane-1,1'-diisocyanate, dicyclohexylmethane-2,2'-diisocyanate, dicyclohexylmethane-3,3'-diisocyanate, dicyclohexylmethane-4,4'-diisocyanate, bicyclo[2.2.1]heptane-2,5-diylbis (methylisocyanate), bicyclo[2.2.1]heptane-2,6-diylbis (methylisocyanate), isophorone diisocyanate, diisocyanatobutene, diisocyanatopentene, diisocyanatohexene, phenylisocyanate, toluene diisocyanate, xylene diisocyanate, tolylene diisocyanate, carbonyl diisocyanate, 1,4-diisocyanatobutane-1,4-dione, 1,5-diisocyanatopentane-1,5-dione and other diisocyanate compounds and the like.

Of these, monomethylene diisocyanate, dimethylene diisocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, dodecamethylene diisocyanate, 1,3-bis(isocyanatomethyl)cyclohexane, dicyclohexylmethane-4,4'-diisocyanate, bicyclo[2.2.1]heptane-2,5-diylbis(methylisocyanate), bicyclo[2.2.1]heptane-2,6-diylbis(methylisocyanate), isophorone diisocyanate, 2,2,4-trimethyl hexamethylene diisocyanate, 2,4,4-trimethyl hexamethylene diisocyanate and other diisocyanate compounds are preferred for improving the storage characteristics, and 1,3-bis(isocyanatomethyl) cyclohexane, bicyclo[2.2.1]heptane-2,5-diylbis(methylisocyanate), and bicyclo[2.2.1]heptane-2,6-diylbis(methylisocyanate) are more preferred.

The compound having an isocyanate group used in the present invention may also be a trimeric compound derived from a compound having at least two isocyanate groups in the molecule, or an aliphatic polyisocyanate obtained by adding a polyvalent alcohol to such a compound. Examples include biuret isocyanurate adducts having the basic structures shown by Formulae (4-1) to (4-4) below, and bifunctional-type denatured polyisocyanates and the like (in Formulae (4-1) to (4-4) below, each of R and R' independently represents any hydrocarbon group).

[C5]

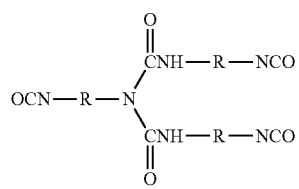

(4-1)

[C6]

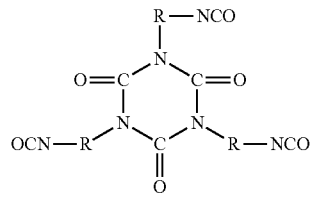

(4-2)

[C7]

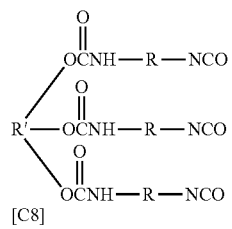

(4-3)

[C8]

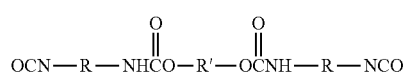

(4-4)

The compound having at least two isocyanate groups in the molecule used in the present invention also includes so-called block isocyanates, the storage stability of which has been increased by blocking with a blocking agent. Examples of blocking agents include alcohols, phenols, organic amines, oximes, lactams and the like, and specific examples include n-butanol, phenol, tributylamine, diethyl ethanolamine, methyl ethyl ketoxime, ε-captolactam and the like.

In order to obtain a greater effect by promoting a reaction based on a compound having an isocyanate, it is desirable to also use a metal catalyst such as dibutyl tin dilaurate, or an amine catalyst such as 1,8-diazabicyclo[5.4.0]undecene-7 or the like.

These compounds having an isocyanate group may be used singly as one type, or as two or more concurrent types in any combinations and ratios.

1-2-8. Oxalate

The type of oxalate used in the present invention is not particularly limited, so long as it is a compound that has at least one oxalate structure in the molecule, but is preferably a metal salt represented by formula (2) below.

[C9]

(In General Formula (2), $M^1$ is an element selected from the Group 1 and Group 2 elements of the periodic table and aluminum (Al), $M^2$ is a transition metal or an element selected from the Group 13, Group 14 and Group 15 elements of the periodic table, R is a halogen or a group selected from $C_{1-11}$ alkyl groups and $C_{1-11}$ halogen-substituted alkyl groups, a and b are positive integers, c is 0 or a positive integer, and d is an integer from 1 to 3.)

The metal salt represented by General Formula (2) is a salt having an oxalate complex as an anion. In the formula, $M^1$ is preferably lithium, sodium, potassium, magnesium or calcium from the standpoint of the battery characteristics when used in a lithium secondary battery, and lithium is especially preferred. Boron and phosphorus are especially desirable for $M^2$ from the standpoint of electrochemical stability when used in a lithium secondary battery. Specific examples of R include fluorine and chlorine and methyl, trifluoromethyl, ethyl, pentafluoroethyl, propyl, isopropyl, butyl, sec-butyl and t-butyl groups and the like. Of these, fluorine or a trifluoromethyl group is especially preferred.

The following compounds are specific examples of the metal salt represented by General Formula (2).

Lithium oxalatoborate salts such as lithium difluorooxalatoborate and lithium bis(oxalate)borate; and lithium oxalatophosphate salts such as lithium tetrafluorooxalatophosphate, lithium difluorobis(oxalate)phosphate, and lithium tris(oxalate)phosphate.

Preferred among the foregoing are lithium bis(oxalato)borate and lithium difluorobis(oxalato)phosphate, and more preferred is lithium bis(oxalato)borate.

These metal salts represented by General Formula (2) may be used singly as one type, or as two or more concurrent types in any combinations and ratios.

1-2-9 Si-containing compound

The type of Si-containing compound used in the present invention is not particularly limited, so long as it is a compound that has at least one Si atom in the molecule, but is preferably a compound represented by General Formula (3) below.

[C10]

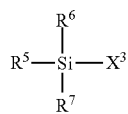

(In general Formula (3), $R^5$, $R^6$ and $R^7$ represent hydrogen atoms, halogen atoms or hydrocarbon groups with 10 or fewer carbon atoms, and $X^3$ is an organic group containing at least one atom selected from the group consisting of oxygen, nitrogen and silicon atoms.)

Specific examples of hydrocarbon groups are as given for $R^1$ in General Formula (1). $R^5$, $R^6$ and $R^7$ are preferably hydrogen or fluorine atoms or methyl, ethyl, n-propyl, i-propyl, n-butyl, sec-butyl, i-butyl, tert-butyl or phenyl groups, and are more preferably methyl groups.

$X^3$ is an organic group containing at least one atom selected from the group consisting of oxygen, nitrogen and silicon atoms, and is preferably an organic group containing at least an oxygen atom or silicon atom.

Here, an organic group refers to a group comprising one or more atoms selected from the group consisting of carbon atoms, hydrogen atoms, nitrogen atoms, oxygen atoms, silicon atoms, sulfur atoms, phosphorus atoms and halogen atoms. Specific examples include univalent organic groups such as alkyl, alkenyl, alkynyl, aryl, alkoxy, CN, isocyanate, fluoro, alkylsulfonic acid and trialkylsilyl groups and the like, bivalent organic groups such as alkylene, alkenylene, alkynylene, arylene, ether, carbonate, carbonyl, sulfonyl and sulfuric acid groups and the like, trivalent organic groups such as hydrocarbon, boric acid, phosphoryl, phosphanetriyl, phosphoric acid and phosphorous acid groups, and tetravalent organic groups such as hydrocarbon groups (which may contain no hydrogen) and the like. Part of a univalent organic group may be substituted with a halogen atom, and part of a bivalent, trivalent or tetravalent organic group may be substituted with or bound to a halogen atom. The number of carbon atoms in an organic group is ordinarily 1 or greater, preferably 3 or greater, more preferably 5 or greater, and ordinarily 15 or smaller, preferably 12 or smaller, more preferably 8 or smaller. Of these, an alkylsulfonic acid group, trialkylsilyl group, boric acid group, phosphoric acid group or phosphorous acid group is preferred.

The following compounds are specific examples of Si-containing compounds.

Tris(trimethylsilyl) borate, tris(trimethoxysilyl) borate, tris(triethylsilyl) borate, tris(triethoxysilyl) borate, tris(dimethylvinylsilyl) borate, tris(diethylvinylsilyl) borate and other boric acid compounds;

Tris(trimethylsilyl) phosphate, tris(triethylsilyl) phosphate, tris(tripropylsilyl) phosphate, tris(triphenylsilyl) phosphate, tris(trimethoxysilyl) phosphate, tris(triethoxysilyl) phosphate, tris(triphenoxysilyl) phosphate, tris(dimethylvinylsilyl) phosphate, tris(diethylvinylsilyl) phosphate and other phosphoric acid compounds;

Tris(trimethylsilyl) phosphite, tris(triethylsilyl) phosphite, tris(tripropylsilyl) phosphite, tris(triphenylsilyl) phosphite, tris(trimethoxysilyl) phosphite, tris(triethoxysilyl) phosphite, tris(triphenoxysilyl) phosphite, tris(dimethylvinylsilyl) phosphite, tris(diethylvinylsilyl) phosphite and other phosphorous acid compounds;

Trimethylsilyl methanesulfonate, trimethylsilyl tetrafluoromethanesulfonate and other sulfonic acid compounds;

Hexamethyl disilane, hexaethyl disilane, 1,1,2,2-tetramethyl disilane, 1,1,2,2-tetraethyl disilane, 1,2-diphenyl tetramethyl disilane, 1,1,2,2-tetraphenyl disilane and other disilane compounds and the like.

Of these, tris(trimethylsilyl) borate, tris(trimethylsilyl) phosphate, tris(trimethylsilyl) phosphite, trimethylsilyl methanesulfonate, trimethylsilyl tetrafluoromethanesulfonate, hexamethyl disilane, hexaethyl disilane, 1,2-diphenyl tetramethyl disilane and 1,1,2,2-tetraphenyl disilane are preferred, and tris(trimethylsilyl) borate, tris(trimethylsilyl) phosphate, tris(trimethylsilyl) phosphite and hexamethyl disilane are more preferred.

These Si-containing compounds may be used singly as one type, or as two or more concurrent types in any combinations and ratios.

1-2-10. Aromatic Compound not Represented by General Formula (1)

The type of the aromatic compound not represented by General Formula (1) used in the present invention is not limited as long as it is a compound other than the aromatic compound represented by General Formula (1), but preferably it is an aromatic ether compound, aromatic ester compound, halogenated aromatic compound or aromatic hydrocarbon compound, and more preferably it is a halogenated aromatic compound or aromatic hydrocarbon compound.

The following are specific examples of the aromatic compound not represented by General Formula (1).

Benzene, biphenyl, 2-methyl biphenyl, 2-ethyl biphenyl, terphenyl, terphenyl partial hydride, cyclopentyl benzene, cyclohexyl benzene, cis-1-propyl-4-phenyl cyclohexane, trans-1-propyl-4-phenyl cyclohexane, cis-1-butyl-4-phenyl cyclohexane, trans-1-butyl-4-phenyl cyclohexane, diphenyl cyclohexane, toluene, xylene, ethyl benzene, propyl benzene, butyl benzene, t-butyl benzene, t-amyl benzene and other aromatic hydrocarbon compounds; diphenyl ether, dibenzofuran and other aromatic ether compounds; phenyl acetate, benzyl acetate, diphenyl carbonate, methyl phenyl carbonate, 2-t-butyl phenylmethyl carbonate, 4-t-butyl phenylmethyl carbonate, methyl phenyl sulfonate, ethyl phenyl sulfonate, diphenyl sulfonate, 2-t-butyl phenylmethyl sulfonate, 4-t-butyl phenylmethyl sulfonate, cyclohexyl phenylmethyl sulfonate, triphenyl phosphate, tris(2-5-butylphenyl) phosphate, tris(3-t-butylphenyl) phosphate, tris(4-t-butylphenyl) phosphate, tris(2-t-amylphenyl) phosphate, tris(3-t-amylphenyl) phosphate, tris(4-t-amylphenyl) phosphate, tris(2-cyclohexylphenyl) phosphate, tris(3-cyclohexylphenyl) phosphate, tris(4-cyclohexylphenyl) phosphate and other aromatic ester compounds; fluorobenzene, 2-fluorotoluene, 3-fluorotoluene, 4-fluorotoluene, trifluoromethyl benzene, 2-fluorophenyl acetate, 4-fluorophenyl acetate, 2-fluorobiphenyl, 3-fluorobiphenyl, 4-fluorobiphenyl, 4,4'-difluorobiphenyl 2,4-difluorobiphenyl, o-cyclohexyl fluorobenzene, p-cyclohexyl fluorobenzene and other partial fluorides of the aforementioned aromatic compounds; and 2,4-difluoroanisole, 2,5-difluoroanisole, 2,6-difluoroanisole, 3,5-difluoroanisole and other fluorine anisole compounds and the like.

Of these, biphenyl, terphenyl, terphenyl partial hydride, cyclohexyl benzene, cis-1-propyl-4-phenyl cyclohexane, trans-1-propyl-4-phenyl cyclohexane, cis-1-butyl-4-phenyl cyclohexane, trans-1-butyl-4-phenyl cyclohexane, toluene, ethyl benzene, t-butyl benzene, t-amyl benzene and other aromatic hydrocarbon compounds; diphenyl ether, dibenzofuran and other aromatic ether compounds; diphenyl carbonate, methyl phenyl carbonate, methyl phenyl sulfonate, diphenyl sulfonate, triphenyl phosphate, tris(4-t-butylphenyl) phosphate, tris(4-cyclohexylphenyl) phosphate and other aromatic ester compounds; and fluorobenzene, 2-fluorotoluene, 3-fluorotoluene, 4-fluorotoluene, 2-fluorobiphenyl, 3-fluorobiphenyl, 4-fluorobiphenyl, 4,4'-difluorpbiphenyl, o-cyclohexyl fluorobenzene, p-cyclohexyl fluorobenzene and other partial fluorides of the aforementioned aromatic compounds are preferred, biphenyl, terphenyl partial hydride, cyclohexyl benzene, cis-1-propyl-4-phenyl cyclohexane, trans-1-propyl-4-phenyl cyclohexane, cis-1-butyl-4-phenyl cyclohexane, trans-1-butyl-4-phenyl cyclohexane, t-butyl benzene, t-amyl benzene, toluene, diphenyl carbonate, methyl phenyl carbonate, methyl phenyl sulfonate, diphenyl sulfonate, triphenyl phosphate, tris(4-t-butylphenyl) phosphate, tris(4-cyclohexylphenyl) phosphate, o-cyclohexyl fluorobenzene, p-cyclohexyl fluorobenzene, fluorobenzene, 2-fluorotoluene, 3-fluorotoluene, 4-fluorotoluene and 2,4-difluoroanisole are more preferred, and biphenyl, cyclohexyl benzene, fluorobenzene, t-butyl benzene and t-amyl benzene are still more preferred.

These aromatic compounds not represented by General Formula (1) may be used singly as one type, or as two or more concurrent types in any combinations and ratios.

1-3. Electrolyte

The electrolyte is not particularly limited, and any known electrolyte can be used. A lithium salt is ordinarily used in the case of lithium secondary batteries.

Specific examples include $LiPF_6$, $LiClO_4$, $LiAlF_4$, $LiSbF_6$, $LiTaF_6$, $LiWF_7$ and other inorganic lithium salts; $LiWOF_5$ and other lithium tungstate; $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$, $CF_3CF_2CF_2CF_2CO_2Li$ and other lithium carbonate salts; $FSO_3Li$, $CH_3SO_3Li$, $CH_2FSO_3Li$, $CHF_2SO_3Li$, $CF_3SO_3Li$, $CF_3CF_2SO_3Li$, $CF_3CF_2CF_2SO_3Li$, $CF_3CF_2CF_2CF_2SO_3Li$ and other lithium sulfonate salts; $LiN(FCO)_2$, $LiN(FCO)(FSO_2)$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethane disulfonylimide, lithium cyclic 1,3-perfluoropropane disulfonylimide, $LiN(CF_3SO_2)(C_4F_9SO_2)$ and other lithium imide salts; $LiC(FSO_2)_3$, $LiC(CF_3SO_2)_3$, $LiC(C_2F_5SO_2)_3$ and other lithium methide salts; lithium bis(maronato) borate, lithium difluoro(maronato) borate and other lithium (maronato) borate salts; lithium tris(maronato) phosphate, lithium difluorobis(maronato) phosphate, lithium tetrafluoro(maronato) phosphate and other lithium (maronato) phosphate salts; and $LiPF_4(CF_3)_2$, $LiPF_4(C_2F_5)_2$, $LiPF_4(CF_3SO_2)_2$, $LiPF_4(C_2F_5SO_2)_2$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$, $LiBF_2(C_2F_5SO_2)_2$ and other fluorine organic lithium salts and the like.

Of these, $LiPF_6$, $LiSbF_6$, $LiTaF_6$, $FSO_3Li$, $CF_3SO_3Li$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethane disulfonylimide, lithium cyclic 1,3-perfluoropropane disulfonylimide, $LiC(FSO_2)_3$, $LiC(CF_3SO_2)_3$, $LiC(C_2F_5SO_2)_3$, $LiBF_3CF_3$, $LiBF_3C_2F_5$, $LiPF_3(CF_3)_3$, $LiPF_3(C_2F_5)_3$ and the like are especially desirable for improving the output characteristics, high-rate charge-discharge characteristics, high-temperature storage characteristics, cycle characteristics and the like.

These electrolytes may be used singly or concomitantly in combinations of two or more types. When two or more are used together, desirable combinations include the combination of $LiPF_6$ and $LiN(CF_3SO_2)_2$ and the combination of $LiPF_6$ and $LiN(FSO_2)_2$, which have the effect of improving the load characteristics and cycle characteristics. In this case, the concentration of $LiN(CF_3SO_2)_2$ or $LiN(FSO_2)_2$ relative to 100 mass % of the nonaqueous electrolyte solution as a whole may be any that does not greatly detract from the effects of the invention, but is normally at least 0.01 mass %, or preferably at least 0.1 mass %, with an upper limit being normally 30 mass % or less, or preferably 20 mass % or less of the nonaqueous electrolyte solution of the present invention.

he concentration of these electrolytes in the nonaqueous electrolyte solution is not particularly limited, so long as the effect of the present invention is not impaired by the content of the electrolyte. However, the total molar concentration of lithium in the nonaqueous electrolyte solution is preferably 0.3 mol/L or higher, more preferably 0.4 mol/L or higher, and yet more preferably 0.5 mol/L or higher, and preferably 3 mol/L or lower, more preferably 2.5 mol/L or lower, and yet more preferably 2.0 mol/L or lower, in terms of securing the favorable electrical conductivity of the electrolyte solution to improve the battery performance. Within this range, it is easier to ensure good electrical conduction because there are not too few charge particles of lithium, and because the viscosity can be kept within a suitable range.

1-4. Nonaqueous Solvent

The nonaqueous solvent in the present invention is not particularly limited, and a known organic solvent may be used. Specific examples include cyclic carbonates not having a fluorine atom, linear carbonates, cyclic and linear carboxylates, ether compounds, sulfone compounds and the like.

These nonaqueous solvents do not include the Group (I) compounds and Group (II) compounds described above.

In the present Description, the volume of the nonaqueous solvent is a value measured at 25° C., but in the case of a solvent such as ethylene carbonate that is a solid at 25° C., it is the value measured at the melting point.

1-4-1. Cyclic Carbonate not Having a Fluorine Atom

Examples of cyclic carbonates not having a fluorine atom include, for instance, cyclic carbonates having a $C_{2-4}$ alkylene group.

Specific examples of cyclic carbonates having a $C_{2-4}$ alkylene group and not having a fluorine atom include, for instance, ethylene carbonate, propylene carbonate, butylene carbonate and the like. Particularly preferred among the foregoing are ethylene carbonate and propylene carbonate, in terms of enhancing battery characteristics as a result of an enhanced degree of dissociation of lithium ions.

The cyclic carbonates not having a fluorine atom may be used singly as one type, or as two or more concurrent types in any combinations and ratios.

The blending amount of the cyclic carbonate not having a fluorine atom is not particularly limited, and may be any blending amount so long as the effect of the present invention is not significantly impaired thereby. In a case where one type of cyclic carbonate not having a fluorine atom is used singly, the blending amount is 5 volt or more, and more preferably 10 vol % or more, with respect to 100 vol % of nonaqueous solvent. Through setting of this range, drops in electrical conductivity derived from decreased permittivity of the nonaqueous electrolyte solution are readily avoided, and the large-current discharge characteristic, stability towards the negative electrode and cycle characteristic of the nonaqueous electrolyte battery are readily brought to within good ranges. The blending amount is 95 vol % or less, more preferably 90 volt or less, and yet more preferably 85 volt or less. By setting these ranges, the viscosity of the nonaqueous electrolyte solution is brought to within an appropriate range and drops in ion conductance are suppressed; accordingly, the load characteristic of the nonaqueous electrolyte battery is readily brought to within a good range.

1-4-2. Linear Carbonate

The linear carbonate is preferably a $C_{3-7}$ linear carbonate and more preferably a $C_{3-7}$ dialkyl carbonate.

Specific examples of the linear carbonates include, for instance, dimethyl carbonate, diethyl carbonate, di-n-propyl carbonate, diisopropyl carbonate, n-propylisopropyl carbonate, ethyl methyl carbonate, methyl-n-propyl carbonate, n-butyl methyl carbonate, isobutyl methyl carbonate, t-butyl methyl carbonate, ethyl-n-propyl carbonate, n-butylethyl carbonate, isobutylethyl carbonate, t-butylethyl carbonate and the like.

Preferred among the foregoing are dimethyl carbonate, diethyl carbonate, di-n-propyl carbonate, diisopropyl carbonate, n-propylisopropyl carbonate, ethyl methyl carbonate and methyl-n-propyl carbonate, and particularly preferably, dimethyl carbonate, diethyl carbonate and ethyl methyl carbonate.

Linear carbonates having a fluorine atom (hereafter may be referred to as "fluorinated linear carbonate") may also be used appropriately.

The number of fluorine atoms in the fluorinated linear carbonate is not particularly limited, so long as it is one or more, and is ordinarily 6 or less, preferably 4 or less. If the fluorinated linear carbonate has a plurality of fluorine atoms, the latter may be mutually bonded to a same carbon, or may be bonded to different carbons.

Examples of fluorinated linear carbonates include, for instance, fluorinated dimethyl carbonate and its derivatives, fluorinated ethyl methyl carbonate and its derivatives, fluorinated diethyl carbonate and its derivatives, and the like.

Examples of fluorinated dimethyl carbonate and its derivatives include, for instance, fluoromethyl methyl carbonate, difluoromethyl methyl carbonate, trifluoromethyl methyl carbonate, bis(fluoromethyl) carbonate, bis(difluoromethyl) carbonate, bis(trifluoromethyl) carbonate and the like.

Examples of fluorinated ethyl methyl carbonate and its derivatives include, for instance, 2-fluoroethyl methyl carbonate, ethylfluoromethyl carbonate, 2,2-difluoroethyl methyl carbonate, 2-fluoroethylfluoromethyl carbonate, ethyldifluoromethyl carbonate, 2,2,2-trifluoroethyl methyl carbonate, 2,2-difluoroethylfluoromethyl carbonate, 2-fluoroethyldifluoromethyl carbonate, ethyltrifluoromethyl carbonate and the like.

Examples of fluorinated diethyl carbonate and its derivatives include, for instance, ethyl-(2-fluoroethyl) carbonate, ethyl-(2,2-difluoroethyl) carbonate, bis(2-fluoroethyl) carbonate, ethyl-(2,2,2-trifluoroethyl)carbonate, 2,2-difluoroethyl-2'-fluoroethyl carbonate, bis(2,2-difluoroethyl) carbonate, 2,2,2-trifluoroethyl-2'-fluoroethyl carbonate, 2,2,2-trifluoroethyl-2',2'-difluoroethyl carbonate, bis(2,2,2-trifluoroethyl)carbonate and the like.

The linear carbonate may be used singly as one type, or as two or more concurrent types in any combinations and ratios.

The blending amount of the linear carbonate is preferably 5 volt or more, more preferably 10 vol % or more, and yet more preferably 15 volt or more with respect to 100 volt of nonaqueous solvent. Setting such a lower limit has the effect of bringing the viscosity of the nonaqueous electrolyte solution to within an appropriate range, and of suppressing drops in ion conductance; accordingly, the large-current discharge characteristic of the nonaqueous electrolyte battery can be readily brought to within a good range. The content of linear carbonate is preferably 90 volt or less, and more preferably 85 volt or less, with respect to 100 volt of nonaqueous solvent. By setting such an upper limit, drops in electrical conductivity derived from decreased permittivity of the nonaqueous electrolyte solution are avoided, and the large-current discharge characteristic of the nonaqueous electrolyte battery can be readily brought to within a good range.

1-4-3. Cyclic Carboxylic Acid Ester

The cyclic carboxylic acid ester is preferably a $C_{3-12}$ cyclic carboxylic acid ester.

Specific examples thereof include, for instance, gamma-butyrolactone, gamma-valerolactone, gamma-caprolactone, epsilon-caprolactone and the like. Particularly preferred among the foregoing is gamma-butyrolactone, in terms of enhancing battery characteristics as a result of an enhanced degree of dissociation of lithium ions.

The cyclic carboxylic acid ester may be used singly as one type, or as two or more concurrent types in any combinations and ratios.

Ordinarily, the blending amount of the cyclic carboxylic acid ester is preferably 5 volt or more, and more preferably 10 vol % or more with respect to 100 volt of nonaqueous solvent. Within this range, the electrical conductivity of the nonaqueous electrolyte solution is improved, and the large-current discharge characteristic of the nonaqueous electrolyte battery is readily enhanced. The blending amount of the cyclic carboxylic acid ester is preferably 50 vol % or less, and more preferably 40 vol % or less. By setting such an upper limit, the viscosity of the nonaqueous electrolyte solution is brought to within an appropriate range, drops in electrical conductivity are avoided, increases in negative electrode resistance are suppressed, and the large-current discharge characteristic of the nonaqueous electrolyte secondary battery is readily brought to within a good range.

1-4-4. Linear Carboxylic Acid Ester

The linear carboxylic acid ester is preferably a $C_{3-7}$ linear carboxylic acid ester. Specific examples thereof include, for instance, methyl acetate, ethyl acetate, n-propyl acetate, isopropyl acetate, n-butyl acetate, isobutyl acetate, t-butyl acetate, methyl propionate, ethyl propionate, n-propyl propionate, isopropyl propionate, n-butyl propionate, isobutyl propionate, t-butyl propionate, methyl butyrate, ethyl butyrate, n-propyl butyrate, isopropyl butyrate, methyl isobutyrate, ethyl isobutyrate, n-propyl isobutyrate, isopropyl isobutyrate and the like.

Preferred among the foregoing are methyl acetate, ethyl acetate, n-propyl acetate, n-butyl acetate, methyl propionate, ethyl propionate, n-propyl propionate, isopropyl propionate, methyl butyrate, ethyl butyrate and the like, in terms of enhancing ion conductance through lowered viscosity.

The linear carboxylic acid ester may be used singly as one type, or as two or more concurrent types in any combinations and ratios.

Ordinarily, the blending amount of the linear carboxylic acid ester is preferably 10 volt or more, more preferably 15 vol % or more with respect to 100 vol % of nonaqueous solvent. By setting such a lower limit, the electrical conductivity of the nonaqueous electrolyte solution is improved, and the large-current discharge characteristic of the nonaqueous electrolyte battery is readily enhanced. The blending amount of the linear carboxylic acid ester is preferably 60 vol % or less, more preferably 50 vol % or less, with respect to 100 vol % of nonaqueous solvent. By setting such an upper limit, increases in negative electrode resistance are suppressed, and the large-current discharge characteristic, as well as the cycle characteristic of the nonaqueous electrolyte battery, are readily brought to within good ranges.

1-4-5. Ether Compound

The ether compound is preferably a $C_{3-10}$ linear ether or a $C_{3-6}$ cyclic ether in which some of hydrogen atoms are optionally substituted with fluorine.

Specific examples of $C_{3-10}$ linear ethers include, for instance, diethyl ether, di(2-fluoroethyl)ether, di(2,2-difluoroethyl)ether, di(2,2,2-trifluoroethyl)ether, ethyl(2-fluoroethyl)ether, ethyl(2,2,2-trifluoroethyl)ether, ethyl(1,1,2,2-tetrafluoroethyl)ether, (2-fluoroethyl)(2,2,2-trifluoroethyl)ether, (2-fluoroethyl)(1,1,2,2-tetrafluoroethyl)ether, (2,2,2-trifluoroethyl)(1,1,2,2-tetrafluoroethyl)ether, ethyl-n-propyl ether, ethyl(3-fluoro-n-propyl)ether, ethyl(3,3,3-trifluoro-n-propyl)ether, ethyl(2,2,3,3-tetrafluoro-n-propyl)ether, ethyl (2,2,3,3,3-pentafluoro-n-propyl)ether, 2-fluoroethyl-n-propyl ether, (2-fluoroethyl)(3-fluoro-n-propyl)ether, (2-fluoroethyl)(3,3,3-trifluoro-n-propyl)ether, (2-fluoroethyl)(2,2,3,3-tetrafluoro-n-propyl)ether, (2-fluoroethyl)(2,2,3,3,3-pentafluoro-n-propyl)ether, 2,2,2-trifluoroethyl-n-propyl ether, (2,2,2-trifluoroethyl)(3-fluoro-n-propyl)ether, (2,2,2-trifluoroethyl)(3,3,3-trifluoro-n-propyl)ether, (2,2,2-trifluoroethyl)(2,2,3,3-tetrafluoro-n-propyl)ether, (2,2,2-trifluoroethyl)(2,2,3,3,3-pentafluoro-n-propyl)ether, 1,1,2,2-tetrafluoroethyl-n-propyl ether, (1,1,2,2-tetrafluoroethyl)(3-fluoro-n-propyl)ether, (1,1,2,2-tetrafluoroethyl)(3,3,3-trifluoro-n-propyl)ether, (1,1,2,2-tetrafluoroethyl)(2,2,3,3-tetrafluoro-n-propyl)ether, (1,1,2,2-tetrafluoroethyl)(2,2,3,3,3-pentafluoro-n-propyl)ether, di-n-propyl ether, (n-propyl)(3-fluoro-n-propyl)ether, (n-propyl)(3,3,3-trifluoro-n-propyl)ether, (n-propyl)(2,2,3,3-tetrafluoro-n-propyl)ether, (n-propyl)(2,2,3,3,3-pentafluoro-n-propyl)ether, di(3-fluoro-n-propyl)ether, (3-fluoro-n-propyl)(3,3,3-trifluoro-n-propyl)ether, (3-fluoro-n-propyl)(2,2,3,3-tetrafluoro-n-propyl)ether, (3-fluoro-n-propyl)(2,2,3,3,3-pentafluoro-n-propyl)ether, di(3,3,3-trifluoro-n-propyl)ether, (3,3,3-trifluoro-n-propyl)(2,2,3,3-tetrafluoro-n-propyl)ether, (3,3,3-trifluoro-n-propyl)(2,2,3,3,3-pentafluoro-n-propyl)ether, di(2,2,3,3-tetrafluoro-n-propyl)ether, (2,2,3,3-tetrafluoro-n-propyl)(2,2,3,3,3-pentafluoro-n-propyl)ether, di(2,2,3,3,3-pentafluoro-n-propyl)ether, di-n-butyl ether, dimethoxymethane, methoxyethoxymethane, methoxy(2-fluoroethoxy)methane, methoxy(2,2,2-trifluoroethoxy)methanemethoxy(1,1,2,2-tetrafluoroethoxy)methane, diethoxymethane, ethoxy(2-fluoroethoxy)methane, ethoxy (2,2,2-trifluoroethoxy)methane, ethoxy(1,1,2,2-tetrafluoroethoxy)methane, di(2-fluoroethoxy)methane, (2-fluoroethoxy)(2,2,2-trifluoroethoxy)methane, (2-fluoroethoxy)(1,1,2,2-tetrafluoroethoxy)methanedi(2,2,2-trifluoroethoxy)methane, (2,2,2-trifluoroethoxy)(1,1,2,2-tetrafluoroethoxy)methane, di(1,1,2,2-tetrafluoroethoxy)methane, dimethoxyethane, methoxyethoxyethane, methoxy(2-fluoroethoxy)ethane, methoxy(2,2,2-trifluoroethoxy)ethane, methoxy(1,1,2,2-tetrafluoroethoxy)ethane, diethoxyethane, ethoxy(2-fluoroethoxy)ethane, ethoxy(2,2,2-trifluoroethoxy)ethane, ethoxy(1,1,2,2-tetrafluoroethoxy)ethane, di(2-fluoroethoxy)ethane, (2-fluoroethoxy)(2,2,2-trifluoroethoxy)ethane, (2-fluoroethoxy)(1,1,2,2-tetrafluoroethoxy)ethane, di(2,2,2-trifluoroethoxy)ethane, (2,2,2-trifluoroethoxy)(1,1,2,2-tetrafluoroethoxy)ethane, di(1,1,2,2-tetrafluoroethoxy)ethane, ethylene glycol di-n-propyl ether, ethylene glycol di-n-butyl ether, diethylene glycol dimethyl ether and the like.

Specific examples of $C_{3-6}$ cyclic ethers include, for instance, tetrahydrofuran, 2-methyltetrahydrofuran, 3-methyltetrahydrofuran, 1,3-dioxane, 2-methyl-1,3-dioxane, 4-methyl-1,3-dioxane, 1,4-dioxane and the like, and fluorinated compounds of the foregoing.

Preferred among the foregoing are dimethoxymethane, diethoxymethane, ethoxymethoxymethane, ethylene glycol di-n-propyl ether, ethylene glycol di-n-butyl ether and diethylene glycol dimethyl ether, in terms of enhancing ion dissociation ability by virtue of their high solvating power on lithium ions. Particularly preferred among the foregoing are dimethoxymethane, diethoxymethane and ethoxymethoxymethane, on account of their low viscosity and the high ion conductance that they impart.

The ether compound may be used singly as one type, or as two or more concurrent types in any combinations and ratios.

Ordinarily, the blending amount of the ether compound is preferably 5 vol % or more, more preferably 10 volt or more and yet more preferably 15 vol % or more, and preferably 70 vol % or less, more preferably 60 vol % or less and yet more preferably 50 volt or less, with respect to 100 vol % of nonaqueous solvent. Within this range, there is readily secured the enhancing effect on ion conductance, derived from a enhanced degree of dissociation of lithium ions and a drop in viscosity, that is exerted by the linear ether. In the case where the negative electrode active material is a carbonaceous material, the linear ether is co-intercalated together with lithium ions. Drops in capacity are likelier to be avoided as a result.

1-4-6. Sulfone Compound

The sulfone compound is preferably a $C_{3-6}$ cyclic sulfone or a $C_{2-6}$ linear sulfone. The number of sulfonyl groups in one molecule is preferably 1 or 2.

Examples of $C_{2-6}$ cyclic sulfones include, for instance, trimethylene sulfones, tetramethylene sulfones and hexamethylene sulfones, which are monosulfone compounds; and trimethylene disulfones, tetramethylene disulfones, hexamethylene disulfones and the like, which are disulfone compounds.

More preferred among the foregoing, in terms of permittivity and viscosity, are tetramethylene sulfones, tetramethylene disulfones, hexamethylene sulfones and hexamethylene disulfones, and particularly preferably tetramethylene sulfones (sulfolanes).

The sulfolane is preferably sulfolane and/or a sulfolane derivative (hereafter may be referred to as "sulfolanes", including sulfolane). The sulfolane derivative is preferably a sulfolane derivative wherein one or more hydrogen atoms bonded to the carbon atoms that make up the sulfolane ring are substituted with a fluorine atom or an alkyl group.

Preferred among the foregoing are 2-methylsulfolane, 3-methylsulfolane, 2-fluorosulfolane, 3-fluorosulfolane, 2,2-difluorosulfolane, 2,3-difluorosulfolane, 2,4-difluorosulfolane, 2,5-difluorosulfolane, 3,4-difluorosulfolane, 2-fluoro-3-methylsulfolane, 2-fluoro-2-methylsulfolane, 3-fluoro-3-methylsulfolane, 3-fluoro-2-methylsulfolane, 4-fluoro-3-methylsulfolane, 4-fluoro-2-methylsulfolane, 5-fluoro-3-methylsulfolane, 5-fluoro-2-methylsulfolane, 2-fluoromethylsulfolane, 3-fluoromethylsulfolane, 2-difluoromethylsulfolane, 3-difluoromethylsulfolane, 2-trifluoromethylsulfolane, 3-trifluoromethylsulfolane, 2-fluoro-3-(trifluoromethyl)sulfolane, 3-fluoro-3-(trifluoromethyl)sulfolane, 4-fluoro-3-(trifluoromethyl)sulfolane, 5-fluoro-3-(trifluoromethyl)sulfolane and the like, in terms of high ion conductance and high input and output characteristics.

Examples of $C_{2-6}$ linear sulfones include, for instance, dimethyl sulfone, ethylmethyl sulfone, diethyl sulfone, n-propylmethyl sulfone, n-propylethyl sulfone, di-n-propyl sulfone, isopropylmethyl sulfone, isopropylethyl sulfone, diisopropyl sulfone, n-butylmethyl sulfone, n-butylethyl sulfone, t-butylmethyl sulfone, t-butylethyl sulfone, monofluoromethylmethyl sulfone, difluoromethylmethyl sulfone, trifluoromethylmethyl sulfone, monofluoroethylmethyl sulfone, difluoroethylmethyl sulfone, trifluoroethylmethyl sulfone, pentafluoroethylmethyl sulfone, ethylmonofluoromethyl sulfone, ethyldifluoromethyl sulfone, ethyltrifluoromethyl sulfone, perfluoroethylmethyl sulfone, ethyltrifluoroethyl sulfone, ethylpentafluoroethyl sulfone, di(trifluoroethyl)sulfone, perfluorodiethyl sulfone, fluoromethyl-n-propyl sulfone, difluoromethyl-n-propyl sulfone, trifluoromethyl-n-propyl sulfone, fluoromethylisopropyl sulfone, difluoromethylisopropyl sulfone, trifluoromethylisopropyl sulfone, trifluoroethyl-n-propyl sulfone, trifluoroethylisopropyl sulfone, pentafluoroethyl-n-propyl sulfone, pentafluoroethylisopropyl sulfone, trifluoroethyl-n-butyl sulfone, trifluoroethyl-t-butyl sulfone, pentafluoroethyl-n-butyl sulfone, pentafluoroethyl-t-butyl sulfone and the like.

Preferred among the foregoing are dimethyl sulfone, ethylmethyl sulfone, diethyl sulfone, n-propylmethyl sulfone, isopropylmethyl sulfone, n-butylmethyl sulfone, t-butylmethyl sulfone, monofluoromethylmethyl sulfone, difluoromethylmethyl sulfone, trifluoromethylmethyl sulfone, monofluoroethylmethyl sulfone, difluoroethylmethyl sulfone, trifluoroethylmethyl sulfone, pentafluoroethylmethyl sulfone, ethylmonofluoromethyl sulfone, ethyldifluoromethyl sulfone, ethyltrifluoromethyl sulfone, ethyltrifluoroethyl sulfone, ethylpentafluoroethyl sulfone, trifluoromethyl-n-propyl sulfone, trifluoromethylisopropyl sulfone, trifluoroethyl-n-butyl sulfone, trifluoroethyl-t-butyl sulfone, trifluoromethyl-n-butyl sulfone, trifluoromethyl-t-butyl sulfone and the like, in terms of high ion conductance and high input and output characteristics.

The sulfone compound may be used singly as one type, or as two or more concurrent types in any combinations and ratios.

Ordinarily, the blending amount of the sulfone compound is preferably 0.3 vol % or more, more preferably 1 vol % or more and yet more preferably 5 vol % or more, and preferably 40 vol % or less, more preferably 35 vol % or less and yet more preferably 30 vol % or less, with respect to 100 vol % of nonaqueous solvent. Within this range, an enhancing effect on durability in terms of cycle characteristic and storage characteristic and the like is readily achieved, the viscosity of the nonaqueous electrolyte solution can be brought to within an appropriate range, and drops in electrical conductivity can be avoided; also, drops in the charge-discharge capacity retention rate can be readily avoided, in a case where the nonaqueous electrolyte battery is charged and discharged at a high current density.

1-4-7. Composition of Nonaqueous Solvent

As the nonaqueous solvent of the present invention, the nonaqueous solvents given above as examples may be used singly as one type, or as two or more concurrent types in any combinations and ratios.

For example, one preferred combination of nonaqueous solvents is a combination consisting primarily of a chain carbonate and a cyclic carbonate having no fluorine atom.

In this case, the total of the chain carbonate and the cyclic carbonate having no fluorine atom as a percentage of the nonaqueous solvent is preferably at least 70 vol %, or more preferably at least 80 vol %, or still more preferably at least 90 vol %, and the ratio of the cyclic carbonate having no fluorine atom as a percentage of the total of the cyclic carbonate and the chain carbonate is preferably at least 5 vol %, or more preferably at least 10 vol %, or still more preferably at least 15 vol %, and is preferably 50 vol % or less, or more preferably 35 vol % or less, or still more preferably 30 vol % or less, or especially 25 vol % or less.

Using these combinations of nonaqueous solvents, it is possible to achieve a good balance of the cycle characteristics and high-temperature storage characteristics (especially the residual capacity and high-load discharge capacity after high-temperature storage) in a battery prepared using these.

Specific examples of preferred combinations of chain carbonates and cyclic carbonates having no fluorine atom include the following: ethylene carbonate and dimethyl carbonate, ethylene carbonate and diethyl carbonate, ethylene carbonate and ethyl methyl carbonate, ethylene carbonate and dimethyl carbonate and diethyl carbonate, ethylene carbonate and dimethyl carbonate and ethyl methyl carbonate, ethylene carbonate and diethyl carbonate and ethyl methyl carbonate, ethylene carbonate and dimethyl carbonate and diethyl carbonate and ethyl methyl carbonate and the like.

In a combination of a chain carbonate and a cyclic carbonate having no fluorine atom, it is more desirable to include an asymmetric chain alkyl carbonate as the chain carbonate, and in particular ethylene carbonate and dimethyl carbonate and ethyl methyl carbonate, ethylene carbonate and diethyl carbonate and ethyl methyl carbonate, and ethylene carbonate and dimethyl carbonate and diethyl carbonate and ethyl methyl carbonate, which are combinations containing ethylene carbonate with symmetric chain carbonates and asymmetric chain carbonates, are desirable for achieving a good balance of cycle characteristics and high-current discharge characteristics.

Of these, preferably the asymmetric chain carbonate is ethyl methyl carbonate, or else the alkyl group of the chain carbonate is a $C_{1-2}$ alkyl group.

Other desirable combinations include those comprising propylene carbonate added to these combinations of ethylene carbonate and chain carbonates.

When propylene carbonate is included, the volume ratio of the ethylene carbonate and propylene carbonate is preferably 99:1 to 40:60, or more preferably 95:5 to 50:50.

Further, the proportion of propylene carbonate in the whole nonaqueous solvent is preferably 0.1 volt or more, more preferably 1 volt or more and yet more preferably 2 vol % or more, and preferably 20 vol % or less, more preferably 8 volt or less and yet more preferably 5 volt or less.

Including propylene carbonate within this concentration range is desirable for achieving even greater low-temperature characteristics while retaining the characteristics provided by the combination of the ethylene carbonate and chain carbonate.

When dimethyl carbonate is included in the nonaqueous solvent, the ratio of the dimethylcarbonate as a percentage of the total nonaqueous solvent is preferably at least 10 volt, or more preferably at least 20 volt, or still more preferably at least 25 volt, or especially at least 30 volt, and is preferably 90 volt or less, or more preferably 80 volt or less, or still more preferably 75 volt or less, or especially 70 volt or less from the standpoint of improving the load characteristics of the battery.

In particular, the battery characteristics after high-temperature storage can be improved while retaining the electrical conductivity of the electrolyte solution by including dimethyl carbonate and ethyl methyl carbonate, and making the percentage content of the dimethyl carbonate greater than the percentage content of the ethyl methyl carbonate.

For purposes of improving the electrical conductivity of the electrolyte solution and the battery characteristics after storage, the volume ratio of the dimethyl carbonate to the ethyl methyl carbonate in the total nonaqueous solvent (dimethyl carbonate/ethyl methyl carbonate) is preferably at least 1.1, or more preferably at least 1.5, or still more preferably at least 2.5. For purposes of improving the battery characteristics at low temperatures, this volume ratio (dimethyl carbonate/ethyl methyl carbonate) is preferably 40 or less, or more preferably 20 or less, or still more preferably 10 or less, or especially 8 or less.

Another solvent such as a cyclic carboxylic acid ester, chain carboxylic acid ester, cyclic ether, chain ether, sulfur-containing organic solvent, phosphorus-containing organic solvent, aromatic fluorine-containing solvent or the like may also be mixed into a combination consisting principally of the aforementioned chain carbonate and cyclic carbonate having no fluorine atom.

1-5. Auxiliary Agents

Besides the compounds of Group (I) and Group (II), the nonaqueous electrolyte battery of the present invention may use appropriate auxiliary agents, in accordance with the intended purpose. Examples of auxiliary agents include, for instance, cyclic carbonates having a carbon-carbon unsaturated bond and other auxiliary agents, which are given below.

1-5-1. Cyclic Carbonate Having a Carbon-carbon Unsaturated Bond

The cyclic carbonates having a carbon-carbon unsaturated bond (hereinafter may be referred to as "unsaturated cyclic carbonate" for short) is not particularly limited and any unsaturated cyclic carbonate can be used, so long as it has a carbon-carbon double bond or a carbon-carbon triple bond. Cyclic carbonates having an aromatic ring are included herein among unsaturated cyclic carbonates. Examples of unsaturated cyclic carbonates include, for instance, vinylene carbonates, ethylene carbonates substituted with an aromatic ring or with a substituent having a carbon-carbon double bond or carbon-carbon triple bond, phenyl carbonates, vinyl carbonates, allyl carbonates, catechol carbonates and the like.

Examples of vinylene carbonates include, for instance, vinylene carbonate, methylvinylene carbonate, 4,5-dimethylvinylene carbonate, phenylvinylene carbonate, 4,5-diphenylvinylene carbonate, vinylvinylene carbonate, 4,5-vinylvinylene carbonate, allylvinylene carbonate, 4,5-diallylvinylene carbonate and the like.

Specific examples of ethylene carbonates substituted with an aromatic ring or with a substituent having a carbon-carbon double bond or carbon-carbon triple bond include, for instance, vinylethylene carbonate, 4,5-divinylethylene carbonate, 4-methyl-5-vinylethylene carbonate, 4-allyl-5-vinylethylene carbonate, ethynylethylene carbonate, 4,5-diethynylethylene carbonate, 4-methyl-5-ethynylethylene carbonate, 4-vinyl-5-ethynylethylene carbonate, 4-allyl-5-ethynylethylene carbonate, phenylethylene carbonate, 4,5-diphenylethylene carbonate, 4-phenyl-5-vinylethylene carbonate, 4-allyl-5-phenylethylene carbonate, allylethylene carbonate, 4,5-diallylethylene carbonate, 4-methyl-5-allylethylene carbonate and the like.

Examples of particularly preferred unsaturated cyclic carbonates that can be used concomitantly with the compound of Group (I) include vinylene carbonate, methylvinylene carbonate, 4,5-dimethylvinylene carbonate, vinylvinylene carbonate, 4,5-divinylvinylene carbonate, allylvinylene carbonate, 4,5-diallylvinylene carbonate, vinylethylene carbonate, 4,5-divinylethylene carbonate, 4-methyl-5-vinylethylene carbonate, allylethylene carbonate, 4,5-diallylethylene carbonate, 4-methyl-5-allylethylene carbonate, 4-allyl-5-vinylethylene carbonate, ethynylethylene carbonate, 4,5-diethynylethylene carbonate, 4-methyl-5-ethynylethylene carbonate, and 4-vinyl-5-ethynylethylene carbonate. Vinylene carbonate, vinyl ethylene carbonate and ethynyl ethylene carbonate are especially desirable because they form more stable boundary protective films.

The molecular weight of the unsaturated cyclic carbonate is not particularly limited, and may be any molecular weight, so long as the effect of the present invention is not significantly impaired thereby. The molecular weight is preferably 86 or greater and 250 or smaller. Within this range, the solubility of the unsaturated cyclic carbonate towards the nonaqueous electrolyte solution can be readily secured, and the effect of the present invention is readily brought out. The molecular weight of the unsaturated cyclic carbonate is more preferably 86 or greater and 150 or smaller. The method for producing the unsaturated cyclic carbonate is not particularly limited, and the unsaturated cyclic carbonate may be produced in accordance with an arbitrarily selected known method.

The unsaturated cyclic carbonate may be used singly as one type, or as two or more concurrent types in any combinations and ratios. The blending amount of the unsaturated cyclic carbonate is not particularly limited, and may be any blending amount, so long as the effect of the present invention is not significantly impaired thereby. The blending amount of the unsaturated cyclic carbonate is preferably 0.001 mass % or more, more preferably 0.01 mass % or more, and yet more preferably 0.1 mass % or more, and preferably 5 mass % or less, more preferably 4 mass % or less, and yet more preferably 3 mass % or less, with respect to 100 mass % of the nonaqueous electrolyte solution. Within this range, a sufficient enhancing effect on cycle characteristic is readily brought out in the nonaqueous electrolyte battery, and drops in high-temperature storage characteristic such as drops in discharge capacity retention rate, caused by excessive gas generation amount, are readily avoided.

1-5-2. Other Auxiliary Agents

Known auxiliary agents may be used in the nonaqueous electrolyte solution of the present invention. Examples of auxiliary agents include, for instance, carbonate compounds such as erythritan carbonate, spiro-bis-dimethylene carbonate, and methoxyethyl-methyl carbonate; carboxylic anhydrides such as succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, and phenylsuccinic anhydride; spiro compounds such as 2,4,8,10-tetraoxaspiro[5.5]undecane and 3,9-divinyl-2,4,8,10-tetraoxaspiro[5.5]undecane; sulfur-containing compounds such as N,N-dimethylmethane sulfoneamide and N,N-diethylmethanesulfoneamide; phosphorus-containing compounds such as trimethyl phosphite, triethyl phosphite, triphenyl phosphite, trimethyl phosphate, triethyl phosphate, triphenyl phosphate, dimethyl methylphosphonate, diethyl ethylphosphonate, dimethyl vinylphosphonate, diethyl vinylphosphonate, ethyl diethylphosphonoacetate, methyl dimethylphosphinate, ethyl diethylphosphinate, trimethylphosphine oxide, and triethylphosphine oxide; nitrogen-containing compounds such as 1-methyl-2-pyrrolidinone, 1-methyl-2-piperidone, 3-methyl-2-oxazolidinone, 1,3-dimethyl-2-imidazolidinone and N-methyl succinimide; and hydrocarbon compounds such as heptane, octane, nonane, decane, and cycloheptane. The foregoing may be used as a single type or concomitantly as two or more types. The capacity retention characteristic after storage at high-temperature, as well as the cycle characteristic, can be enhanced through the addition of such auxiliary agents.

The blending amount of these other auxiliary agents is not particularly limited, and may be any blending amount, so long as the effect of the present invention is not significantly impaired thereby. The content of other auxiliary agents is preferably 0.01 mass % or more, and 5 mass % or less, with respect to 100 mass % of the nonaqueous electrolyte solution. Within such a range, the effect elicited by the other auxiliary agents is readily brought out at a sufficient level, and impairment of battery characteristics such as high-load discharge characteristic is readily avoided. The blending amount of other auxiliary agents is more preferably 0.1 mass % or more, yet more preferably 0.2 mass % or more, and more preferably 3 mass % or less, and yet more preferably 1 mass % or less.

2. Battery Configuration

The nonaqueous electrolyte solution of the present invention is appropriate for use as an electrolyte solution for secondary batteries, for instance lithium secondary batteries, from among nonaqueous electrolyte batteries. A nonaqueous electrolyte battery that uses the nonaqueous electrolyte solution of the present invention is explained next.

The nonaqueous electrolyte battery of the present invention can have a known structure, and is typically provided with a negative electrode and a positive electrode that can absorb and release ions (for instance, lithium ions), plus the above-described nonaqueous electrolyte solution of the present invention.

2-1. Negative Electrode

The negative electrode active material that is used in the negative electrode is explained next. The negative electrode active material is not particularly limited, so long as it is capable of electrochemically absorbing and releasing lithium ions. Specific examples thereof include, for instance, carbonaceous materials, alloy-based materials, lithium-containing metal complex oxide materials and the like. The foregoing may be used singly as one type, or concomitantly in the form of any combination of two or more types.

<Negative Electrode Active Material>

Examples of the negative electrode active material include, for instance, carbonaceous materials, alloy-based materials, lithium-containing metal complex oxide materials and the like.

Preferably, the carbonaceous material that is used as the negative electrode active material is selected from among:
(1) natural graphite;
(2) a carbonaceous material obtained as a result of one or several heating treatments, at a temperature ranging from 400 to 3200° C., of an artificial carbonaceous substance and an artificial graphitic substance;
(3) a carbonaceous material such that the negative electrode active material layer comprises at least two or more carbonaceous substances of dissimilar crystallinity, and/or a carbonaceous material having interfaces at which such carbonaceous substances of dissimilar crystallinity come into contact with each other;
(4) a carbonaceous material such that the negative electrode active material layer comprises at least two or more carbonaceous substances having dissimilar orientation, and/or a carbonaceous material having interfaces at which such carbonaceous substances of dissimilar orientation come into contact with each other,
since in that case a good balance is struck between initial irreversible capacity and high current density charge-discharge characteristic. The carbonaceous materials of (1) to (4) may be used singly as one type, or as two or more concurrent types in any combinations and ratios.

Examples of the artificial carbonaceous substance and artificial graphitic substance of (2) include, for instance, natural graphite, coal-based coke, petroleum coke, coal-based pitch, petroleum pitch, and products obtained as a result of an oxidation treatment of the foregoing pitches; needle coke, pitch coke and carbon materials resulting from partial graphitization thereof; furnace black, acetylene black and organic pyrolysis products of pitch-based carbon fibers or the like; a carbonizable organic material or a carbonized product thereof; and a solution resulting from dissolving a carbonizable organic material in a low-molecular weight organic solvent such as benzene, toluene, xylene, quinoline, n-hexane and the like, and a carbonized product of the solution.

The alloy-based material that is used as the negative electrode active material is not particularly limited so long as it is capable of absorbing and releasing lithium, and may be any from among single lithium, or a single metal or alloy that forms a lithium alloy, or a compound, for instance an oxide, carbide, nitride, silicide, sulfide or phosphide of the foregoing. The single metal and alloy that forms a lithium alloy is preferably a material comprising a metal/semimetal element (excluding carbon) of groups 13 and 14, more preferably a single metal such as aluminum, silicon and tin (hereafter may be referred to as "specific metal elements" for short), as well as alloys or compounds that comprise the foregoing atoms. The foregoing may be used singly as one type, or as two or more concurrent types in any combinations and ratios.

Examples of the negative electrode active material having at least one type of atom selected from among the specific metal elements include, for instance, a single metal of any one type of the specific metal elements; alloys comprising two or more types of the specific metal elements; alloys that comprise one type or two or more types of the specific metal elements plus another one type or two or more types of metal elements; compounds containing one type or two or more types of the specific metal elements; as well as complex compounds thereof, such as oxides, carbides, nitrides, silicides, sulfides and phosphides. The capacity of the battery can be increased through the use of these single metals, alloys and metal compounds as the negative electrode active material.

Examples of the complex compounds include, for instance, compounds wherein a plurality of types of elements, for instance single metals, alloys and non-metallic elements, are bonded to each other in complex manners. Specifically, in the case of silicon and tin, for instance, there can be used alloys of these elements with metals that do not act as a negative electrode. In the case of tin, for instance, there can be used a complex compound that comprises 5 to 6 elements including a combination of a metal, other than tin and silicon, that acts as a negative electrode, a metal that does not act as a negative electrode, and a non-metallic element.

From among the above-mentioned negative electrode active materials there is preferably used, for instance, any one single metal of the specific metal elements, or an alloy of two or more types of the specific metal elements, or an oxide, carbide or nitride of the specific metal elements, on account of the substantial capacity per unit mass that is afforded in the resulting battery. In particular, a single metal, alloy, oxide, carbide, nitride or the like of silicon and/or tin is preferably used in terms of capacity per unit mass and environmental impact.

he lithium-containing metal complex oxide material used as the negative electrode active material is not particularly limited, so long as it is capable of absorbing and releasing lithium, but, in terms of high current density charge-discharge characteristic, is preferably a material that contains titanium and lithium, more preferably a lithium-containing complex metal oxide material that comprises titanium, and yet more preferably a complex oxide of lithium and titanium (hereafter may be referred to as "lithium titanium complex oxide" for short). In particular, there is preferably used a negative electrode active material for nonaqueous electrolyte batteries that comprises a lithium-titanium complex oxide having a spinel structure, since output resistance is significantly reduced in such a case.

Preferably, lithium and/or titanium in the lithium-titanium complex oxide are preferably substituted by another metal element, for instance at least one element selected from the group consisting of Na, K, Co, Al, Fe, Ti, Mg, Cr, Ga, Cu, Zn and Nb.

Preferably, the metal oxide is a lithium-titanium complex oxide represented by formula (A), wherein $0.7 \leq x \leq 1.5$, $1.5 \leq y \leq 2.3$, $0 \leq z \leq 1.6$, since in that case a stable structure is achieved upon doping and de-doping of lithium ions.

$$Li_xTi_yM_zO_4 \quad (A)$$

(In formula (A), M denotes at least one element selected from the group consisting of Na, K, Co, Al, Fe, Ti, Mg, Cr, Ga, Cu, Zn and Nb.)

From among the compositions represented by formula (A) above, particularly preferred are those wherein $$1.2 \leq x \leq 1.4,\ 1.5 \leq y \leq 1.7,\ z=0, \quad (a)$$

$$0.9 \leq x \leq 1.1,\ 1.9 \leq y \leq 2.1,\ z=0, \quad (b)$$

$$0.7 \leq x \leq 0.9,\ 2.1 \leq y \leq 2.3,\ z=0, \quad (c)$$

since a good battery performance balance is achieved in such structures.

Particularly preferred representative compositions of the above compounds include $Li_{4/3}Ti_{5/3}O_4$ for (a), $Li_1Ti_2O_4$ for (b) and $Li_{4/5}Ti_{11/5}O_4$ for (c). Preferred instances of a structure where $Z \neq 0$ include $Li_{4/3}Ti_{4/3}Al_{1/3}O_4$.

<Characteristics of the Carbonaceous Material>

When using a carbonaceous material as the negative electrode active material, the carbonaceous material preferably has the following properties.

(X-ray Parameters)

The carbonaceous material has a d-value (interlayer distance) of lattice planes (002 planes), as determined by X-ray diffraction in accordance with the method by the Japan Society for Promotion of Scientific Research, that is preferably 0.335 nm or greater, and is ordinarily 0.360 nm or smaller, preferably 0.350 nm or smaller, and yet more preferably 0.345 nm or smaller. The crystallite size (Lc) of the carbonaceous material, as determined by X-ray diffraction in accordance with the method of the Japan Society for Promotion of Scientific Research, is preferably 1.0 nm or greater, and yet more preferably 1.5 nm or greater.

(Volume-average Particle Diameter)

The volume-average particle diameter of the carbonaceous material, which denotes the average particle diameter (median diameter), referred to volume, and that is worked out by laser diffraction/scattering, is ordinarily 1 μm or greater, preferably 3 μm or greater, yet more preferably 5 μm or greater, and particularly preferably 7 μm or greater, and is ordinarily 100 μm or smaller, preferably 50 μm or smaller, more preferably 40 μm or smaller, yet more preferably 30 μm or smaller, and particularly preferably 25 μm or smaller.

If the volume-average particle diameter is below the above-mentioned range, irreversible capacity may increase, which may result in loss of initial battery capacity. If the volume-average particle diameter exceeds the above-mentioned range, coating surfaces are likely to be uneven during production of the electrode by coating, which is an undesirable occurrence in the battery production process.

The volume-average particle diameter is measured using a laser diffraction/scattering-type particle size distribution analyzer (LA-700, by Horiba Ltd.), by dissolving the carbon powder in a 0.2 mass % aqueous solution (about 10 mL) of polyoxyethylene (20) sorbitan monolaurate, which is a surfactant.

(Raman R Value, Raman Half-width)

The Raman R value of the carbonaceous material is a value measured by argon-ion laser Raman spectroscopy, and is ordinarily 0.01 or greater, preferably 0.03 or greater, and yet more preferably 0.1 or greater, and ordinarily 1.5 or smaller, preferably 1.2 or smaller, yet more preferably 1 or smaller, and particularly preferably 0.5 or smaller.

The Raman half-width of the carbonaceous material around 1580 $cm^{-1}$ is not particularly limited, and is ordinarily 10 $cm^{-1}$ or greater, preferably 15 $cm^{-1}$ or greater, and ordinarily 100 $cm^{-1}$ or smaller, preferably 80 $cm^{-1}$ or smaller, yet more preferably 60 cm$^{-1}$ or smaller and particularly preferably 40 cm$^{-1}$ or smaller.

The Raman R value and Raman half width are indicators of the crystallinity of the carbonaceous material surface, and the carbonaceous material preferably has a suitable degree of crystallinity from the standpoint of chemical stability, and also preferably has a degree of crystallinity that does not eliminate sites for Li to infiltrate between layers as a result of charge and discharge, or in other words that does not detract from the charge acceptance. If the density of the negative electrode is increased through pressing after coating onto the collector, the crystals become readily oriented in a direction parallel to the electrode plate; therefore, it is preferable to take that into consideration. If the Raman R value or Raman half-width is within the above-described ranges, then a coating film can be appropriately formed on the negative electrode surface. As a result, the storage characteristic, cycle characteristic and load characteristic can be enhanced, and a decrease in efficiency and generation of gas which accompany a reaction with the nonaqueous electrolyte solution can be suppressed.

The Raman spectrum is measured using a Raman spectrometer (Raman spectrometer, by JASCO) by filling a sample, through natural dropping, into a measurement cell, and causing the cell to rotate within a plane perpendicular to an argon-ion laser beam while irradiating the sample surface in the cell with the laser beam. With respect to the obtained Raman spectrum, the intensity IA of peak PA around 1580 cm$^{-1}$ and the intensity IB of peak PB around 1360 cm$^{-1}$ are measured, and the intensity ratio R(R=IB/IA) between them is calculated.

The conditions of Raman measurement are as follows.
Argon-ion laser wavelength: 514.5 nm
Laser power on sample: 15 to 25 mW
Resolution: 10 to 20 cm$^{-1}$
Measurement range: 1100 cm$^{-1}$ to 1730 cm$^{-1}$
Raman R value, Raman half-width analysis: background processing
Smoothing: simple average, 5-point convolution
(BET Specific Surface Area)

The BET specific surface area of the carbonaceous material is the value of the specific surface area as measured by the BET method, and is normally at least 0.1 m$^2$/g$^{-1}$, or preferably at least 0.7 m$^2$/g$^{-1}$, or more preferably at least 1.0 m$^2$/g$^{-1}$, or especially at least 1.5 m$^2$/g$^{-1}$, and is normally 100 m$^2$/g$^{-1}$ or less, or preferably 25 m$^2$/g$^{-1}$ or less, or more preferably 15 m$^2$/g$^{-1}$ or less, or especially 10 m$^2$/g$^{-1}$ or less.

If the value of the BET specific surface area is within this range, it is possible to control precipitation of lithium on the electrode surfaces, and also to control gas production caused by reactions with the nonaqueous electrolyte solution.

The specific surface area can be measured, according to the BET method, using a surface area meter (automatic surface area analyzer, by Ohkura Riken), by pre-drying a sample, under a nitrogen stream, at 350° C. for 15 minutes, after which the specific surface area is measured according to the nitrogen-adsorption BET one-point method, by gas flow, using a nitrogen-helium mixed gas prepared so that the value of relative pressure is exactly 0.3 with respect to atmospheric pressure.

(Circularity)

When circularity is measured as a measure of the sphericity of the carbonaceous material, it preferably falls within the following range. Circularity is defined as "Circularity=(perimeter of corresponding circle having same area as projected particle shape)/(actual perimeter of projected particle shape)", with 1 being the circularity of a theoretical sphere. The circularity of a particle of a carbonaceous material with a particle size in the range of 3 to 40 µm is preferably as close to 1 as possible, and is preferably at least 0.1, or more preferably at least 0.5, or still more preferably at least 0.8, or yet more preferably at least 0.85, or especially at least 0.9. In terms of the high current density charge-discharge characteristics, because the filling properties are improved and resistance between particles is reduced when the circularity is greater, the high current density charge-discharge characteristics are improved. Thus, the circularity is preferably as high as possible as indicated by the aforementioned range.

Circularity is measured using a flow particle image analyzer (SYSMEX CORPORATION, FPIA). About 0.2 g of a sample is dispersed in a 0.2 mass % aqueous solution (about 50 mL) of the surfactant polyoxyethylene (20) sorbitan monolaurate, and exposed for 1 minute to 28 kHz ultrasound at an output of 60 W, after which the particles with a particle diameter in the range of 3 to 40 µm are measured with the detection range set to 0.6 to 400 µm.

The method of increasing circularity is not particularly limited, but particles that have been made spherical by spheronization treatment are preferred because the gaps between particles have a uniform shape in the resulting electrode. Examples of spheronization treatment include methods of approximating sphericity by mechanical means using shearing or compression force, and mechanical and physical treatment methods in which multiple fine particles are granulated with a binder or by using the adhesive force of the particles themselves.

(Tap Density)

The tap density of the carbonaceous material is normally at least 0.1 g/cm$^{-3}$, or preferably at least 0.5 g/cm$^{-3}$, or more preferably at least 0.7 g/cm$^{-3}$, or still more preferably at least 1 g/cm$^{-3}$, and is normally 2 g/cm$^{-3}$ or less, or preferably 1.8 g/cm$^{-3}$ or less, or more preferably 1.6 g/cm$^{-3}$ or less. With a tap density within this range, it is possible to both ensure the battery capacity and control the increase in resistance between particles.

The tap density is measured by passing a sample through a 300 µM sieve and letting it drop into a 20 cm$^3$ tapping cell until the sample has filled up the upper surface of the cell, and then using a powder density measuring device (for example, a Seishin Enterprise Tap Denser) to perform tapping 1000 times with a stroke length of 10 mm, and calculating the tapping density from the resulting volume and the mass of the sample.

(Orientation Ratio)

The orientation ratio of the carbonaceous material is ordinarily 0.005 or greater, preferably 0.01 or greater, and yet more preferably 0.015 or greater, and ordinarily 0.67 or smaller. With an orientation ratio within this range, it is possible to ensure excellent high-density charge-discharge characteristics. The upper limit of the above-mentioned range is the theoretical upper limit value of the orientation ratio of the carbonaceous material.

The orientation ratio is measured by X-ray diffraction after pressure-molding of a sample. A sample of 0.47 g is stuffed into a 17 mm-diameter molding machine, and is compressed at 58.8 MN·m$^{-2}$, to yield a molded product that is then measured by X-ray diffraction by being set flush with the surface of a measurement sample holder, using clay. The ratio represented by (110) diffraction peak intensity/(004) diffraction peak intensity is calculated from the peak intensities of (110) diffraction and (004) diffraction for carbon.

The X-ray diffraction measurement conditions are as follows. Herein, "2θ" is the diffraction angle.

Target: Cu(Kα rays) graphite monochromator
Slit:
Divergent slit=0.5 degrees
Light-receiving slit=0.15 mm
Scattering slit=0.5 degrees
Measurement range and step angle/measurement time:
(110) plane: 75 degrees ≤2θ≤80 degrees 1 degree/60 seconds
(004) plane: 52 degrees ≤2θ≤57 degrees 1 degree/60 seconds (Aspect Ratio (Powder))

The aspect ratio of the carbonaceous material is ordinarily 1 or greater, and ordinarily 10 or smaller, preferably 8 or smaller and yet more preferably 5 or smaller. Within this range, it is possible to ensure excellent high current density charge-discharge characteristics because streaking is controlled during plate formation and uniform coating is also possible. The lower limit of the above-mentioned range is a theoretical lower limit value of the aspect ratio of the carbonaceous material.

The aspect ratio is measured through observation of enlarged scanning electron micrographs of the carbonaceous material particles. There are selected 50 arbitrary graphite particles fixed to the edge face of metal of thickness no greater than 50 µm. The particles are observed each three-dimensionally through rotation and tilting of a stage to which the sample is fixed. The longest length A, and the shortest length B perpendicular thereto, of each carbonaceous material particle, are measured, and the average value of A/B is worked out.

<Configuration and Production Method of the Negative Electrode>

Any known method can be used to produce the electrode, so long as the effect of the present invention is not significantly impaired thereby. For instance, the binder, the solvent and, as the case may require, a thickener, a conductive material, a filler and the like, are added to the negative electrode active material, to yield a slurry that is then applied onto a collector and is dried. The negative electrode can be formed thereby.

In a case where an alloy-based material is used, a method is resorted to wherein a thin film layer (negative electrode active material layer) that contains the above-described negative electrode active material is formed by vapor deposition, sputtering, plating or the like.

(Collector)

Any known collector can be used as the collector that holds the negative electrode active material. Examples of the metallic material of the collector of the negative electrode include, for instance, aluminum, copper, nickel, stainless steel, nickel-plated steel and the like, and copper is particularly preferable in terms of cost and ease of processing.

In a case where the collector is a metallic material, the collector may be shaped, for instance, as a metal foil, metal cylinder, metal coil, metal plate, metal thin film, expanded metal, punched metal, foamed metal or the like. Preferably, the collector is a metal thin film, more preferably a copper foil, and yet more preferably a rolled copper foil obtained by rolling or an electrolyte copper foil obtained by electrolysis, either of which can be used as the collector.

The thickness of the collector is ordinarily 1 µm or greater, preferably 5 µm or greater, and ordinarily 100 µm or smaller, preferably 50 µm or smaller, in terms of securing of battery capacity and handling properties.

(Ratio Between the Thicknesses of the Collector and the Negative Electrode Active Material Layer)

The ratio between the thicknesses of the collector and the negative electrode active material layer is not particularly limited, but the value of "(thickness of the negative electrode active material layer on one side immediately prior to injection of nonaqueous electrolyte solution)/(collector thickness)" is preferably 150 or smaller, more preferably 20 or smaller, and particularly preferably 10 or smaller, and preferably 0.1 or greater, more preferably 0.4 or greater and particularly preferably 1 or greater. If the ratio of the thicknesses of the collector and the negative active material layer is within this range, it is possible not only to ensure battery capacity, but also to control heat production in the collector during high current density charge and discharge.

(Binder)

The binder that binds the negative electrode active material is not particularly limited, provided that it is a stable material towards the nonaqueous electrolyte solution and towards the solvent that is used during the production of the electrodes.

Specific examples thereof include, for instance, resin-based polymers such as polyethylene, polypropylene, polyethylene terephthalate, polymethyl methacrylate, aromatic polyamide, polyimide, cellulose, and nitrocellulose; rubber-like polymers such as SBR (styrene-butadiene rubber), isoprene rubber, butadiene rubber, fluororubber, NBR (acrylonitrile-butadiene rubber), and ethylene-propylene rubber; styrene-butadiene-styrene block copolymers or hydrogenated products thereof; thermoplastic elastomeric polymers such as EPDM (ethylene-propylene-diene terpolymer), styrene-ethylene-butadiene-styrene copolymers, and styrene-isoprene-styrene block copolymers or hydrogenated products thereof; soft resin-like polymers such as syndiotactic-1,2-polybutadiene, polyvinyl acetate, ethylene-vinyl acetate copolymers, and propylene-α-olefin copolymers; fluoropolymers such as polyvinylidene fluoride, polytetrafluoroethylene, fluorinated polyvinylidene fluoride, and polytetrafluoroethylene-ethylene copolymers; and polymer compositions having ionic conductivity towards alkali metal ions (in particular, lithium ions). The foregoing may be used singly as one type, or as two or more concurrent types in any combinations and ratios.

The proportion of binder in the negative electrode active material is preferably 0.1 mass % or more, yet more preferably 0.5 mass % or more, and particularly preferably 0.6 mass % or more, and preferably 20 mass % or less, more preferably 15 mass % or less, yet more preferably 10 mass % or less, and particularly preferably 8 mass % or less. If the amount of the binder as a percentage of the negative active material is within the range, it is possible to adequately ensure the battery capacity and the strength of the negative electrode.

In a case, in particular, in which the main component of the binder is a rubber-like polymer typified by SBR, the proportion of binder in the negative electrode active material is ordinarily 0.1 mass % or more, preferably 0.5 mass % or more, yet more preferably 0.6 mass % or more, and ordinarily 5 mass % or less, preferably 3 mass % or less and yet more preferably 2 mass % or less. In a case where the main component is a fluoropolymer typified by polyvinylidene fluoride, the proportion in the negative electrode active material is ordinarily 1 mass % or more, preferably 2 mass % or more, yet more preferably 3 mass % or more, and ordinarily 15 mass % or less, preferably 10 mass % or less and yet more preferably 8 mass % or less.

(Slurry-forming Solvent)

The solvent used for forming the slurry is not particularly limited, and may be any aqueous solvent or organic solvent, provided that the solvent can dissolve or disperse the negative electrode active material, the binder, as well as a thickener and conductive material that are used as the case may require.

Examples of aqueous solvents include, for instance, water and alcohol. Examples of organic solvents include, for instance, N-methylpyrrolidone (NMP), dimethyl formamide, dimethyl acetamide, methyl ethyl ketone, cyclohexanone, methyl acetate, methyl acrylate, diethyl triamine, N,N-dimethylaminopropyl amine, tetrahydrofuran (THF), toluene, acetone, diethyl ether, hexamethylphosphoric amide, dimethyl sulfoxide, benzene, xylene, quinoline, pyridine, methyl naphthalene, hexane or the like.

In the case where an aqueous solvent is used, it is preferable to add a dispersant or the like in conjunction with the thickener, and to form a slurry using a latex of SBR or the like. These solvents may be used singly as one type, or as two or more concurrent types in any combinations and ratios.

(Thickener)

A thickener is ordinarily used in order to adjust the viscosity of the slurry. The thickener is not particularly limited, and specific examples thereof include, for instance, carboxymethyl cellulose, methyl cellulose, hydroxymethyl cellulose, ethyl cellulose, polyvinyl alcohol, starch oxide, phosphorylated starch, casein, as well as salts thereof. The foregoing may be used singly as one type, or as two or more concurrent types in any combinations and ratios.

If a thickener is further used, then the proportion of thickener in the negative electrode active material is ordinarily 0.1 mass % or more, preferably 0.5 mass % or more, yet more preferably 0.6 mass % or more, and ordinarily 5 mass % or less, preferably 3 mass % or less and yet more preferably 2 mass % or less. If the amount of the viscosity improver as a percentage of the negative active material is within this range, it is possible to control the decrease in battery capacity and the increase in resistance, and to ensure good coating properties.

(Electrode Density)

The electrode structure upon formation of the negative electrode active material to yield an electrode is not particularly limited. However, the density of the negative electrode active material that is present on the collector is preferably 1 g·cm$^{-3}$ or greater, yet more preferably 1.2 g·cm$^{-3}$ or greater, a particularly preferably 1.3 g·cm$^{-3}$ or greater, and preferably 2.2 g·cm$^{-3}$ or less, more preferably 2.1 g·cm$^{-3}$ or less, yet more preferably 2.0 g·cm$^{-3}$ or less, and particularly preferably 1.9 g·cm$^{-3}$ or less. If the density of the negative electrode active material that is present on the collector is within the above-mentioned range, breaking of negative electrode active material particles can be prevented, allowing suppression of an increase in initial irreversible capacity and the deterioration of the high-current density charge-discharge characteristic on account of lower permeability of the nonaqueous electrolyte solution in the vicinity of the interface of the collector/negative electrode active material, while allowing suppression of a decrease in battery capacity and an increase in resistance.

(Thickness of the Negative Electrode Plate)

The thickness of the negative electrode plate is designed in accordance with the positive electrode plate that is used, and is not particularly limited. The thickness of the mixture material layer, resulting from subtracting the thickness of the metal foil from that of the core material, is ordinarily 15 μm or greater, preferably 20 μm or greater, more preferably 30 μm or greater, and ordinarily 300 μm or smaller, preferably 280 μm or smaller, and more preferably 250 μm or smaller.

(Surface Cover of the Negative Electrode Plate)

A surface cover may be used in which a substance having composition different from that of the surface of the negative electrode plate is deposited on the surface of the negative electrode plate. Examples of surface deposition substances include, for instance, oxides such as aluminum oxide, silicon oxide, titanium oxide, zirconium oxide, magnesium oxide, calcium oxide, boron oxide, antimony oxide, and bismuth oxide; sulfates such as lithium sulfate, sodium sulfate, potassium sulfate, magnesium sulfate, calcium sulfate, and aluminum sulfate; and carbonates such as lithium carbonate, calcium carbonate, and magnesium carbonate.

2-2. Positive Electrode

<Positive Electrode Active Material>

Positive electrode active materials that are used in the positive electrode are explained next.

(Composition)

The positive electrode active material is not particularly limited, so long as it is capable of electrochemically absorbing and releasing lithium ions, but, for instance, is preferably a substance that contains lithium and at least one transition metal. Specific examples include, for instance, lithium-transition metal complex oxides, lithium-containing transition metal phosphate compounds and the like.

The transition metal of the lithium-transition metal composite oxide is preferably V, Ti, Cr, Mn, Fe, Co, Ni, Cu or the like, and specific examples include $LiCoO_2$ and other lithium-cobalt composite oxides, $LiNiO_2$ and other lithium-nickel composite oxides, $LiMnO_2$, $LiMn_2O_4$, $Li_2MnO_4$ and other lithium-manganese composite oxides, and such oxides in which some of the transition metal atoms constituting the lithium-transition metal composite oxide have been replaced with another element such as Na, K, B, F, Al, Ti, V, Cr, Mn, Fe, Co, Li, Ni, Cu, Zn, Mg, Ga, Zr, Si, Nb, Mo, Sn, W or the like. Specific examples of substituted oxides include $LiNi_{0.5}Mn_{0.5}O_2$, $LiNi_{0.85}Co_{0.10}Al_{0.05}O_2$, $LiNi_{0.33}Co_{0.33}Mn_{0.33}O_2$, $LiNi_{0.45}Co_{0.10}Al_{0.45}O_2$, $LiMn_{1.8}Al_{0.2}O_4$, $LiMn_{1.5}Ni_{0.5}O_4$ and the like.

The transition metal of the lithium-containing transition metal phosphate compound is preferably V, Ti, Cr, Mn, Fe, Co, Ni, Cu or the like, and specific examples include $LiFePO_4$, $Li_3Fe_2(PO_4)_3$, $LiFeP_2O_7$ and other iron phosphates, $LiCoPO_4$ and other cobalt phosphates, and compounds in which some of the transition metal atoms constituting the lithium-transition metal phosphate compound have been replaced with another element such as Al, Ti, V, Cr, Mn, Fe, Co, Li, Ni, Cu, Zn, Mg, Ga, Zr, Nb, Si or the like.

Including a lithium phosphate in the positive active material is desirable for improving the continuous charge characteristics. There are no limits on the use of the lithium phosphate, but preferably the lithium phosphate is used by mixing it with the positive active material. The amount of the lithium phosphate that is used is preferably at least 0.1 mass %, or more preferably at least 0.3 mass %, or still more preferably at least 0.5 mass %, and the upper limit thereof is preferably 10 mass % or less, or more preferably 8 mass % or less, or still more preferably 5 mass % or less as a percentage of the total of the positive active material and the lithium phosphate.

(Surface Cover)

A surface cover may be used in which a substance having composition different from that of the surface of the positive electrode active material is deposited on the surface of the positive electrode active material. Examples of surface deposition substances include, for instance, oxides such as aluminum oxide, silicon oxide, titanium oxide, zirconium oxide, magnesium oxide, calcium oxide, boron oxide, antimony oxide, and bismuth oxide; sulfates such as lithium sulfate, sodium sulfate, potassium sulfate, magnesium sulfate, calcium sulfate, and aluminum sulfate; carbonates such as lithium carbonate, calcium carbonate, and magnesium carbonate; and carbons.

The surface deposition substances may be deposited on the positive electrode active material surface in accordance with a method that involves, for instance, dissolving or suspending the surface deposition substance in a solvent, and causing the surface deposition substance to be impregnated into/added to the positive electrode active material, followed by drying, or a method that involves dissolving or suspending a surface deposition substance precursor in a solvent, and causing the precursor to be impregnated into/added to the positive electrode active material, followed by heating or the like to elicit a reaction; or a method that involves addition of a surface deposition substance precursor to a positive electrode active material precursor, with simultaneous firing of the foregoing. In a case where carbon is to be deposited, a method may be resorted to wherein a carbonaceous substance, for instance in the form of activated carbon or the like, is mechanically deposited at a later time.

The amount of surface deposition substance is preferably, as a lower limit, 0.1 ppm or more, more preferably 1 ppm or more, yet more preferably 10 ppm or more, and, as an upper limit, is preferably 20% or less, more preferably 10% or less and yet more preferably 5% or less. The surface deposition substance allows suppressing oxidation reactions of the electrolyte solution at the positive electrode active material surface, and allows enhancing battery life. However, the effect elicited by the surface deposition substance fails to be sufficiently brought out if the deposition amount is excessively low, while if the deposition amount is excessively large, resistance may increase as a result of hindered traffic of lithium ions.

In the present invention, "positive electrode active material" denotes also a positive electrode active material such that a substance of a composition different from that of the positive electrode active material is deposited on the surface of the positive electrode active material.

(Shape)

The shape of the particles of the positive electrode active material may be, for instance, lumpy, polyhedral, spherical, oval-spherical, plate-like, needle-like or columnar, as in conventional instances. The primary particles may also aggregate to form secondary particles.

(Tap density)

The tap density of the positive active material is preferably at least 0.5 g/cm$^3$, or more preferably at least 0.8 g/cm$^3$, or still more preferably at least 1.0 g/cm$^3$. If the tap density of the positive active material is within this range, it is possible to control the amount of dispersion medium, conductive material and binder required for forming the positive active material layer and as a result, to ensure filling rate of the positive active material and the battery capacity. A high-density positive active material layer can be formed using a composite oxide powder with a high tap density. In general the tap density is preferably as high as possible, with no particular upper limit, but it is preferably 4.0 g/cm$^3$ or less, or more preferably 3.7 g/cm$^3$ or less, or still more preferably 3.5 g/cm$^3$ or less. Within this range it is possible to control the reduction in the load characteristics.

In the present invention, the tap density is determined by placing 5 to 10 g of the positive active material powder in a 10 ml glass graduated cylinder, and determining the powder fill density (tap density, g/cc) by tapping 200 times with a roughly 20 mm stroke.

(Median Diameter d50)

The median diameter d50 of the particles of the positive electrode active material (secondary particle diameter in a case where secondary particles are formed through aggregation of primary particles) is preferably 0.3 µm or greater, more preferably 0.5 µm or greater, yet more preferably 0.8 µm or greater and most preferably 1.0 µm or greater, and, as an upper limit, is preferably 30 µm or smaller, more preferably 27 µm or smaller, yet more preferably 25 µm or smaller and most preferably 22 µm or smaller. Within the above-mentioned range, a high tap-density product can be achieved, suppressing the impairment of battery performance, while suppressing problems such as formation of streaks during production of the positive electrode of the battery, i.e. during preparation of a slurry using the active material, the conductive material, the binder and so forth, and upon coating of the slurry in the form of thin film. Fillability during production of the positive electrode can be further enhanced by mixing two or more types of positive electrode active materials having different median diameters d50.

In the present invention, the median diameter d50 is measured using a known laser diffraction/scattering particle size measurement instrument. In a case where LA-920, by HORIBA, is used as a particle size distribution analyzer, measurements are performed by using a 0.1 mass % aqueous solution of sodium hexametaphosphate, as the dispersion medium during measurement, and by setting the measurement refractive index to 1.24 after minutes of ultrasonic dispersion.

(Average Primary Particle Size)

In a case where secondary particles are formed through aggregation of primary particles, the average primary particle size of the positive electrode active material is preferably 0.05 µm or greater, more preferably 0.1 µm or greater, yet more preferably 0.2 µm or greater, and, as an upper limit, is preferably 5 µm or smaller, more preferably 4 µm or smaller, yet more preferably 3 µm or smaller and most preferably 2 µm or smaller. Within this range, it is possible to ensure the powder filling properties and the specific surface area while controlling the decrease in battery performance, and to ensure charge-discharge reversibility by obtaining a suitable degree of crystallinity.

In the present invention, the primary particle size is measured through observation using a scanning electron microscope (SEM). Specifically, the largest value of a section by a left-right boundary of primary particles with respect to a straight line in the horizontal direction, is worked out, in micrographs at a 10000× magnification, for 50 arbitrary primary particles. The average of the values is taken then as the primary particle size.

(BET Specific Surface Area)

The BET specific surface area of the positive active material is preferably at least 0.1 m$^2$/g, or more preferably at least 0.2 m$^2$/g, or still more preferably at least 0.3 m$^2$g, while the upper limit is 50 m$^2$/g, or preferably 40 m$^2$/g, or more preferably 30 m$^2$/g. With a BET specific surface area within this range, it is possible to ensure battery performance while maintaining good coating properties of the positive active material.

In the present invention, a BET specific surface area is defined by a value obtained using a surface area meter (for example, automatic surface area analyzer, by Ohkura Riken), by pre-drying a sample, under a nitrogen stream, at 150° C. for 30 minutes, after which the specific surface area is measured according to the nitrogen-adsorption BET one-point method, by gas flow, using a nitrogen-helium mixed gas prepared so that the value of relative pressure is exactly 0.3 with respect to atmospheric pressure.

(Method of Manufacturing Positive Active Material)

A common method of manufacturing inorganic compounds may be used as the method of manufacturing the positive active material. Various methods are possible for preparing spherical or oval spherical active materials in particular, and these include for example a method of dissolving or pulverizing and dispersing the raw transition metal material in a solvent such as water, adjusting the pH with agitation and collecting a spherical precursor, which is then dried as necessary, and then adding a Li source such as LiOH, $Li_2CO_3$, $LiNO_3$ or the like and baking at a high temperature to obtain the active material.

For production of the positive electrode, the above-mentioned positive active materials may be used singly, or concurrently with one or more types having different compositions, in any combinations and ratios. Desirable combinations in this case include combinations of $LiCoO_2$ with $LiMn_2O_4$ or oxides such as $LiNi_{0.33}Co_{0.33}Mn_{0.33}O_2$ in which other transition metals have been substituted for part of the Mn of $LiMn_2O_4$, or combinations with $LiCoO_2$ or oxides comprising $LiCoO_2$ with another transition metal substituted for part of the Co.

<Configuration and Production Method of the Positive Electrode>

The configuration of the positive electrode is explained next. In the present invention, the positive electrode is produced by forming, onto a collector a positive electrode active material layer that contains the positive electrode active material and a binder. The positive electrode that uses a positive electrode active material can be produced in accordance with ordinary methods. Specifically, the positive electrode active material and the binder, and, as the case may require, a conductive material, a thickener and the like, are dry-mixed to yield a sheet-like mixture that is then pressure-bonded against a positive electrode collector; alternatively, these materials are dissolved or dispersed in a liquid medium, to yield a slurry that is then coated onto a positive electrode collector, followed by drying, to form a positive electrode active material layer on the collector. The positive electrode can be obtained thereby.

The content of positive electrode active material in the positive electrode active material layer is preferably 80 mass % or more, more preferably 82 mass % or more, and particularly preferably 84 mass % or more. The upper limit is preferably 99 mass % or less, and more preferably 98 mass % or less. Within this range, it is possible to both ensure the electrical capacity of the positive active material in the positive active material layer, and to maintain the strength of the positive electrode.

In order to increase the packing density of the positive electrode active material, the positive electrode active material layer that is obtained by coating and drying is preferably compacted using a hand press, a roller press or the like. The density of the positive electrode active material layer is, as a lower limit, preferably 1.5 $g/cm^3$ or higher, more preferably 2 $g/cm^3$, yet more preferably 2.2 $g/cm^3$ or higher, and, as an upper limit, is preferably 5 $g/cm^3$ or lower, more preferably 4.5 $g/cm^3$ or lower, and yet more preferably 4 $g/cm^3$ or lower. Within this range, it is possible to obtain good charge-discharge characteristics and control the increase in electrical resistance.

(Conductive Material)

Any known materials can be used as the conductive material. Specific examples thereof include, for instance, metallic materials such as copper and nickel; graphite such as natural graphite and artificial graphite; carbon black such as acetylene black; and carbon materials such as amorphous carbon, for instance needle coke or the like. The foregoing may be used singly as one type, or as two or more concurrent types in any combinations and ratios. The content of conductive material that is used in the positive electrode active material layer is ordinarily 0.01 mass % or more, preferably 0.1 mass % or more, more preferably 1 mass % or more and, as an upper limit, ordinarily 50 mass % or less, preferably 30 mass % or less, more preferably 15 mass % or less. Within this range, it is possible to ensure adequate conductivity and battery capacity.

(Binder)

The binder used to produce the positive electrode active material layer is not particularly limited, and may be any material that is dissolved or dispersed in the liquid medium that is used during electrode production, in the case of a coating method. Specific examples thereof include, for instance, resin-based polymers such as polyethylene, polypropylene, polyethylene terephthalate, polymethyl methacrylate, polyimide, aromatic polyamide, cellulose, and nitrocellulose; rubber-like polymers such as SBR (styrene-butadiene rubber), NBR (acrylonitrile-butadiene rubber), fluororubber, isoprene rubber, butadiene rubber, and ethylene-propylene rubber; thermoplastic elastomeric polymers such as styrene-butadiene-styrene block copolymers or hydrogenated products thereof, EPDM (ethylene-propylene-diene terpolymer), styrene-ethylene-butadiene-ethylene copolymers, and styrene-isoprene-styrene block copolymers or hydrogenated products thereof; soft resin-like polymers such as syndiotactic-1,2-polybutadiene, polyvinyl acetate, ethylene-vinyl acetate copolymers, and propylene-α-olefin copolymers; fluoropolymers such as polyvinylidene fluoride (PVdF), polytetrafluoroethylene, fluorinated polyvinylidene fluoride, and polytetrafluoroethylene-ethylene copolymers; and polymer compositions having ionic conductivity towards alkali metal ions (in particular, lithium ions). These substances may be used singly as one type, or as two or more concurrent types in any combinations and ratios.

The proportion of binder in the positive electrode active material layer is ordinarily 0.1 mass % or more, preferably 1 mass % or more, and yet more preferably 1.5 mass % or more, and, as an upper limit, is ordinarily 80 mass % or less, preferably 60 mass % or less, yet more preferably 40 mass % or less and most preferably 10 mass % or less. If the proportion of the binder is too low, the binder may fail to sufficiently hold the positive electrode active material, the mechanical strength of the positive electrode may be insufficient, and battery performance in terms of cycle characteristic may be poorer. If the proportion of binder is excessively high, battery capacity and conduction may decrease.

(Slurry-forming Solvent)

The solvent used for forming the slurry is not particularly limited, and may be any aqueous solvent or organic solvent, provided that the solvent can dissolve or disperse the positive electrode active material, the conductive material, the binder, as well as a thickener that is used as the case may require. Examples of aqueous media include water and mixtures of alcohol and water and the like. Examples of organic media include hexane and other aliphatic hydrocarbons; benzene, toluene, xylene, methyl naphthalene and other aromatic hydrocarbons; quinoline, pyridine and other heterocyclic compounds; acetone, methyl ethyl ketone, cyclohexanone and other ketones; methyl acetate, methyl acrylate and other esters; diethylene triamine, N,N-dimethylaminopropylamine and other amines; diethyl ether, propylene oxide, tetrahydrofuran (THF) and other ethers;

N-methylpyrrolidone (NMP), dimethyl formamide, dimethyl acetamide and other amides; and hexamethyl phosphoramide, dimethyl sulfoxide and other aprotic polar solvents and the like.

If an aqueous medium is used, in particular, a slurry is preferably formed using a thickener and a latex of styrene-butadiene rubber (SBR) or the like. A thickener is ordinarily used in order to adjust the viscosity of the slurry. The thickener is not particularly limited, and specific examples thereof include, for instance, carboxymethyl cellulose, methyl cellulose, hydroxymethyl cellulose, ethyl cellulose, polyvinyl alcohol, starch oxide, phosphorylated starch, casein, as well as salts thereof. The foregoing may be used singly as one type, or as two or more concurrent types in any combinations and ratios. If a thickener is further added, then the proportion of the thickener with respect to the active material is 0.1 mass % or more, preferably 0.2 mass % or more, and more preferably 0.3 mass % or more, and, as an upper limit, is 5 mass % or less, preferably 3 mass % or less and more preferably 2 mass % or less. Within this range, it is possible to obtain good coating properties and to control the decrease in battery capacity and increase in resistance.

(Collector)

The material of the positive electrode collector is not particularly limited, and any known material can be used. Specific examples thereof include, for instance, metallic materials such as aluminum, stainless steel, nickel plating, titanium, and tantalum; and carbon materials such as carbon cloth and carbon paper. Preferred among the foregoing are metallic materials, in particular aluminum.

In a case where the collector is a metallic material, the collector may be shaped, for instance, as a metal foil, metal cylinder, metal coil, metal plate, metal thin film, expanded metal, punched metal, foamed metal or the like. In the case of a carbon material, the collector may be shaped as a carbon plate, carbon thin film, carbon cylinder or the like. A metal thin film is preferred among the foregoing. The thin film may be appropriately formed as a mesh. The thickness of the thin film may be any thickness, but is ordinarily 1 µm or greater, preferably 3 µm or greater, more preferably 5 µm or greater, and, as an upper limit, is ordinarily 1 mm or smaller, preferably 100 µm or smaller and more preferably 50 µm or smaller, in terms of the strength and handling properties as a collector.

Preferably, a conductive aid is coated onto the surface of the collector, in terms of lowering the contact resistance between the collector and the positive electrode active material layer. Examples of conductive aids include, for instance, carbon and noble metals such as gold, platinum, and silver.

The ratio between the thicknesses of the collector and the positive electrode active material layer is not particularly limited, but the value of "(thickness of the positive electrode active material layer on one side immediately prior to injection of electrolyte solution)/(collector thickness)" is preferably 20 or smaller, more preferably 15 or smaller, and most preferably 10 or smaller, and preferably 0.5 or greater, more preferably 0.8 or greater and most preferably 1 or greater. If the ratio exceeds the above-mentioned range, the collector may heat up, on account of Joule heat, during charge and discharge at a high current density. Within this range, it is possible to control heat production in the collector during charge and discharge at high current densities, and ensure battery capacity.

(Electrode Area)

When using the nonaqueous electrolyte solution of the present invention, it is desirable to increase the area of the positive active material layer relative to the external surface area of the outer battery case in order to increase stability at high outputs and high temperatures. Specifically, the sum of the electrode area of the positive electrode is preferably at least 15 times or more preferably at least 40 times (area ratio) the surface area of the outer case of the secondary battery. If the case is a rectangular case with a bottom, the external surface area of the outer case is the total area as calculated from the dimensions of height, width and thickness of the part of the case filled with the power generating components, excluding the terminals and protruding parts. If it is a cylindrical case with a bottom, the external surface area is the geometric area of a cylinder approximating the case part filled with the power generating components, excluding the terminals and protruding parts. The sum of the electrode area of the positive electrode is the geometric surface area of the positive mix layer facing the mix layer containing the negative active material, and in a structure having positive mix layers formed on both surfaces with a collector layer in between, it is the sum of the separately calculated areas of both surfaces.

(Thickness of the Positive Electrode Plate)

The thickness of the positive electrode plate is not particularly limited. In terms of high capacity and high output, however, the thickness of the mixture material layer resulting from subtracting the thickness of the metal foil from that of the core material, has a lower limit, with respect to one face of the collector, that is preferably 10 µm or greater, more preferably 20 µm or greater, and, as an upper limit, is preferably 500 µm or smaller and more preferably 450 µm or smaller.

(Surface Cover of the Positive Electrode Plate)

A surface cover may be used in which a substance having composition different from that of the surface of the positive electrode plate is deposited on the surface of the positive electrode plate. Examples of surface-deposited substances include, for instance, oxides such as aluminum oxide, silicon oxide, titanium oxide, zirconium oxide, magnesium oxide, calcium oxide, boron oxide, antimony oxide, and bismuth oxide; sulfates such as lithium sulfate, sodium sulfate, potassium sulfate, magnesium sulfate, calcium sulfate, and aluminum sulfate; carbonates such as lithium carbonate, calcium carbonate, and magnesium carbonate; and carbons.

2-3. Separator

Ordinarily, a separator is interposed between the positive electrode and the negative electrode, in order to prevent short-circuits. Ordinarily, the nonaqueous electrolyte solution of the present invention is used by being impregnated into such a separator.

The material and shape of the separator are not particularly limited, and any known materials and shapes may be used, so long as the effect of the present invention is not significantly impaired thereby. Among the foregoing there are preferably used, for instance, a resin, glass fibers, inorganic materials or the like that are formed out of a stable material towards the nonaqueous electrolyte solution of the present invention, in the form of a porous sheet or nonwoven fabric-like member having excellent liquid retention.

Examples of materials of resin and glass-fiber separators include, for instance, polyolefins such as polyethylene and polypropylene, aromatic polyamide, polytetrafluoroethylene, polyether sulfone, and glass filters. Preferred among the foregoing are glass filters and polyolefins, and yet more preferably polyolefins. These materials may be used singly as one type, or as two or more concurrent types in any combinations and ratios.

The separator may be of any thickness, but the thickness is ordinarily 1 μm or greater, preferably 5 μm or greater, more preferably 8 μm or greater, and ordinarily 50 μm or smaller, preferably 40 μm or smaller and more preferably 30 μm or smaller. Within this range, it is possible to ensure the energy density and battery performance including rate characteristics while ensuring the insulating properties and mechanical strength.

When using a porous separator such as a porous sheet or a nonwoven fabric, the separator may have any porosity, but the porosity is ordinarily 20% or more, preferably 35% or more, and yet more preferably 45% or more, and ordinarily 90% or less, preferably 85% or less and yet more preferably 75% or less. With a void ratio within this range, it is possible to control film resistance and obtain good rate characteristics while ensuring the insulating properties and mechanical strength.

The separator may have any average pore diameter, but the average pore diameter is ordinarily 0.5 μm or smaller, preferably 0.2 μm or smaller and ordinarily 0.05 μm or greater. Short-circuits are likely to occur if the average pore diameter exceeds the above-mentioned range. With an average pore size within this range, it is possible to control film resistance and obtain good rate characteristics while preventing short-circuits. The inorganic material that is used is, for instance, an oxide such as alumina and silicon dioxide, a nitride such as aluminum nitride and silicon nitride, or a sulfate such as barium sulfate and calcium sulfate, in the form of particles or fibers.

The separator may be used in the form of a thin film of a nonwoven fabric, a woven fabric, a micro-porous film or the like. As regards thin-film shape, a thin film having a pore diameter ranging from 0.01 to 1 μm and thickness ranging from 5 to 50 μm is appropriately used. Other than the above independent thin-film shape, a separator can also be used that is obtained by forming, on the surface layer of the positive electrode and/or the negative electrode, a composite porous layer containing particles of the above-described inorganic material, using a resin binder. For instance, a porous layer can be formed, on both sides of a positive electrode, out of alumina particles such that 90%-particle size is smaller than 1 μm, using a fluororesin as a binder.

2-4. Battery Design

<Electrode Group>

The electrode group may be a stacked structure in which the above-described separator is interposed between the above-described positive electrode plate and negative electrode plate, or a structure wherein the above-described positive electrode plate and negative electrode plate are wound spirally, with the above-described separator interposed in between. The proportion of the volume of the electrode group in the internal volume of the battery (hereafter, referred to as electrode group occupancy rate) is ordinarily 40% or more, preferably 50% or more, and ordinarily 90% or less, preferably 80% or less. With an electrode group occupancy rate within this range, it is possible to ensure battery capacity while suppressing the declines in repeat charge-discharge performance and high-temperature storage performance that occur when the internal pressure rises, and also to prevent the gas release valve from operating.

(Collector Structure)

The collector structure is not particularly limited, but is preferably a structure that reduces the resistance of the wiring parts and junction parts.

When the electrode group has the stacked structure described above, a structure formed by bundling the metal cores of the electrode layers together and welding them to a terminal can be used by preference. Since the internal resistance is increased when the electrode area of a single electrode sheet is large, it is also desirable to decrease resistance by providing multiple terminals within the electrode. When the electrode group has the wound structure described above, multiple lead structures can be provided for both the positive and negative electrodes, and tied together to the terminals to decrease internal resistance.

<Outer Case>

The material of the outer case is not particularly limited, so long as it is a substance that is stable in the nonaqueous electrolyte solution that is used. Specific examples of the material that can be used include, for instance, metals such as nickel-plated steel plate, stainless steel, aluminum or aluminum alloys, and magnesium alloys; and a multilayer film (laminate film) of resin and aluminum foil. A metal such as aluminum or aluminum alloy, or a laminate film, is appropriately used from the viewpoint of achieving lighter weights.

Examples of outer cases that utilize metals include, for instance, outer cases having an airtight sealed structure resulting from welding metals together by laser welding, resistance welding, ultrasonic welding or the like. In an alternative structure, the metals may be crimped to each other with a resin-made gasket interposed in between. Examples of an outer case that utilizes the above-mentioned laminate film include, for instance, outer cases having an airtight sealed structure through thermal pressure-bonding of resin layers to each other. In order to enhance sealability, a resin that is different from that of the resins used in the laminate film may be interposed between the above-mentioned resin layers. In the particular case of a sealed structure resulting from thermal pressure-bonding of resin layers with interposed collecting terminals, metal and resin are joined to each other, and hence a resin having polar groups or a resin that is modified through introduction of polar groups is appropriately used as the interposed resin. The shape of the outer package may be any shape. For instance the outer package may be of cylindrical type, box-like type, laminate type, coin type, large type or the like.

<Protective Element>

As the protective element there can be used, for instance, a PTC (positive temperature coefficient) in which resistance increases upon abnormal heat generation or upon excessive current flow, a temperature fuse, a thermistor, or a valve (current shutoff valve) that shuts off current that flows in a circuit when the internal pressure and/or internal temperature in the battery rise suddenly upon abnormal heat generation. As the protective element there is preferably selected a protective element that is in an inoperative condition during ordinary use with high current. More preferably, the battery is designed so that abnormal heat generation or thermal runaway does not occur even in the absence of the protective element.

EXAMPLES

The present invention will be explained in more detail next based on examples and referential examples. However, the present invention is not limited to these examples, and may be modified and carried out in any ways without departing from the spirit of the present invention.

Compounds that are used in the present Examples and represented by the above-given General Formula (1) are shown below.

[C11]

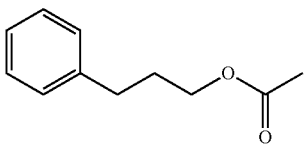

3-phenyl-n-propyl acetate (j=3, k=0)

[C12]

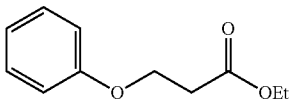

Ethyl phenoxypropionate (j=0, k=2)

[C13]

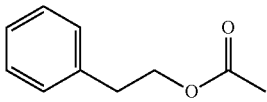

2-phenylethyl acetate (j=2, k=0)

The compounds used in the comparative examples were as follows.

[C14]

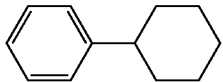

Cyclohexyl benzene

[C15]

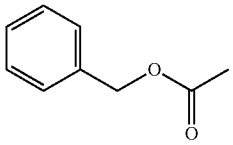

Benzyl acetate (j=1, k=0)

[C16]

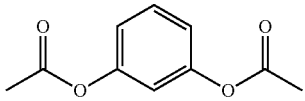

1,3-diacetoxybenzene (j=0, k=0)

[C17]

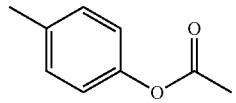

p-cresyl acetate (j=0, k=0)

(Test 1)

Example 1-1

(Explanation of Test Operations)

[Manufacture of Positive Electrode]

A slurry was formed by mixing with a disperser, in an N-methylpyrrolidone solvent, 84 mass % of a lithium-cobalt oxide (LiCoO$_2$) and 10 mass % of a lithium-nickel-cobalt-manganese composite oxide (LiNi$_{1/3}$CO$_{1/3}$Mn$_{1/3}$O$_2$), as positive electrode active materials, 3 mass % of acetylene black, as a conductive material, and 3 mass % of polyvinylidene fluoride (PVdF), as a binder. This was coated uniformly on both sides of an aluminum foil, dried, and pressed to form the positive electrode.

[Manufacture of Negative Electrode]

94 mass % of graphite powder and 6 mass % of PVdF were mixed as the negative electrode active materials, and N-methylpyrrolidone was added to form a slurry, which was then coated on one side of a copper collector and dried to obtain the negative electrode.

[Preparation of Nonaqueous Electrolyte Solution]

The electrolyte LiPF$_6$ was dissolved at a rate of 1.0 mol/L in a mixed solvent of ethylene carbonate (hereunder sometimes called "EC"), ethyl methyl carbonate (hereunder sometimes called "EMC") and dimethyl carbonate (hereunder sometimes called "DMC") (mixed volume ratio 3:3:4) in a dry argon atmosphere to prepare a basic electrolyte solution. 1.0 mass % of 3-phenyl-n-propyl acetate and 1.0 mass % of monofluoroethylene carbonate (hereunder sometimes called "MFEC") were then added as additives to this basic electrolyte solution, to prepare the nonaqueous electrolyte solution of Example 1-1.

[Production of a Nonaqueous Electrolyte Secondary Battery]

The above-described positive electrode, negative electrode, and a polyethylene separator were sequentially stacked, in the order of negative electrode, separator, positive electrode, separator, and negative electrode. The battery element obtained in this way was enclosed in a cylindrical aluminum laminate case, the aforementioned nonaqueous electrolyte solution was injected, and the case was vacuum sealed to prepare a sheet-shaped nonaqueous electrolyte solution secondary battery. This was then sandwiched between glass plates and pressed to increase the adhesiveness between electrodes.

[Initial Capacity Evaluation Test]

This was subjected to constant-current, constant voltage charging (hereunder sometimes called "CCCV charging") to 4.1 V at a current corresponding to 0.2 C in a 25° C. thermostatic tank, and was then subjected to discharging to 3 V at 0.2 C. This operation was repeated three times. Next, the battery was subjected to CCCV charging (0.05 C cut) up to 4.2 V at 0.2 C, and was discharged again down to 3 V at 0.2 C. Further, the battery was subjected to CCCV charging (0.05 C cut) up to 4.2 V at 0.2 C, and was discharged again down to 3 V at 1.0 C, to determine the initial high-rate capacity. After the evaluation of initial battery capacity was complete, the battery was immersed in an ethanol solution, its mass was measured, and the amount of gas emitted was determined based on the difference in mass before and after the capacity evaluation test. This was given as the initial gas amount.

Herein, 1 C represents the current value for discharge of the reference capacity of the battery over 1 hour. For example, 0.2 C represents a current value that is ⅕ of 1 C.

[Evaluation Test of High-temperature Storage Characteristic]

The nonaqueous electrolyte battery for which the evaluation test of initial capacity had been carried out was subjected again to CCCV charging (0.05 C cut) to 4.2 V at 0.2 C, and was stored thereafter at high temperature, at 85° C., for 24 hours. After sufficient cooling of the battery, the mass of the latter was measured through immersion in an ethanol bath, to work out the amount of gas generated, on the basis of changes in mass before and after storage. This was given as the storage gas amount. Next, the battery was discharged to 3 V at 0.2 C, 25° C. It was then CCCV charged (0.05 C cut) to 4.2 V at 0.2 C, and then discharged to 3 V at 0.2 C, and the 0.2 C discharge capacity after the high-temperature storage characteristics test was measured and given as the 0.2 C capacity after storage.

The initial capacity evaluation test and high-temperature storage characteristics test were performed using the nonaqueous electrolyte solution secondary battery prepared above. The evaluation results are given in Table 1.

Example 1-2

An evaluation was performed as in Example 1-1 except that 1.0 masse of 3-phenyl-n-propyl acetate and 1.0 mass % lithium bis(oxalato) borate (hereunder sometimes called "LiBOB") were added as additives. The results are given in Table 1.

Example 1-3

An evaluation was performed as in Example 1-1 except that 1.0 mass % of 3-phenyl-n-propyl acetate and 0.5 mass % of LiPO$_2$F$_2$ were added as additives. The results are given in Table 1.

Example 1-4

An evaluation was performed as in Example 1-1 except that 1.0 mass % of 3-phenyl-n-propyl acetate and 0.5 mass % of hexamethylene diisocyanate (hereunder sometimes called "HMDI") were added as additives. The results are given in Table 1.

Example 1-5

An evaluation was performed as in Example 1-1 except that 1.0 mass % of 3-phenyl-n-propyl acetate, 1.0 mass % of MFEC, 1.0 mass % of LiBOB and 1.0 mass % of HMDI were added as additives. The results are given in Table 1.

Example 1-6

An evaluation was performed as in Example 1-1 except that 1.0 mass % of ethyl phenoxypropionate, 1.0 mass % of MFEC, 1.0 mass % of LiBOB and 1.0 mass % HMDI were added as additives. The results are given in Table 1.

Comparative Example 1-1

An evaluation was performed as in Example 1-1 except that no additives were added. The results are given in Table 1.

Comparative Example 1-2

An evaluation was performed as in Example 1-1 except that 1.0 mass % of 3-phenyl-n-propyl acetate was added as an additive. The results are given in Table 1.

Comparative Example 1-3

An evaluation was performed as in Example 1-1 except that 1.0 mass % of MFEC was added as an additive. The results are given in Table 1.

Comparative Example 1-4

An evaluation was performed as in Example 1-1 except that 1.0 mass % of LiBOB was added as an additive. The results are given in Table 1.

Comparative Example 1-5

An evaluation was performed as in Example 1-1 except that 0.5 mass % of LiPO$_2$F$_2$ was added as an additive. The results are given in Table 1.

Comparative Example 1-6

An evaluation was performed as in Example 1-1 except that 0.5 mass % of HMDI was added as an additive. The results are given in Table 1.

Comparative Example 1-7

An evaluation was performed as in Example 1-1 except that 1.0 mass % of MFEC, 1.0 mass % of LiBOB and 1.0 mass % of HMDI were added as additives. The results are given in Table 1.

Comparative Example 1-8

An evaluation was performed as in Example 1-1 except that 1.0 mass % of 3-phenyl-n-propyl acetate and 1.0 mass % of vinylene carbonate (hereunder sometimes called "VC") were added as additives. The results are given in Table 1.

Comparative Example 1-9

An evaluation was performed as in Example 1-1 except that 1.0 mass % of cyclohexyl benzene, 1.0 mass % of MFEC, 1.0 mass % of LiBOB and 1.0 mass % of HMDI were added as additives. The results are given in Table 1.

TABLE 1

| | Additive 1 | | Additive 2 | | Initial high-rate capacity/% | 0.2 C capacity after storage/% | Storage gas amount/% |
|---|---|---|---|---|---|---|---|
| | Type | Content/mass % | Type | Content/mass % | | | |
| Example 1-1 | 3-phenyl-n-propyl acetate | 1.0 | MFEC | 1.0 | 109 | 106 | 48 |
| Example 1-2 | 3-phenyl-n-propyl acetate | 1.0 | LiBOB | 1.0 | 109 | 107 | 81 |
| Example 1-3 | 3-phenyl-n-propyl acetate | 1.0 | $LiPO_2F_2$ | 0.5 | 118 | 106 | 68 |
| Example 1-4 | 3-phenyl-n-propyl acetate | 1.0 | HMDI | 0.5 | 108 | 96 | 62 |
| Example 1-5 | 3-phenyl-n-propyl acetate | 1.0 | MFEC<br>LiBOB<br>HMDI | 1.0<br>1.0<br>1.0 | 116 | 106 | 68 |
| Example 1-6 | Ethyl phenoxypropionate | 1.0 | MFEC<br>LiBOB<br>HMDI | 1.0<br>1.0<br>1.0 | 111 | 106 | 35 |
| Comparative Example 1-1 | — | — | — | — | 100 | 100 | 100 |
| Comparative Example 1-2 | 3-phenyl-n-propyl acetate | 1.0 | — | — | 106 | 97 | 113 |
| Comparative Example 1-3 | — | — | MFEC | 1.0 | 79 | 99 | 97 |
| Comparative Example 1-4 | — | — | LiBOB | 1.0 | 111 | 102 | 103 |
| Comparative Example 1-5 | — | — | $LiPO_2F_2$ | 0.5 | 126 | 103 | 71 |
| Comparative Example 1-6 | — | — | HMDI | 0.5 | 110 | 83 | 42 |
| Comparative Example 1-7 | — | — | MFEC<br>LiBOB<br>HMDI | 1.0<br>1.0<br>1.0 | 97 | 109 | 90 |
| Comparative Example 1-8 | 3-phenyl-n-propyl acetate | 1.0 | VC | 1.0 | 102 | 105 | 161 |
| Comparative Example 1-9 | Cyclohexyl benzene | 1.0 | MFEC<br>LiBOB<br>HMDI | 1.0<br>1.0<br>1.0 | 97 | 101 | 90 |

Comparative value based on 100% in Comparative Example 1-1

It can be seen from Table 1 that using the nonaqueous electrolyte solutions of Examples 1-1 to 1-6 of the present invention, the initial high-rate capacity, 0.2 C capacity after storage and storage gas amount were improved in comparison with the solution in which no additives were used (Comparative Example 1-1).

When a Group (I) compound alone was added (Comparative Example 1-2), the initial high-rate capacity was somewhat improved, but this was still unsatisfactory because the 0.2 C capacity after storage and the storage gas amount were actually worse.

When Group (II) compounds alone were added (Comparative Examples 1-2 to 1-7), there was some improvement in the initial high-rate capacity, 0.2 C capacity after storage and storage gas amount, but this effect was small and the results were not satisfactory.

Using compounds belonging to neither Group (I) nor Group (II) (Comparative Examples 1-8 and 1-9), there was insufficient improvement in the initial high-rate capacity, 0.2 C capacity after storage and storage gas amount.

This confirms that a specific improvement effect on the battery characteristics is obtained when a Group (I) compound and a Group (II) compound are used simultaneously.

(Test 2)

Example 2-1

(Explanation of Test Operations)
[Manufacture of Positive Electrode]

A slurry was formed by mixing with a disperser, in an N-methylpyrrolidone solvent, 90 mass % of a lithium-nickel-cobalt-manganese composite oxide ($LiNi_{1/3}Co_{1/3}Mn_{1/3}O_2$), as a positive electrode active material, 7 mass % of carbon black, as a conductive material, and 3 mass % of polyvinylidene fluoride (PVdF), as a binder. This was coated uniformly on both sides of an aluminum foil, dried, and pressed to form the positive electrode.

[Manufacture of Negative Electrode]

A slurry was formed by adding and mixing with a disperser, amorphous coated graphite powder, as a negative electrode active material, an aqueous dispersion of sodium carboxymethyl cellulose (sodium carboxymethyl cellulose concentration 1 mass %), as a thickener, and an aqueous dispersion of styrene-butadiene rubber (styrene-butadiene rubber concentration 50 mass %), as a binder. This slurry was coated uniformly on one side of a copper foil, dried, and then pressed to form the negative electrode. This was prepared so that the ratio of amorphous coated graphite: carboxymethyl cellulose sodium:styrene butadiene rubber in the dried negative electrode was 97.5:1.5:1 by mass.

[Preparation of Nonaqueous Electrolyte Solution]

The electrolyte $LiPF_6$ was dissolved at a rate of 1.0 mol/L in a mixed solvent of EC, EMC and DMC (mixing volume ratio 3:3:4) in a dry argon atmosphere to prepare a basic electrolyte solution. 4.0 mass % of 3-phenyl-n-propyl acetate and 1.0 mass % of 1,3-propane sultone (hereunder sometimes called "PS") were added as additives to this basic electrolyte solution to prepare the nonaqueous electrolyte solution of Example 2-1.

[Production of a Nonaqueous Electrolyte Secondary Battery]

The above-described positive electrode, negative electrode, and a polypropylene separator were sequentially stacked, in the order of negative electrode, separator and positive electrode. The battery element obtained in this way was enclosed in a bag-shaped aluminum laminate film, the aforementioned nonaqueous electrolyte solution was injected, and the bag was vacuum sealed to prepare a sheet-shaped nonaqueous electrolyte solution secondary battery. This was then sandwiched between glass plates and pressed to increase the adhesiveness between electrodes.

[Initial Conditioning]

In a thermostatic chamber at 25° C., the battery was subjected to CCCV charging (0.05 C cut) up to 4.1 V at a current equivalent to ⅓ C, and was discharged down to 3 V at 0.3 C. This operation was repeated three times. Next, the battery was subjected to CCCV charging (0.05 C cut) up to 4.2 V at ⅓ C, and was discharged again down to 3 V at ⅓ C, to carry out the initial conditioning of the battery.

[Overcharge Characteristics Evaluation Test]

After completion of initial conditioning, the battery was again CCCV charged (0.05 cut) to 4.2 V at 25° C. at a constant current of ⅓ C and then immersed in ethanol, and the volume was measured. Subsequently, a current of 1 C was applied for 0.8 hour at 45° C. After sufficient cooling of the battery, the volume of the latter was measured through immersion in an ethanol bath, to work out the amount of overcharge gas generated, on the basis of changes in volume before and after the evaluation test of overcharge characteristic.

A greater amount of overcharge gas means that the safety valve can be operated more quickly in a battery that senses abnormal rises in internal pressure due to overcharge or other abnormal conditions and operates a safety valve in response.

The overcharge characteristics evaluation test was performed using the nonaqueous electrolyte solution secondary battery prepared above. The evaluation results are given in Table 2.

Example 2-2

An evaluation was performed as in Example 2-1 except that 4.0 mass % of 3-phenyl-n-propyl acetate and 0.5 mass % of $LiBF_4$ were added as additives. The results are given in Table 2.

Example 2-3

An evaluation was performed as in Example 2-1 except that 4.0 mass % of 3-phenyl-n-propyl acetate and 0.25 mass % of lithium fluorosulfonate ($FSO_3Li$) were added as additives. The results are given in Table 2.

Example 2-4

An evaluation was performed as in Example 2-1 except that 4.0 mass % of 3-phenyl-n-propyl acetate and 0.5 mass % of hexamethyl disilane (hereunder sometimes called "HMDS") were added as additives. The results are given in Table 2.

Comparative Example 2-1

An evaluation was performed as in Example 2-1 except that no additives were added. The results are given in Table 2.

Comparative Example 2-2

An evaluation was performed as in Example 2-1 except that 4.0 mass % of 3-phenyl-n-propyl acetate was added as an additive. The results are given in Table 2.

Comparative Example 2-3

An evaluation was performed as in Example 2-1 except that 1.0 mass % of PS was added as an additive. The results are given in Table 2.

Comparative Example 2-4

An evaluation was performed as in Example 2-1 except that 0.5% of $LiBF_4$ was added as an additive. The results are given in Table 2.

Comparative Example 2-5

An evaluation was performed as in Example 2-1 except that 0.25% of lithium fluorosulfonate ($FSO_3Li$) was added as an additive. The results are given in Table 2.

Comparative Example 2-6

An evaluation was performed as in Example 2-1 except that 0.5% of HMDS was added as an additive. The results are given in Table 2.

TABLE 2

|  | Additive 1 | | Additive 2 | | Overcharge |
|---|---|---|---|---|---|
|  | Type | Content/ mass % | Type | Content/ mass % | gas amount/% |
| Example 2-1 | 3-phenyl-n-propyl acetate | 4.0 | PS | 1.0 | 166 |
| Example 2-2 | 3-phenyl-n-propyl acetate | 4.0 | $LiBF_4$ | 0.5 | 131 |
| Example 2-3 | 3-phenyl-n-propyl acetate | 4.0 | $FSO_3Li$ | 0.25 | 169 |

TABLE 2-continued

| | Additive 1 | | Additive 2 | | Overcharge |
| --- | --- | --- | --- | --- | --- |
| | Type | Content/ mass % | Type | Content/ mass % | gas amount/% |
| Example 2-4 | 3-phenyl-n-propyl acetate | 4.0 | HMDS | 0.5 | 159 |
| Comparative Example 2-1 | — | — | — | — | 100 |
| Comparative Example 2-2 | 3-phenyl-n-propyl acetate | 4.0 | — | — | 125 |
| Comparative Example 2-3 | — | — | PS | 1.0 | 81 |
| Comparative Example 2-4 | — | — | $LiBF_4$ | 0.5 | 78 |
| Comparative Example 2-5 | — | — | $FSO_3Li$ | 0.25 | 88 |
| Comparative Example 2-6 | — | — | HMDS | 0.5 | 97 |

*Comparative value based on 100% in Comparative Example 2-1

It can be seen from Table 2 that using the nonaqueous electrolyte solutions of Examples 2-1 to 2-4 of the present invention, the overcharge gas amount is improved in comparison with a solution using no additives (Comparative Example 2-1).

When a Group (I) compound alone was added (Comparative Example 2-2), the overcharge gas amount increased only slightly, and the overcharge characteristics were still unsatisfactory.

When Group (II) compounds alone were added (Comparative Examples 2-3 to 2-6), the amount of overcharge gas was actually reduced, and the overcharge characteristics were unsatisfactory.

It can be seen from this that by using a Group (I) compound and a Group (II) compound simultaneously, it is possible to ensure a specific improvement effect on the overcharge characteristics, and achieve excellent battery stability.

(Test 3)

Example 3-1

(Explanation of Test Operations)
[Manufacture of Positive Electrode]

A slurry was formed by mixing with a disperser, in an N-methylpyrrolidone solvent, 97 mass % of lithium-cobalt oxide (LiCoO2), as a positive electrode active material, 1.5 mass % of acetylene black, as a conductive material, and 1.5 mass % of polyvinylidene fluoride (PVdF), as a binder. This was coated uniformly on both sides of a 21 μm thick aluminum foil, dried, and then pressed to form the positive electrode.

[Manufacture of Negative Electrode]

A slurry was formed by adding and mixing with a disperser, a mixture of natural graphite powder, as a negative electrode active material, an aqueous dispersion of sodium carboxymethyl cellulose (sodium carboxymethyl cellulose concentration 1 mass %), as a thickener, and an aqueous dispersion of styrene-butadiene rubber (styrene-butadiene rubber concentration 50 mass %), as a binder. This slurry was coated uniformly on one side of a 12 μm thick copper foil, dried, and then pressed to form the negative electrode. This was prepared so that the ratio of natural graphite: carboxymethyl cellulose sodium:styrene butadiene rubber in the dried negative electrode was 100:1:1 by mass.

[Preparation of Nonaqueous Electrolyte Solution]

The electrolyte $LiPF_6$ was dissolved at a rate of 1.0 mol/L in a mixed solvent of MFEC and DMC (mixing volume ratio 3:7) in a dry argon atmosphere to prepare a basic electrolyte solution. 2.0% of 3-phenyl-n-propyl acetate and 1.0 mass % of adiponitrile (hereunder sometimes called "AdpCN") were added as additives to this basic electrolyte solution to prepare the nonaqueous electrolyte solution of Example 3-1.

[Manufacture of Nonaqueous Electrolyte Solution Secondary Battery]

The above-described positive electrode, negative electrode, and a polyethylene separator were sequentially stacked, in the order of negative electrode, separator, positive electrode, separator, and negative electrode. The battery component obtained in this way was enclosed in a bag-shaped aluminum laminate film, the aforementioned nonaqueous electrolyte solution was injected, and the bag was vacuum sealed to prepare a sheet-shaped nonaqueous electrolyte solution secondary battery. This was then sandwiched between glass plates and press to increase the adhesiveness between electrodes.

[Initial Capacity Evaluation Test]

The nonaqueous electrolyte battery was charged at a constant current equivalent to 0.05 C for 6 hours at a temperature of 25° C., with the nonaqueous electrolyte secondary battery sandwiched between glass plates. Thereafter, the battery was discharged at constant current of 0.2 C down to 3.0 V. Subsequently, the battery was subjected to CC-CV charging (0.05 C cut) up to 4.1 V at a current equivalent to 0.2 C, and was discharged down to 3 V at a constant current of 0.2 C. Next, the battery was subjected to CCCV charging (0.05 C cut) up to 4.33 V at 0.2 C, and was discharged again down to 3 V at 0.2 C, to work out the initial capacity.

[Overcharge Characteristics Evaluation Test]

After completion of the initial capacity evaluation test, the battery was again CCCV charged to 4.33 V at 25° C. at a constant current of 0.2 C and then immersed in an ethanol bath, and the volume was measured. After this, 0.2 C current was applied for 2.5 hours at 45° C. After sufficient cooling of the battery, the volume of the latter was measured through immersion in an ethanol bath, to work out the amount of overcharge gas generated, on the basis of changes in volume before and after the evaluation test of overcharge characteristic.

The initial capacity evaluation test and overcharge characteristics evaluation test were performed using the nonaqueous electrolyte solution secondary battery prepared above. The evaluation results are given in Table 3.

Comparative Example 3-1

An evaluation was performed as in Example 3-1 except that 1.0 mass % of AdpCN was added as an additive. The results are given in Table 3.

Example 3-2

An evaluation was performed as in Example 3-1 except that 2.0 mass % of 3-phenyl-n-propyl acetate was added as an additive. The results are given in Table 3.

Comparative Example 3-2

An evaluation was performed as in Example 3-1 except that no additives were added. The results are given in Table 3.

TABLE 3

|  | Additive 1 | | Additive 2 | | | Overcharge |
| --- | --- | --- | --- | --- | --- | --- |
|  | Type | Content/ mass % | Type | Content/ mass % | Initial capacity/% | gas amount/% |
| Example 3-1 | 3-phenyl-n-propyl acetate | 2.0 | AdpCN | 1.0 | 100.0 (※1) | 125.0 (※1) |
| Comparative Example 3-1 | none | — | AdpCN | 1.0 | 100.0 (※1) | 100.0 (※1) |
| Example 3-2 | 3-phenyl-n-propyl acetate | 2.0 | none | — | 100.0 (※2) | 116.6 (※2) |
| Comparative Example 3-2 | none | — | none | — | 100.0 (※2) | 100.0 (※2) |

Comparative value based on 100% for Comparative Example 3-1
Comparative value based on 100% for Comparative Example 3-2

It can be seen from Table 3 that using a compound having a cyano group (AdpCN) as the Group (II) compound in combination with a Group (I) compound (Example 3-1), the overcharge gas amount was improved in comparison with a solution to which only a Group (II) compound was added (Comparative Example 3-1).

In Test 3, MFEC is used as a nonaqueous solvent. As a result, the overcharge gas amount is shown to be improved in Example 3-2 in comparison with Comparative Example 3-2.

Comparing the overcharge gas amounts in Examples 3-1 and 3-2, the amount of increase is greater in Example 3-1, indicating a superior effect on the overcharge characteristics.

This confirms that a specific improvement effect on the overcharge characteristics is achieved and superior battery stability is obtained by using a compound having a cyano group as the Group (II) compound in combination with the Group (I) compound.

(Test 4)

Example 4-1

(Explanation of Test Operations)
[Manufacture of Positive Electrode]

A slurry was formed by mixing with a disperser, in an N-methylpyrrolidone solvent, 97 mass % of lithium-cobalt oxide ($LiCoO_2$), as a positive electrode active material, 1.5 mass % of acetylene black, as a conductive material, and 1.5 mass % of polyvinylidene fluoride (PVdF), as a binder. This was coated uniformly on both sides of a 21 µm thick aluminum foil, dried, and pressed to form the positive electrode.

[Manufacture of Negative Electrode]

A slurry was formed by adding and mixing with a disperser, amorphous coated graphite powder, as a negative electrode active material, an aqueous dispersion of sodium carboxymethyl cellulose, as a thickener, and an aqueous dispersion of styrene-butadiene rubber, as a binder. This slurry was coated uniformly on one side of a 10 µm thick copper foil, dried, and then pressed to form the negative electrode. This was prepared so that the ratio of amorphous coated graphite:carboxymethyl cellulose sodium:styrene butadiene rubber in the dried negative electrode was 98:1:1 by mass.

[Preparation of Nonaqueous Electrolyte Solution]

The electrolyte $LiPF_6$ was dissolved at a rate of 1.0 mol/L in a mixed solvent of EC, EMC and DMC (mixing volume ratio 3:3:4) in a dry argon atmosphere to prepare a basic electrolyte solution. 0.5 mass % of ethyl phenoxypriopionate and 2.0 mass % of MFEC were added as additives to this basic electrolyte solution to prepare the nonaqueous electrolyte solution of Example 4-1.

[Manufacture of Nonaqueous Electrolyte Solution Secondary Battery]

The aforementioned positive electrode and negative electrode and a polyethylene separator were stacked in the order of positive electrode, separator, negative electrode in a dry argon atmosphere, the resulting battery element was placed in a coin-shaped SUS container, and the aforementioned nonaqueous electrolyte solution was injected, after which the container was swaged shut to prepare a coin-shaped nonaqueous electrolyte solution secondary battery.

[Initial Capacity Evaluation Test]

In a thermostatic chamber at 25° C., the battery was subjected to CCCV charging (0.05 C cut) up to 4.1 V at a current equivalent to 0.2 C, and was discharged down to 3 V at 0.2 C. This operation was repeated three times. Next, the battery was subjected to CCCV charging (0.05 C cut) up to 4.2 V at 0.2 C, and was discharged again down to 3 V at 0.2 C, to work out the initial 0.2 C capacity. Further, the battery was subjected to CCCV charging (0.05 C cut) up to 4.2 V at 0.2 C, and was discharged again down to 3 V at 1.0 C, to work out the initial high-rate capacity.

The initial capacity evaluation test was performed using the nonaqueous electrolyte solution secondary battery prepared above. The evaluation results are given in Table 4.

Example 4-2

An evaluation was performed as in Example 4-1 except that 0.5 mass % of 2-phenyl ethyl acetate and 2.0 mass % of MFEC were added as additives. The results are given in Table 4.

Comparative Example 4-1

An evaluation was performed as in Example 4-1 except that 2.0 mass % of MFEC was added as an additive. The results are given in Table 4.

Comparative Example 4-2

An evaluation was performed as in Example 4-1 except that 0.5 mass % of benzyl acetate and 2.0 mass % of MFEC were added as additives. The results are given in Table 4.

Comparative Example 4-3

An evaluation was performed as in Example 4-1 except that 0.5 mass % of 1,3-diacetoxybenzene and 2.0 mass % of MFEC were added as additives. The results are given in Table 4.

Comparative Example 4-4

An evaluation was performed as in Example 4-1 except that 0.5 mass % of p-cresyl acetate and 2.0 mass % of MFEC were added as additives. The results are given in Table 4.

(1) above), which are not Group (I) compounds, were used together with Group (II) compounds, it was not possible to simultaneously increase both the initial 0.2 C capacity and initial high-rate capacity, and the results were unsatisfactory. One reason for this may be that the unoccupied orbitals of the —O—CO—$R^1$ group and the benzene ring become superimposed as discussed above, resulting in reductive side-reactions in the negative electrode, causing loss of battery capacity, and producing a high-resistance coating.

It is thus possible to confirm a specific improving effect on initial capacity from using a Group (I) compound and Group (II) compound simultaneously.

While the invention has been described in detail and with reference to specific embodiments thereof, it will be apparent to one skilled in the art that various changes and modifications can be made therein without departing from the spirit and scope thereof.

INDUSTRIAL APPLICABILITY

With the nonaqueous electrolyte solution of the present invention, the initial high-rate characteristics are good, and capacity loss and battery swelling can be reduced during high-temperature storage of a nonaqueous electrolyte solution battery. As a result, the nonaqueous electrolyte solution of the present invention, and the nonaqueous electrolyte battery that uses that nonaqueous electrolyte solution, can be used in various known applications. Specific examples thereof include, for instance, notebook computers, computer pens, mobile PCs, e-book players, mobile phones, portable fax machines, portable copiers, mobile printers, stereo headphones, video movies, LCD TVs, handy cleaners, portable CDs, Mini Discs, walkie-talkies, electronic organizers, calculators, memory cards, portable tape recorders, radios, back-up power supplies, motors, automobiles, motorcycles, mopeds, bicycles, lighting fixtures, toys, gaming devices, clocks, electric tools, strobes, cameras, power sources for load leveling, and power sources for natural energy storage.

TABLE 4

|  | Additive 1 | | Additive 2 | | Initial | Initial |
|  | Type | Content/ mass % | Type | Content/ mass % | 0.2 C capacity/% | 1 C high-rate capacity/% |
| --- | --- | --- | --- | --- | --- | --- |
| Example 4-1 | Ethyl phenoxypropionate | 0.5 | MFEC | 2.0 | 101.6 | 100.8 |
| Example 4-2 | 2-phenyl ethyl acetate | 0.5 | MFEC | 2.0 | 103.5 | 100.5 |
| Comparative Example 4-1 | — | — | MFEC | 2.0 | 100.0 | 100.0 |
| Comparative Example 4-2 | Benzyl acetate | 0.5 | MFEC | 2.0 | 101.4 | 87.9 |
| Comparative Example 4-3 | 1,3-diacetoxybenzene | 0.5 | MFEC | 2.0 | 104.5 | 89.0 |
| Comparative Example 4-4 | p-cresyl acetate | 0.5 | MFEC | 2.0 | 97.1 | 97.8 |

Comparative value based on 100% for Comparative Example 4-1

It can be seen from Table 4 that using the nonaqueous electrolyte solutions of Example 4-1 and 4-2 of the present invention, the initial 0.2 C capacity and initial high-rate capacity were improved in comparison with a case (Comparative Example 4-1) in which only a Group (II) compound was added (Comparative Example 4-1).

When benzyl acetate (j=1, k=0 in General Formula (1) above), 1,3-diacetoxybenzene (j=0, k=0 in General Formula (1) above) or p-cresyl acetate (j=0, k=0 in General Formula

The invention claimed is:

1. A nonaqueous electrolyte solution comprising an electrolyte; and a nonaqueous solvent,
    the nonaqueous electrolyte solution further comprising component (I) and (II):
    (I) an aromatic carboxylic acid ester compound represented by Formula (1) below, wherein the total content of the component (I) in the nonaqueous electrolyte solution ranges from 0.5 mass % to 5 mass %; and (II) a fluorinated ethylene carbonate wherein total content of the component (II) in the nonaqueous electrolyte solution ranges from 0.1 mass % to 20 mass %:

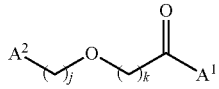
(1)

wherein $A^1$ is —$R^1$ or —$OR^1$, with $R^1$ being an optionally substituted hydrocarbon group with 10 or fewer carbon atoms; $A^2$ is an optionally substituted aryl group; each of j and k is independently 0 or an integer greater than 0, and at least one of j and k is an integer not less than 1; and when k≥1, $A^1$ is —$OR^1$, while when k=0, $A^1$ is —$R^1$; and the case of j=1, k=0 is not allowed.

2. The nonaqueous electrolyte solution according to claim 1, wherein said nonaqueous electrolyte solution further comprises:
(i) a compound having a $SO_2$ group which is at least one compound selected from the group consisting of chain sulfonic acid esters, cyclic sulfonic acid esters, chain sulfuric acid esters, cyclic sulfuric acid esters, chain sulfurous acid esters and cyclic sulfurous acid esters; and/or
a Si-containing compound is a compound represented by Formula (3)

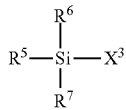
(3)

-continued

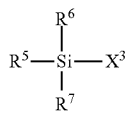
(3)

wherein
$R^5$, $R^6$ and $R^7$ independently represent a hydrogen atom, a halogen atom or a hydrocarbon group with 10 or fewer carbon atoms, and $X^3$ is an organic group containing at least one atom selected from the group consisting of oxygen, nitrogen and silicon.

3. The nonaqueous electrolyte solution according to claim 1, wherein at least one of j and k is an integer not less than 2 in Formula (1).

4. The nonaqueous electrolyte solution according to claim 1, further comprising a cyclic carbonate having a carbon-carbon unsaturated bond.

5. A nonaqueous electrolyte solution battery comprising negative and positive electrodes capable of storing and releasing lithium ions; and a nonaqueous electrolyte solution, wherein the nonaqueous electrolyte solution is the nonaqueous electrolyte solution according to claim 1.

6. The nonaqueous electrolyte solution according to claim 1, further comprising at least one kind of compound selected from the group consisting of a fluorosulfonate salt, a compound having $SO_2$ group, and a Si-containing compound.

* * * * *

UNITED STATES PATENT AND TRADEMARK OFFICE
CERTIFICATE OF CORRECTION

PATENT NO.        : 10,320,030 B2
APPLICATION NO.   : 14/582676
DATED             : June 11, 2019
INVENTOR(S)       : Kanako Takiguchi et al.

Page 1 of 1

It is certified that error appears in the above-identified patent and that said Letters Patent is hereby corrected as shown below:

In the Claims

In Column 66, Lines 1-7 (approx.) delete duplicate Formula:

" 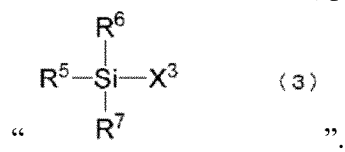  (3) ".

Signed and Sealed this
Twenty-eighth Day of January, 2020

Andrei Iancu
*Director of the United States Patent and Trademark Office*